(12) United States Patent
Berman et al.

(10) Patent No.: US 9,052,704 B2
(45) Date of Patent: Jun. 9, 2015

(54) COMPUTERIZED TOOL PATH GENERATION

(71) Applicant: SOLIDCAM LTD., Or Yehuda (IL)

(72) Inventors: Michael Berman, Kfar Yona (IL); Doron Osovlanski, Givat Shmuel (IL); Christopher Matthew Calderone, Levittown, PA (US); Anthony Joseph Calderone, Yardley, PA (US)

(73) Assignee: SOLIDCAM, LTD., Or Yehuda (IL)

( * ) Notice: Subject to any disclaimer, the term of this patent is extended or adjusted under 35 U.S.C. 154(b) by 0 days.

(21) Appl. No.: 13/916,918

(22) Filed: Jun. 13, 2013

(65) Prior Publication Data

US 2013/0282161 A1  Oct. 24, 2013

Related U.S. Application Data

(62) Division of application No. 13/036,726, filed on Feb. 28, 2011, now Pat. No. 8,489,224.

(51) Int. Cl.
*G05B 19/04* (2006.01)
*G05B 19/4093* (2006.01)

(52) U.S. Cl.
CPC ............. *G05B 19/041* (2013.01); *Y10T 408/89* (2015.01); *G05B 19/4093* (2013.01); *G05B 2219/35097* (2013.01); *G05B 2219/35106* (2013.01); *G05B 2219/35215* (2013.01); *G05B 2219/34147* (2013.01)

(58) Field of Classification Search
CPC ................. G05B 19/4093; G05B 2219/35097; G05B 19/041; G05B 2219/35215; G05B 2219/35106; G05B 2219/34147; Y10T 408/89

USPC ................. 700/159–160, 173, 181, 183, 190; 29/603.07; 408/31; 409/64, 80, 84, 409/132; 451/64

See application file for complete search history.

(56) References Cited

U.S. PATENT DOCUMENTS 4,200,015 A * 4/1980 Gerber .............................. 83/22
4,745,558 A  5/1988 Kishi et al.
4,907,164 A  3/1990 Guyder (Continued)

FOREIGN PATENT DOCUMENTS

WO  2011/004368  1/2011
WO  2012/117391  9/2012

OTHER PUBLICATIONS

An International Search Report and a Written Opinion both dated Jul. 17, 2012, which issued during the prosecution of Applicant's PCT/IL2012/000087.

(Continued)

*Primary Examiner* — Ramesh Patel
(74) *Attorney, Agent, or Firm* — Sughrue Mion, PLLC

(57) ABSTRACT

An automated computer-implemented method for generating commands for controlling a computer numerically controlled machine to fabricate an object from a workpiece, the method including the steps of selecting a maximum permitted engagement angle between a rotating cutting tool and the workpiece, selecting a minimum permitted engagement angle between the rotating cutting tool and the workpiece, and configuring a tool path for the tool relative to the workpiece in which the engagement angle gradually varies between the maximum permitted engagement angle and the minimum permitted engagement angle.

6 Claims, 61 Drawing Sheets

(56) References Cited

U.S. PATENT DOCUMENTS

| | | | |
|---|---|---|---|
| 4,985,840 A * | 1/1991 | Shinozaki | 700/187 |
| 5,043,906 A * | 8/1991 | Jepson | 700/192 |
| 5,091,861 A * | 2/1992 | Geller et al. | 700/192 |
| 5,251,143 A * | 10/1993 | Maeda | 700/176 |
| 5,297,022 A * | 3/1994 | Watanabe | 700/86 |
| 5,363,308 A | 11/1994 | Guyder | |
| 5,515,290 A * | 5/1996 | Honda | 700/187 |
| 5,526,272 A * | 6/1996 | Kondo et al. | 700/178 |
| 5,565,749 A * | 10/1996 | Jinno et al. | 318/566 |
| 5,596,504 A * | 1/1997 | Tata et al. | 700/120 |
| 5,703,782 A * | 12/1997 | Dundorf | 700/182 |
| 5,768,136 A * | 6/1998 | Fujiwara et al. | 700/182 |
| 6,007,280 A * | 12/1999 | Asahi et al. | 409/132 |
| 6,112,133 A * | 8/2000 | Fishman | 700/182 |
| 6,266,572 B1 * | 7/2001 | Yamazaki et al. | 700/96 |
| 6,311,100 B1 * | 10/2001 | Sarma et al. | 700/190 |
| 6,363,298 B1 * | 3/2002 | Shin et al. | 700/160 |
| 6,421,724 B1 | 7/2002 | Nickerson et al. | |
| 6,428,252 B1 | 8/2002 | Oldan | |
| 6,447,223 B1 * | 9/2002 | Farah et al. | 409/132 |
| 6,535,788 B1 | 3/2003 | Yoshida et al. | |
| 6,591,156 B1 * | 7/2003 | Fukaya et al. | 700/159 |
| 6,591,158 B1 | 7/2003 | Bieterman et al. | |
| 6,606,581 B1 | 8/2003 | Nickerson et al. | |
| 6,785,717 B1 | 8/2004 | Nickerson et al. | |
| 6,928,392 B2 | 8/2005 | Nickerson et al. | |
| 7,012,395 B2 * | 3/2006 | Haunerdinger et al. | 318/573 |
| 7,085,820 B1 | 8/2006 | Nickerson et al. | |
| 7,149,599 B2 * | 12/2006 | Arai et al. | 700/186 |
| 7,237,989 B2 | 7/2007 | Glaesser | |
| 7,269,741 B2 | 9/2007 | Matsui et al. | |
| 7,370,285 B1 | 5/2008 | Nickerson et al. | |
| 7,450,127 B2 * | 11/2008 | Hong et al. | 345/474 |
| 7,451,013 B2 * | 11/2008 | Coleman et al. | 700/173 |
| 7,478,121 B1 | 1/2009 | Nickerson et al. | |
| 7,577,490 B2 * | 8/2009 | Diehl et al. | 700/173 |
| 7,693,588 B2 * | 4/2010 | Hong et al. | 700/61 |
| 7,831,332 B2 * | 11/2010 | Diehl | 700/190 |
| 8,000,834 B2 * | 8/2011 | Diehl et al. | 700/190 |
| 8,489,224 B2 | 7/2013 | Berman | |
| 2005/0154693 A1 | 7/2005 | Ebert | |
| 2005/0256604 A1 * | 11/2005 | Diehi et al. | 700/159 |
| 2008/0092060 A1 | 4/2008 | Berg et al. | |
| 2008/0269943 A1 * | 10/2008 | Diehl et al. | 700/190 |
| 2010/0087949 A1 * | 4/2010 | Coleman et al. | 700/189 |
| 2010/0191359 A1 * | 7/2010 | Diehl et al. | 700/97 |
| 2011/0178629 A1 * | 7/2011 | Diehl et al. | 700/187 |
| 2012/0221140 A1 | 8/2012 | Berman | |
| 2013/0144426 A1 * | 6/2013 | Coleman et al. | 700/186 |

OTHER PUBLICATIONS

Marinac. Toll Path Strategies for high Speed Machining. Modern Machine Shop. (Feb. 15, 2000) [retrieved on Jul. 9, 2012], Retrieved from the internet: <URL: http://www.mmsonline.com/articles/tool-path-strategeis-for-high-Speed-machining>.

An International Search Report dated Nov. 3, 2010, which issued during the prosecution of Applicant's PCT/IL10/00543.

A Restriction Requirement dated Oct. 18, 2012, which issued during the prosecution of U.S. Appl. No. 13/036,726.

An Office Action dated Jan. 2, 2013, which issued during the prosecution of U.S. Appl. No. 13/036,726.

A Notice3 of Allowance dated May 1, 2013, which issued during the prosecution of U.S. Appl. No. 13/036,726.

An International Preliminary Report on Patentability dated Sep. 3, 2013, which issued during the prosecution of Applicant's PCT/IL2012/000087.

Communication dated Nov. 3, 2014 from the Intellectual Property Office of Singapore in counterpart Singapore Patent Application No. 201306455-5.

Ibaraki S et al: "On the removal of critical cutting regions by trochoidal grooving", Precision Engineering, Elsevier,Amsterdam, Nl, vol. 34, no. 3, 1 Jul. 2010 (2010-07-01), pp. 467-473.

Elber G et al: "Mathsm: medial axis transform toward high speed machining of pockets", Computer Aided Design, Elsevier Publishers Bv. Barking, GB, vol. 37, no. 2, 1 Feb. 2005 (2005-02-01), pp. 241-250.

A Supplementary European Search Report dated Dec. 08, 2014, which issued during the prosecution of Applicant's European App No. 12752319.9.

\* cited by examiner

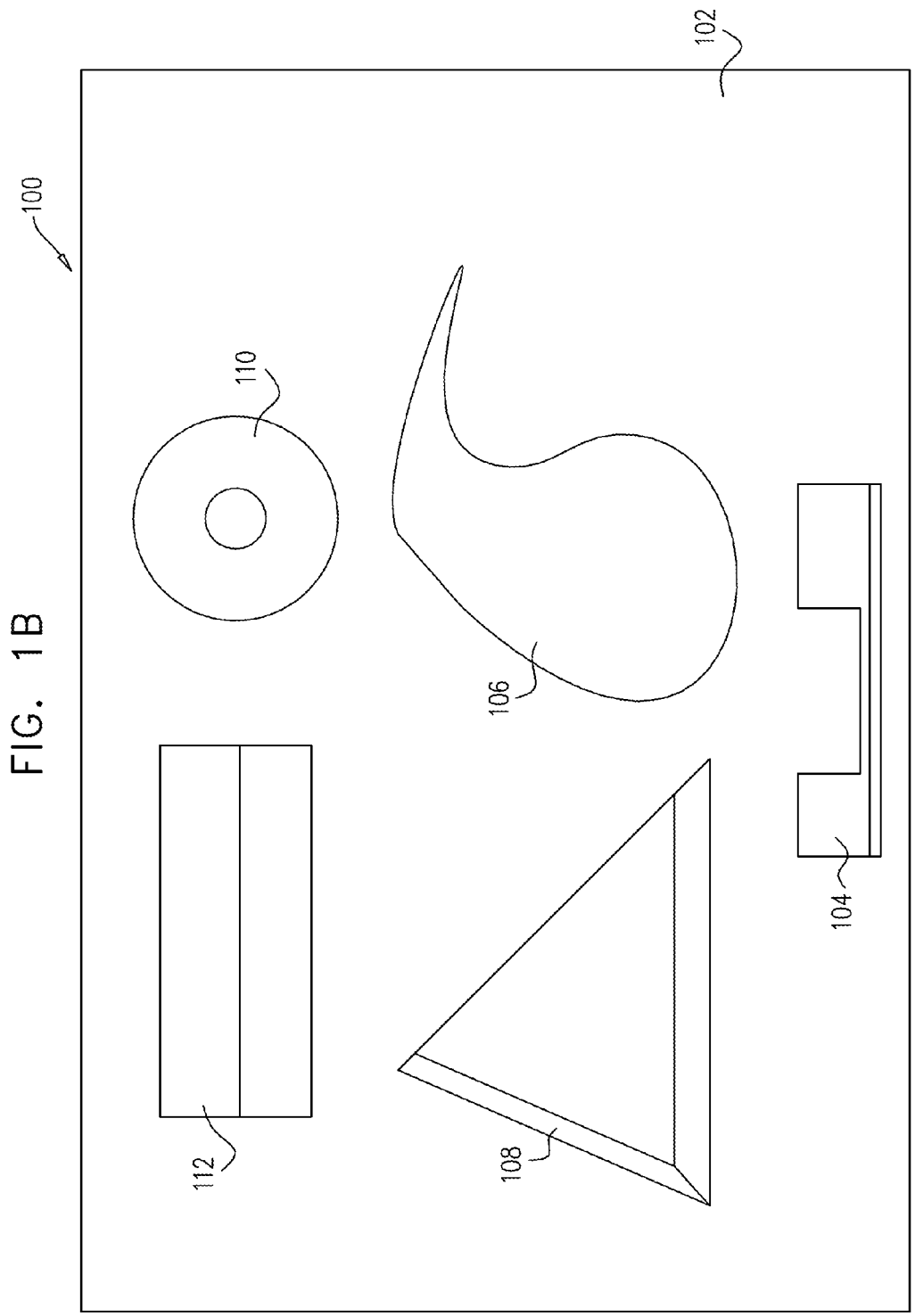

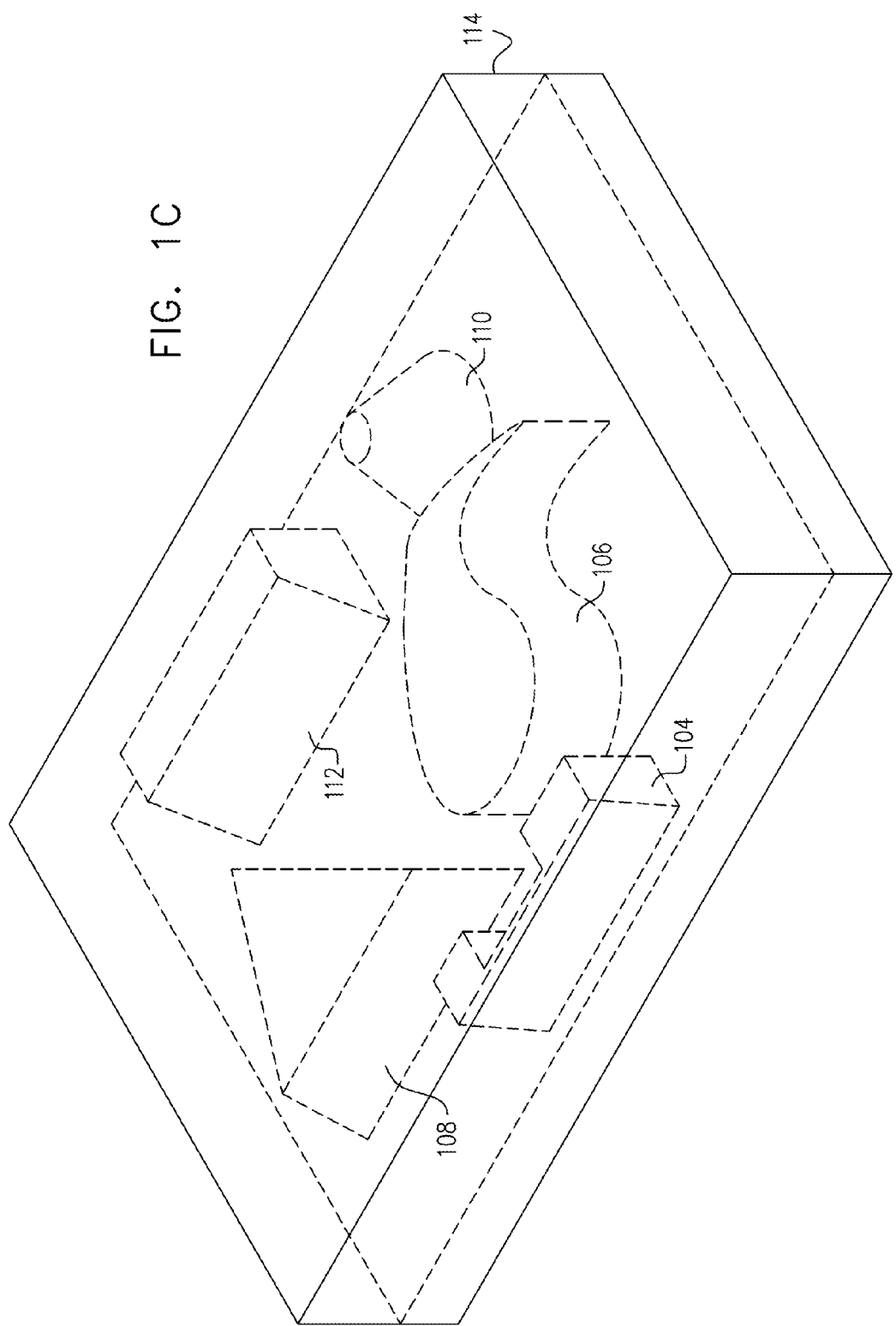

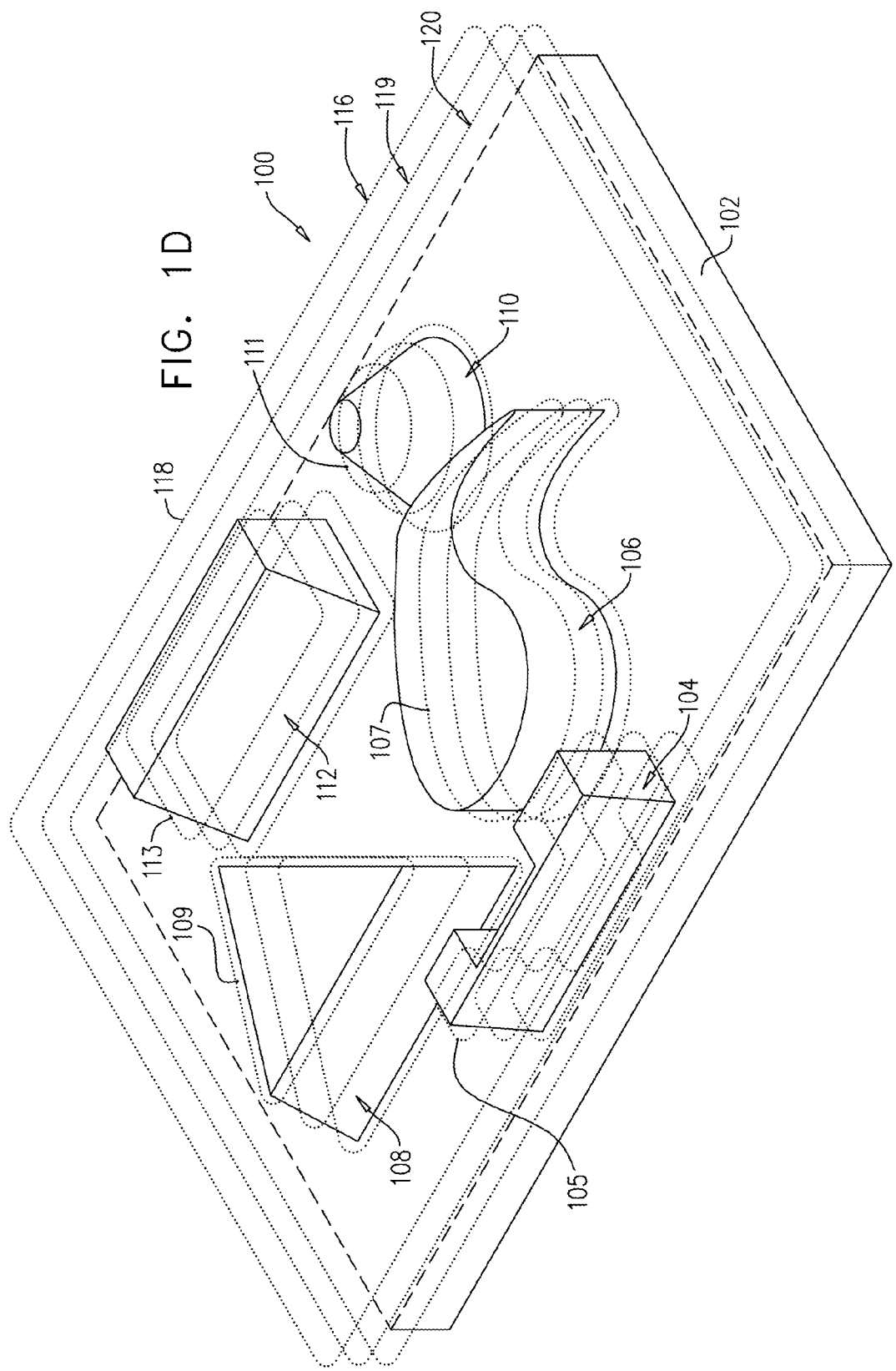

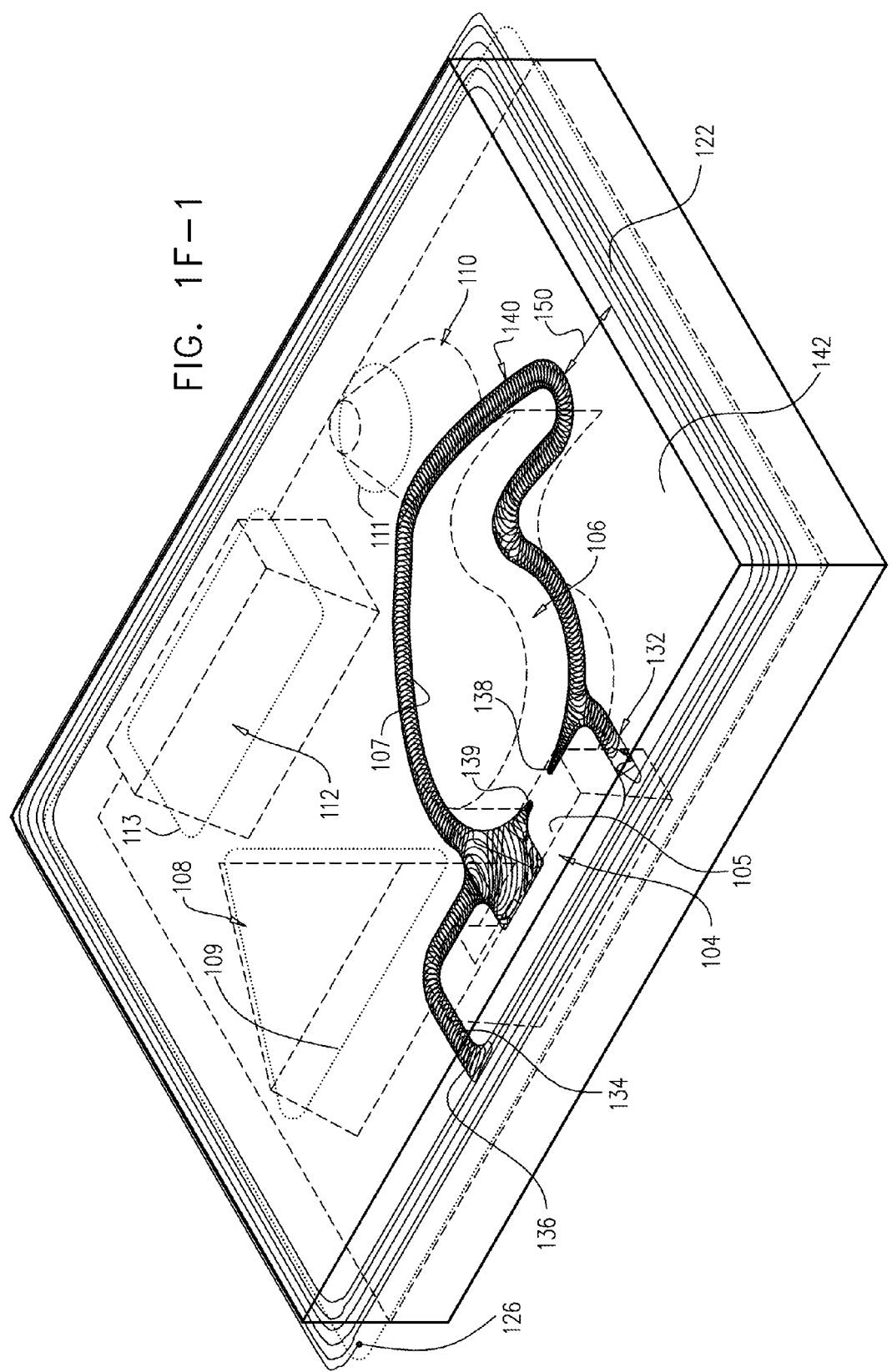

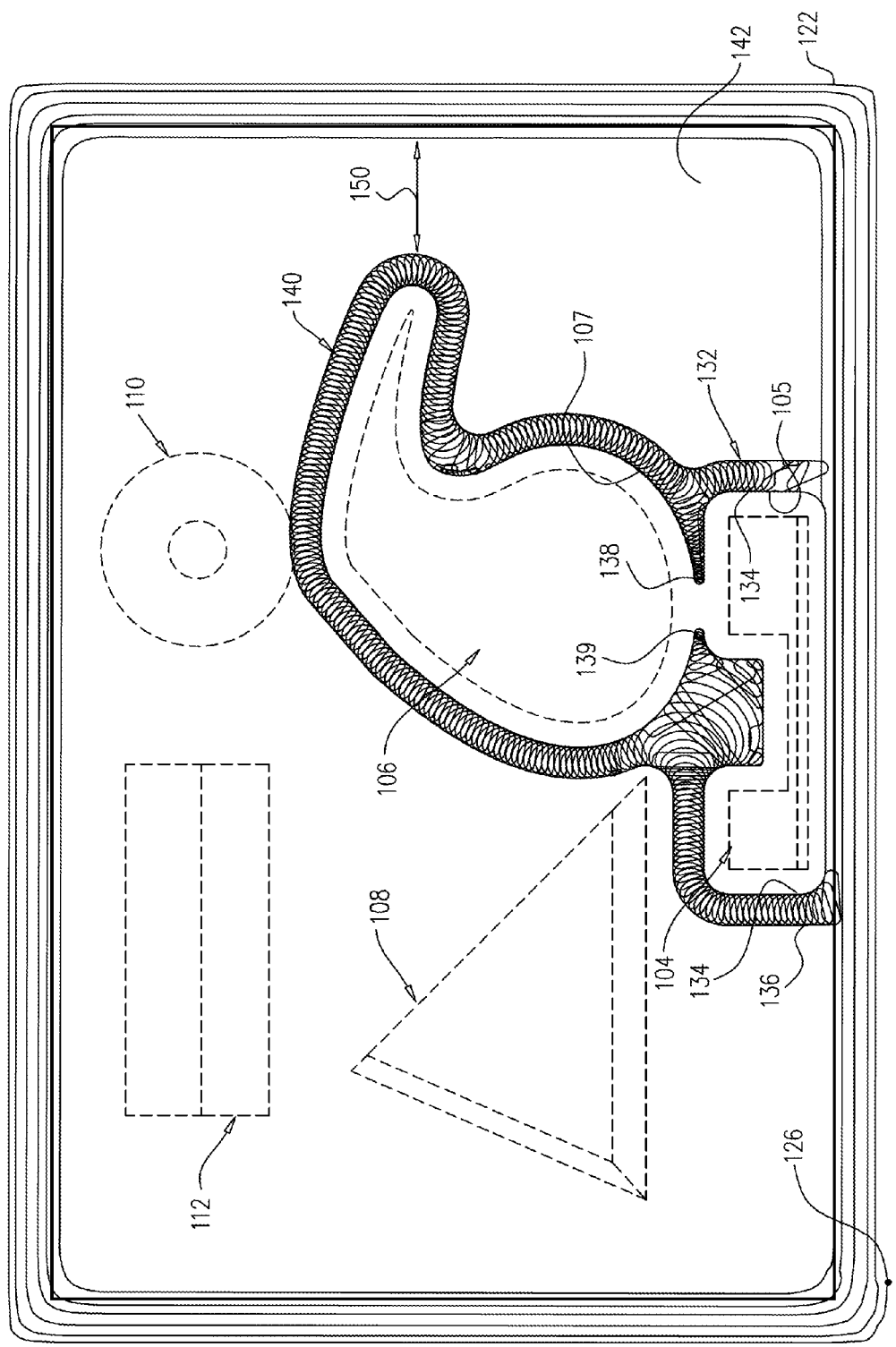

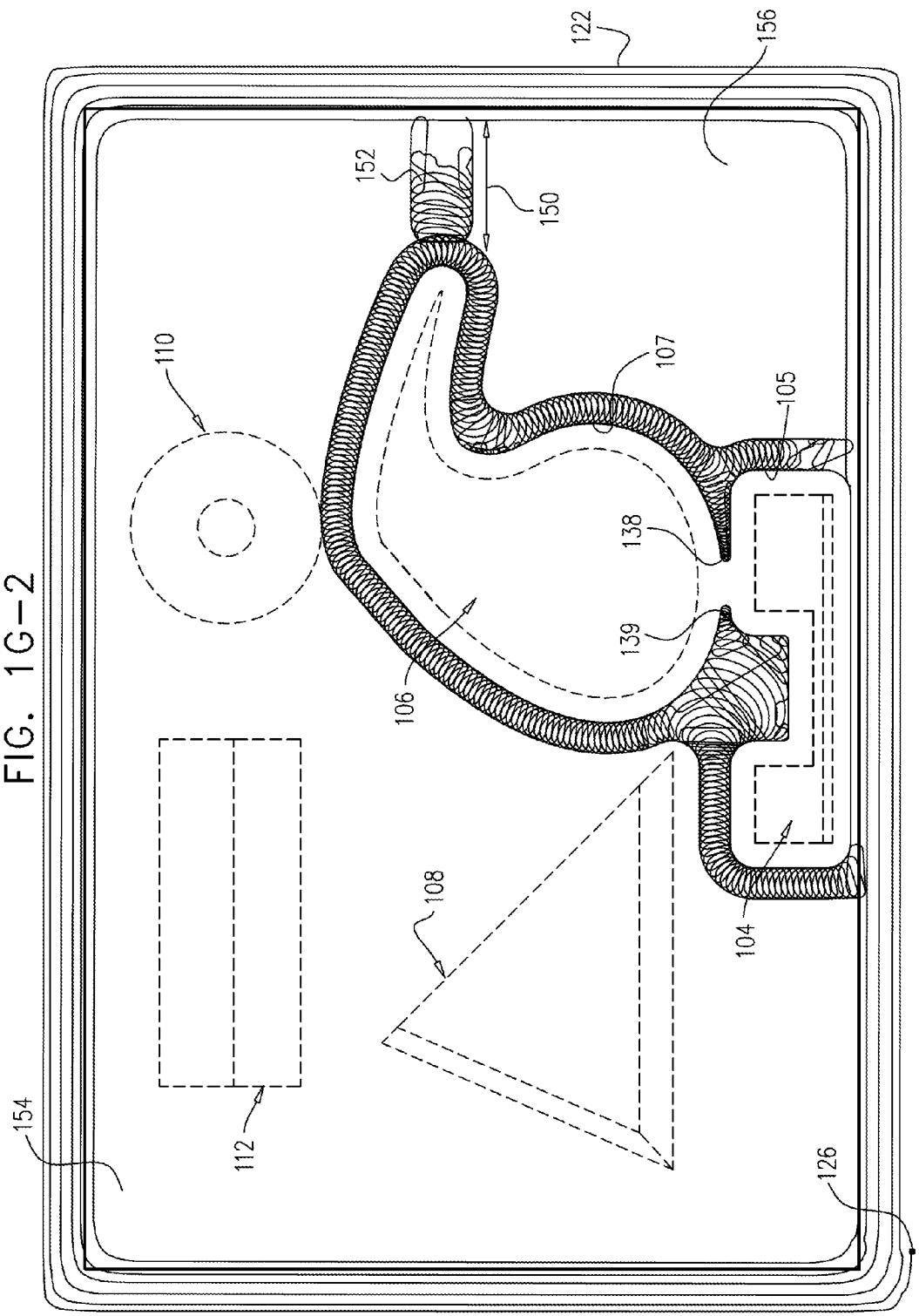

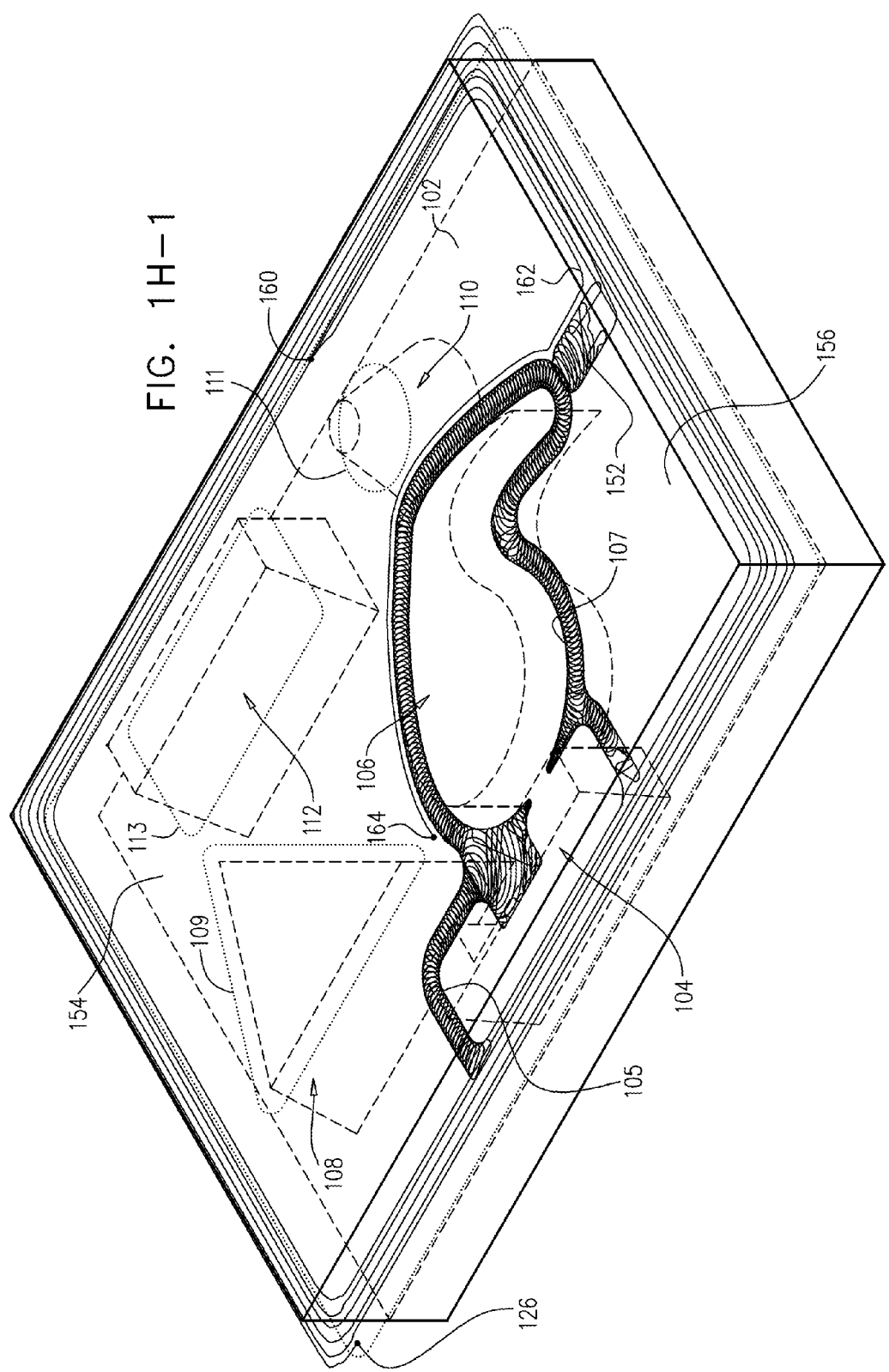

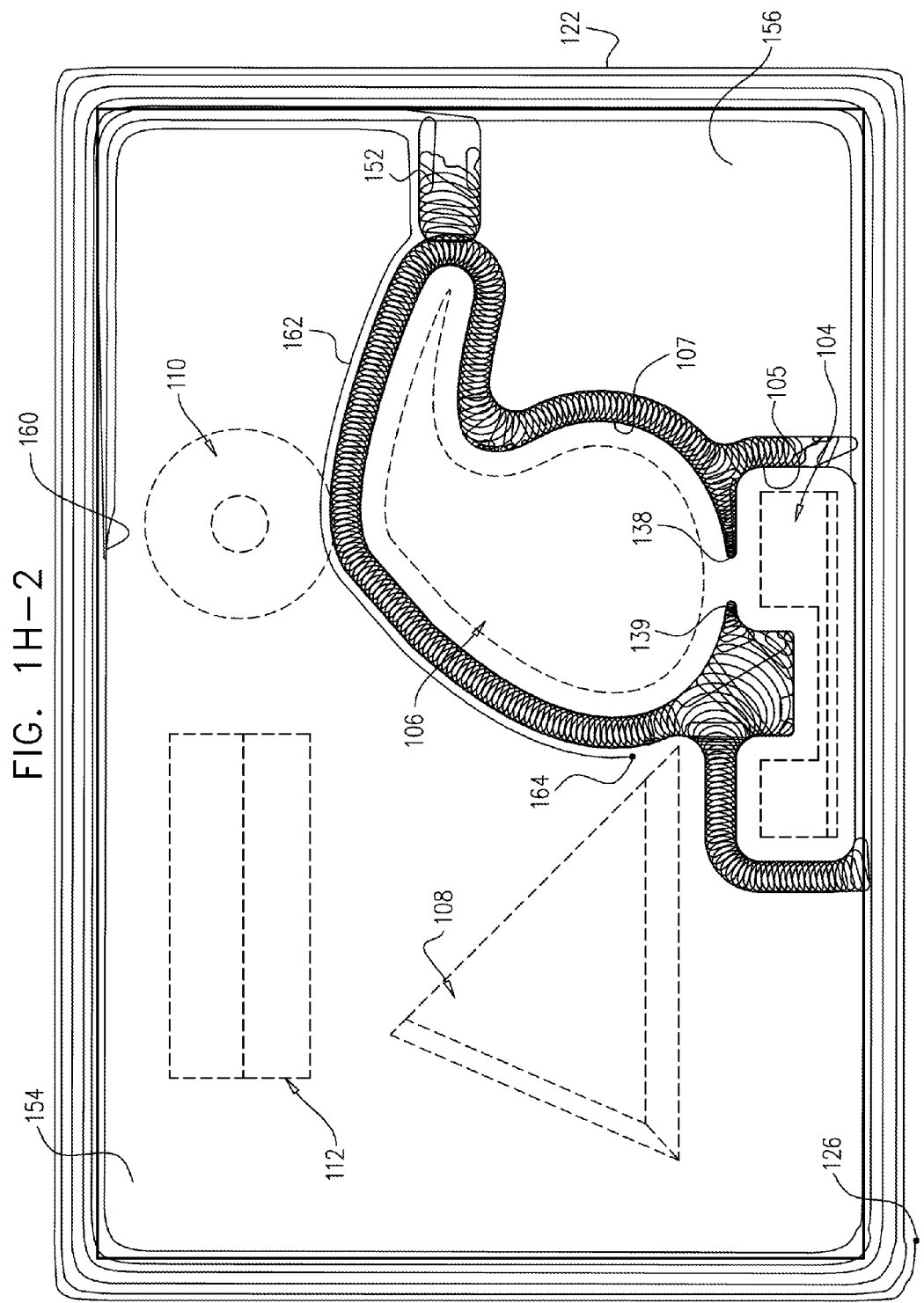

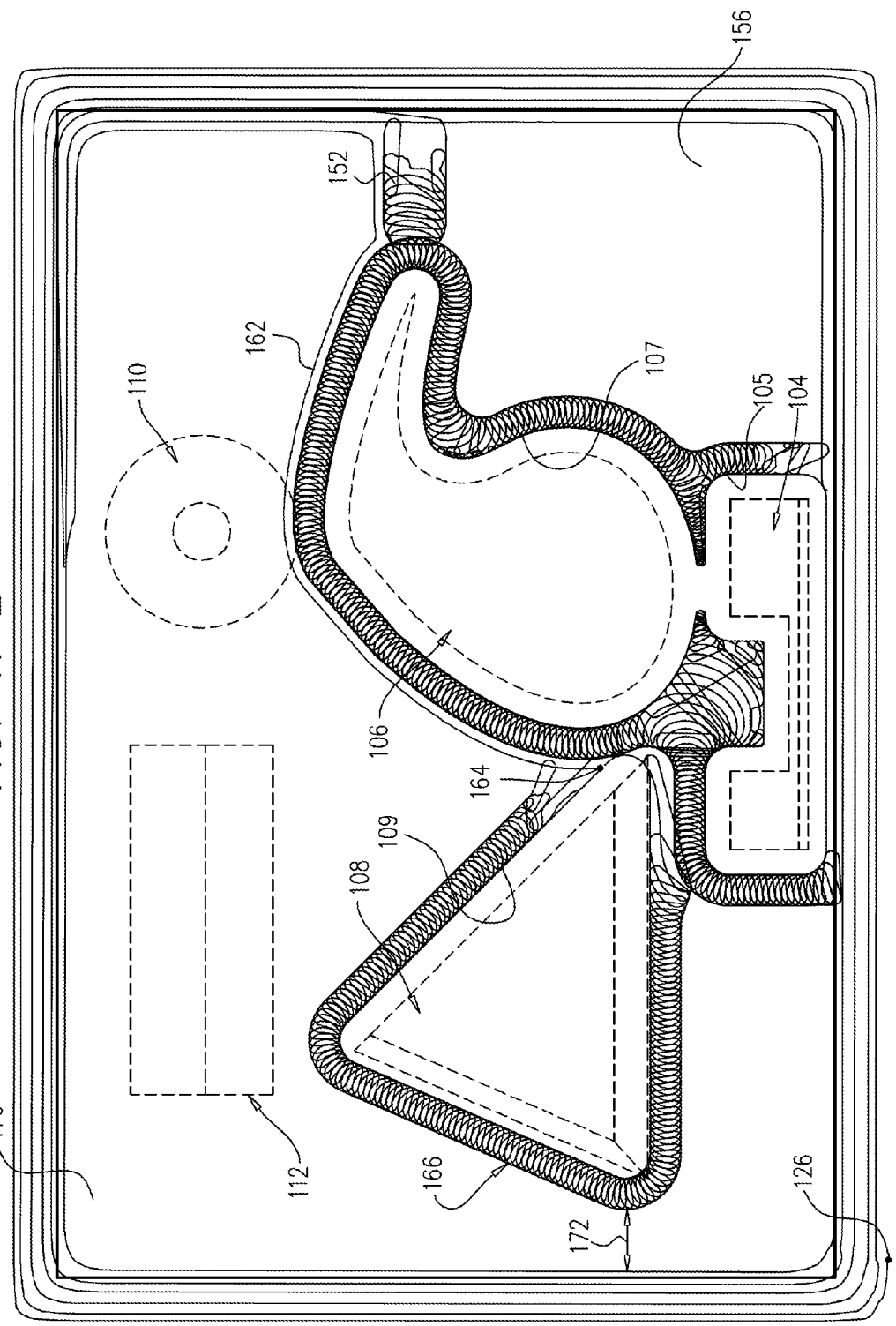

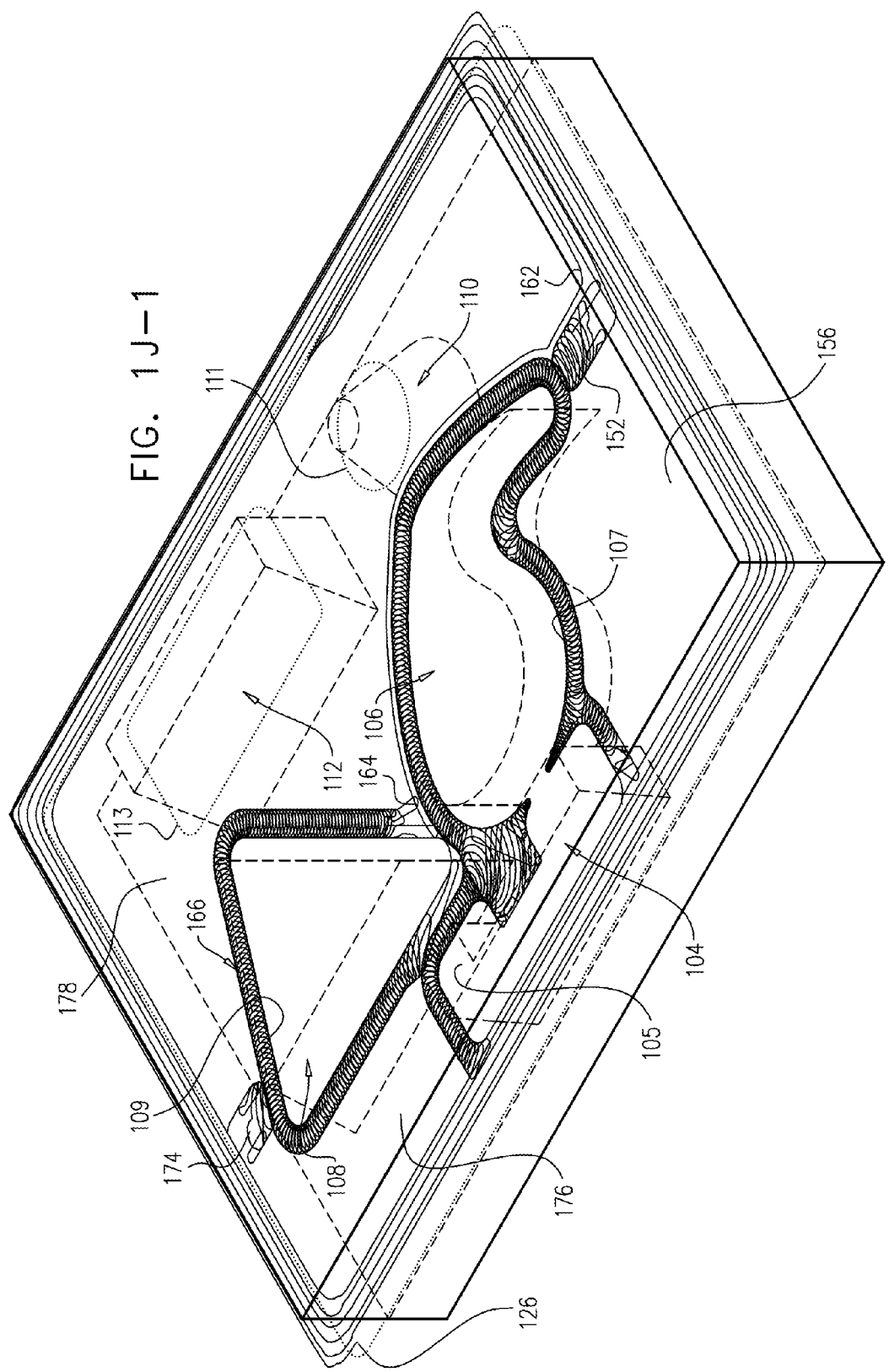

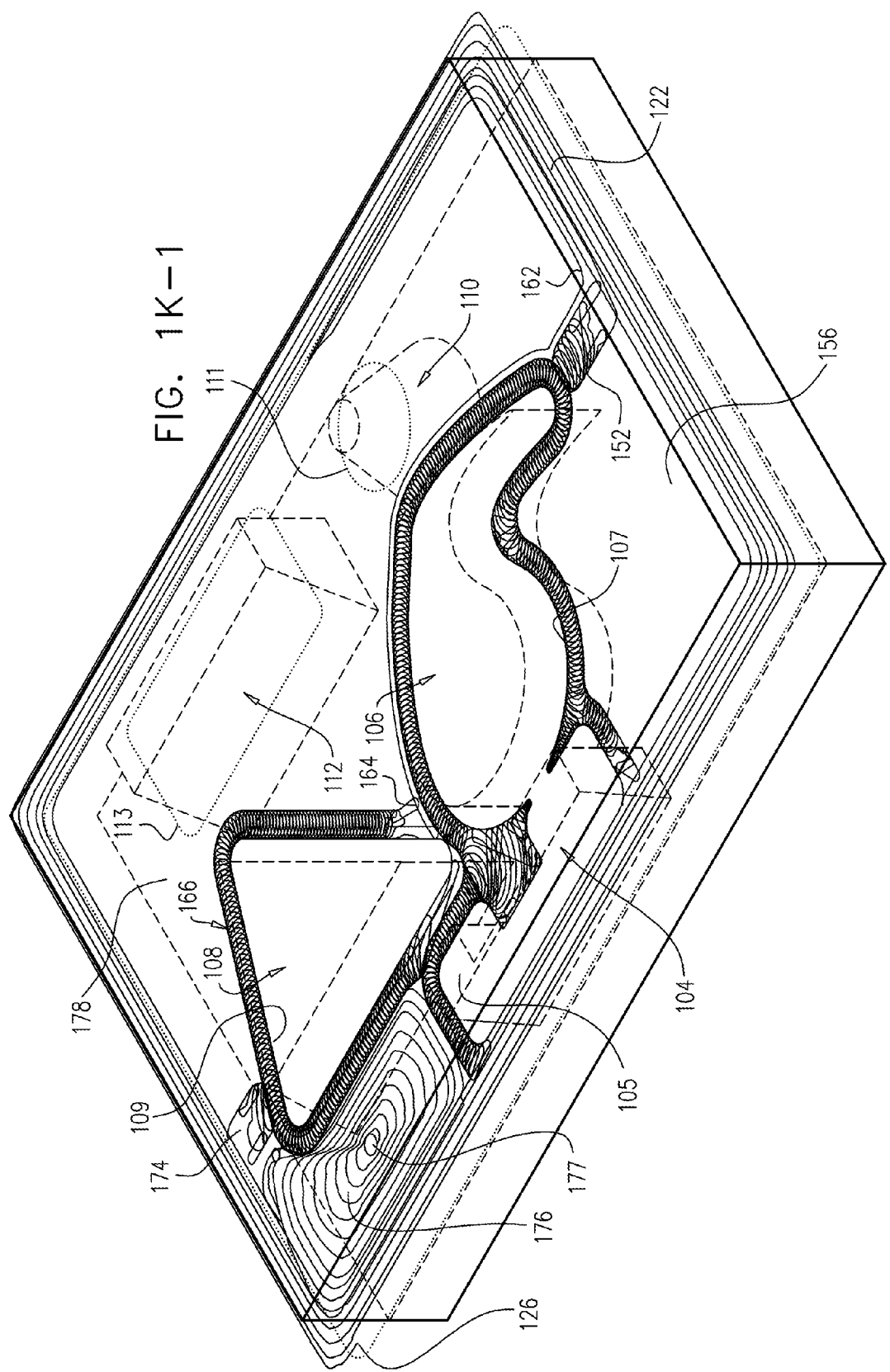

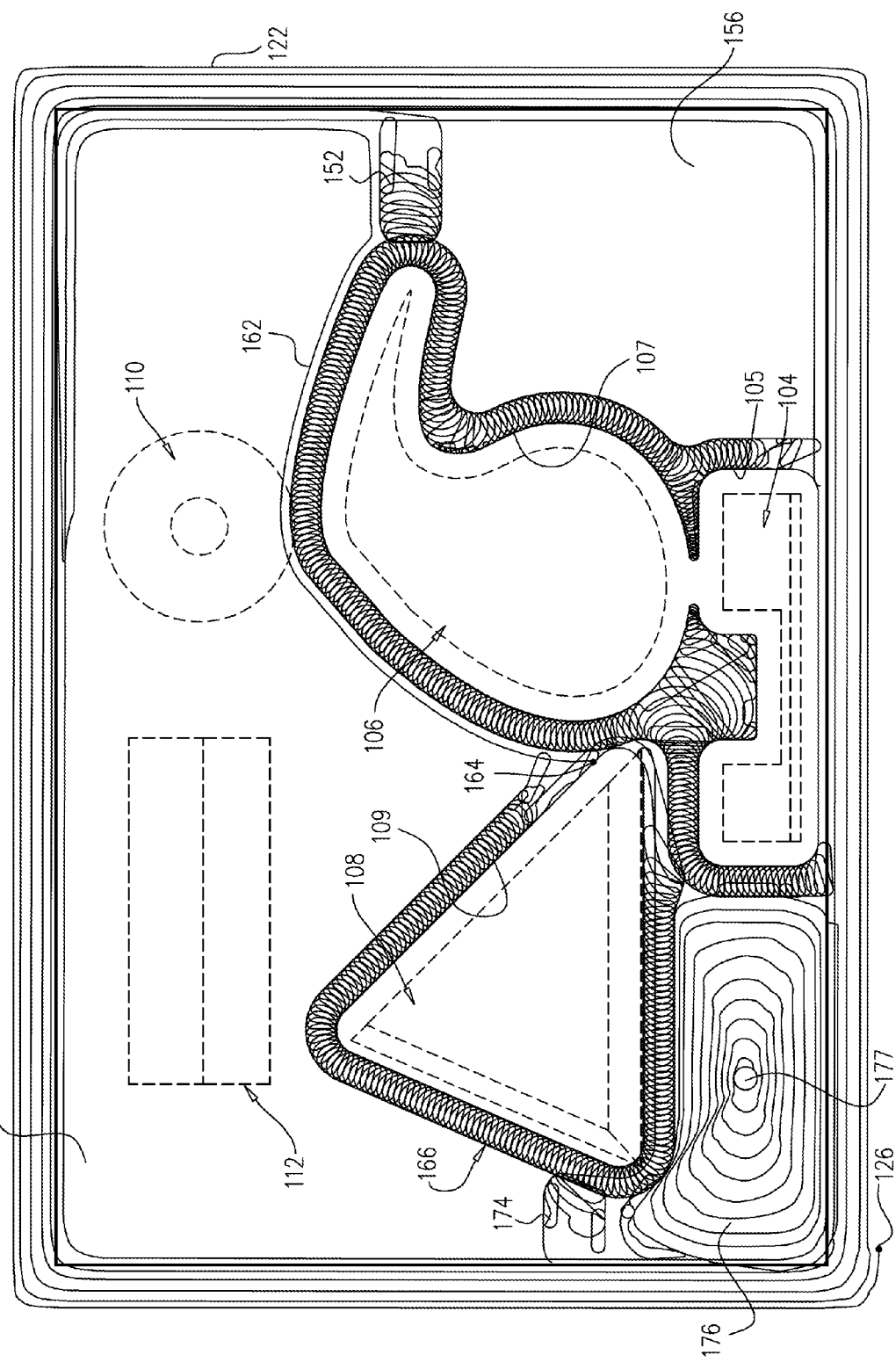

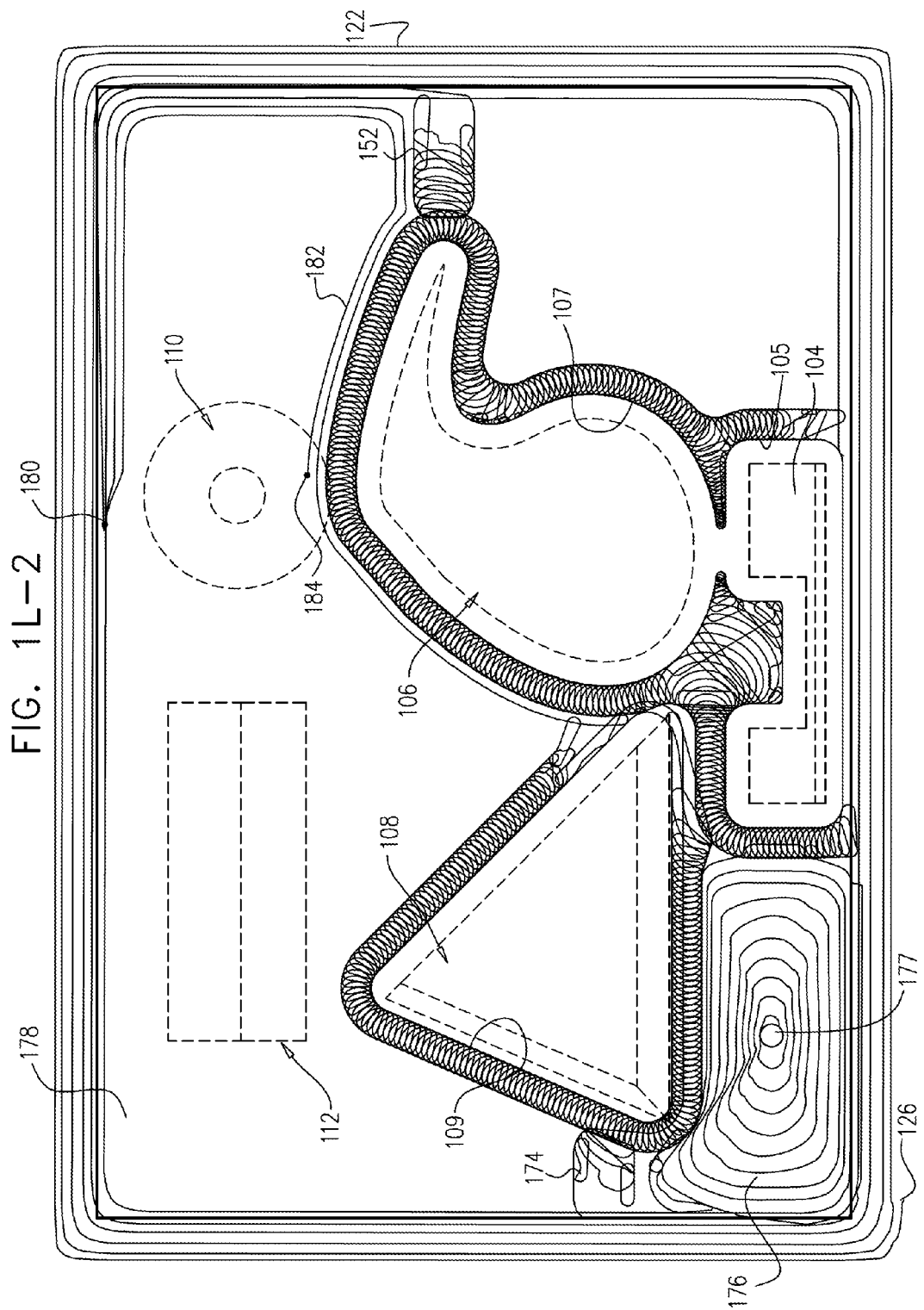

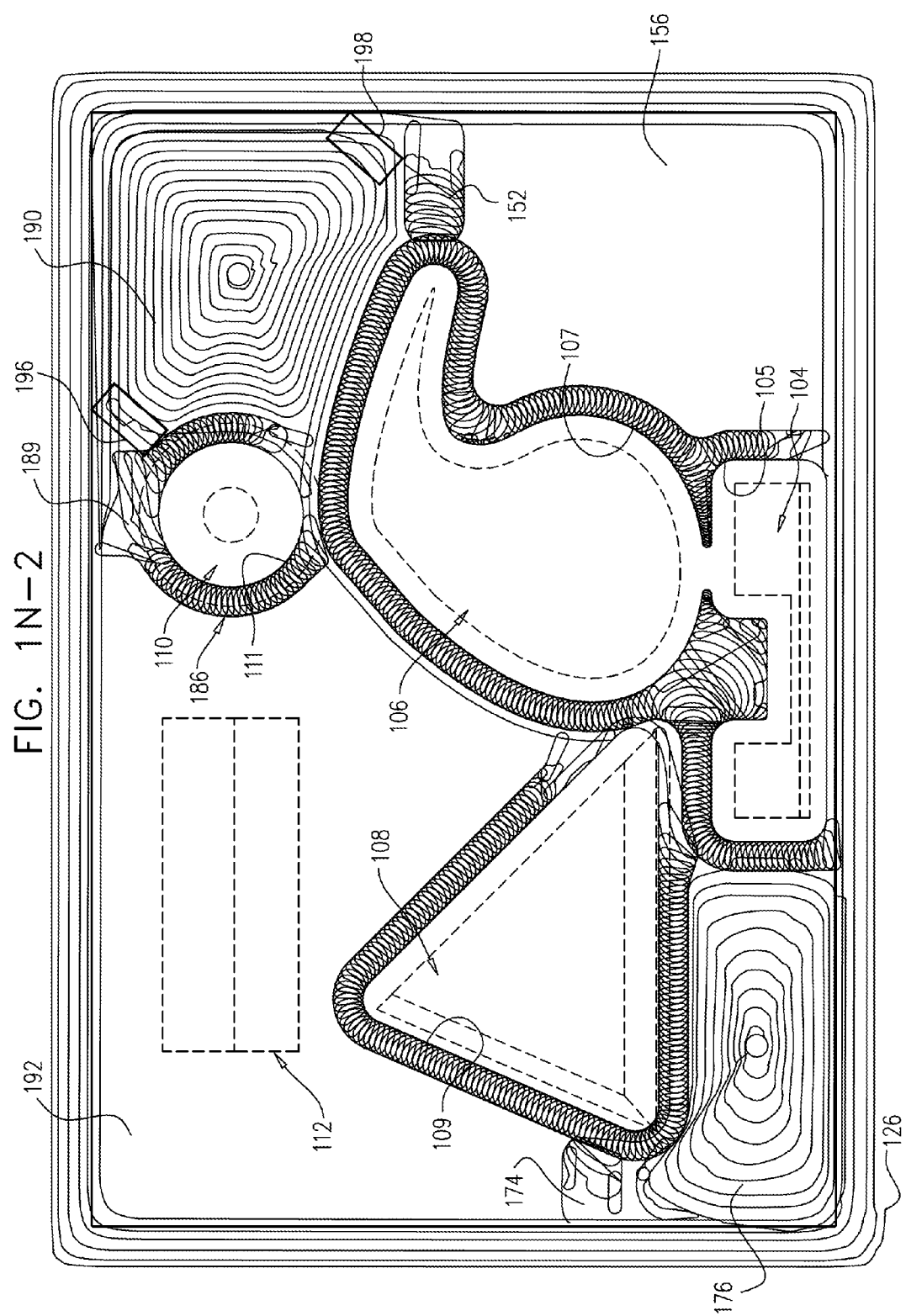

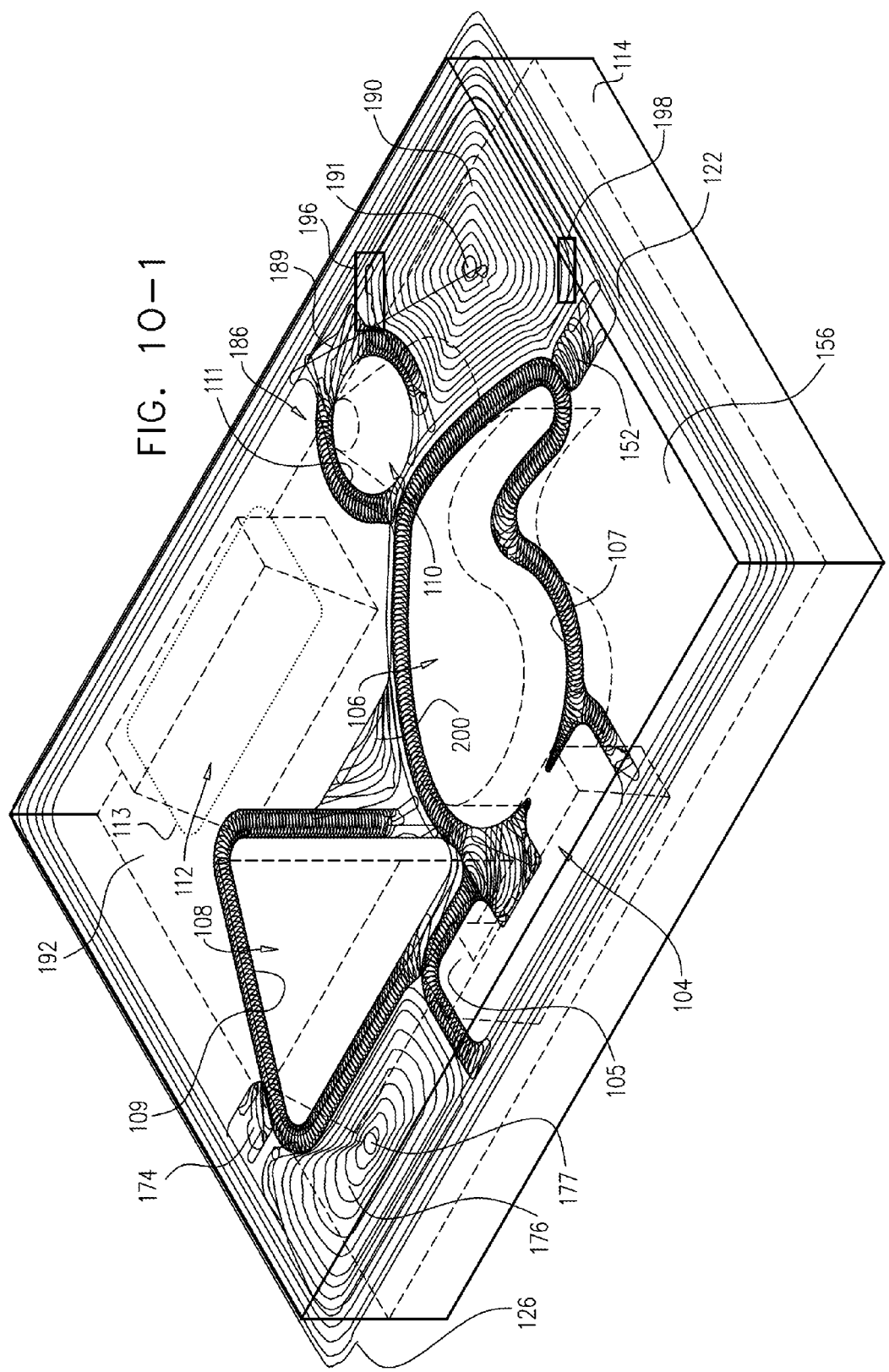

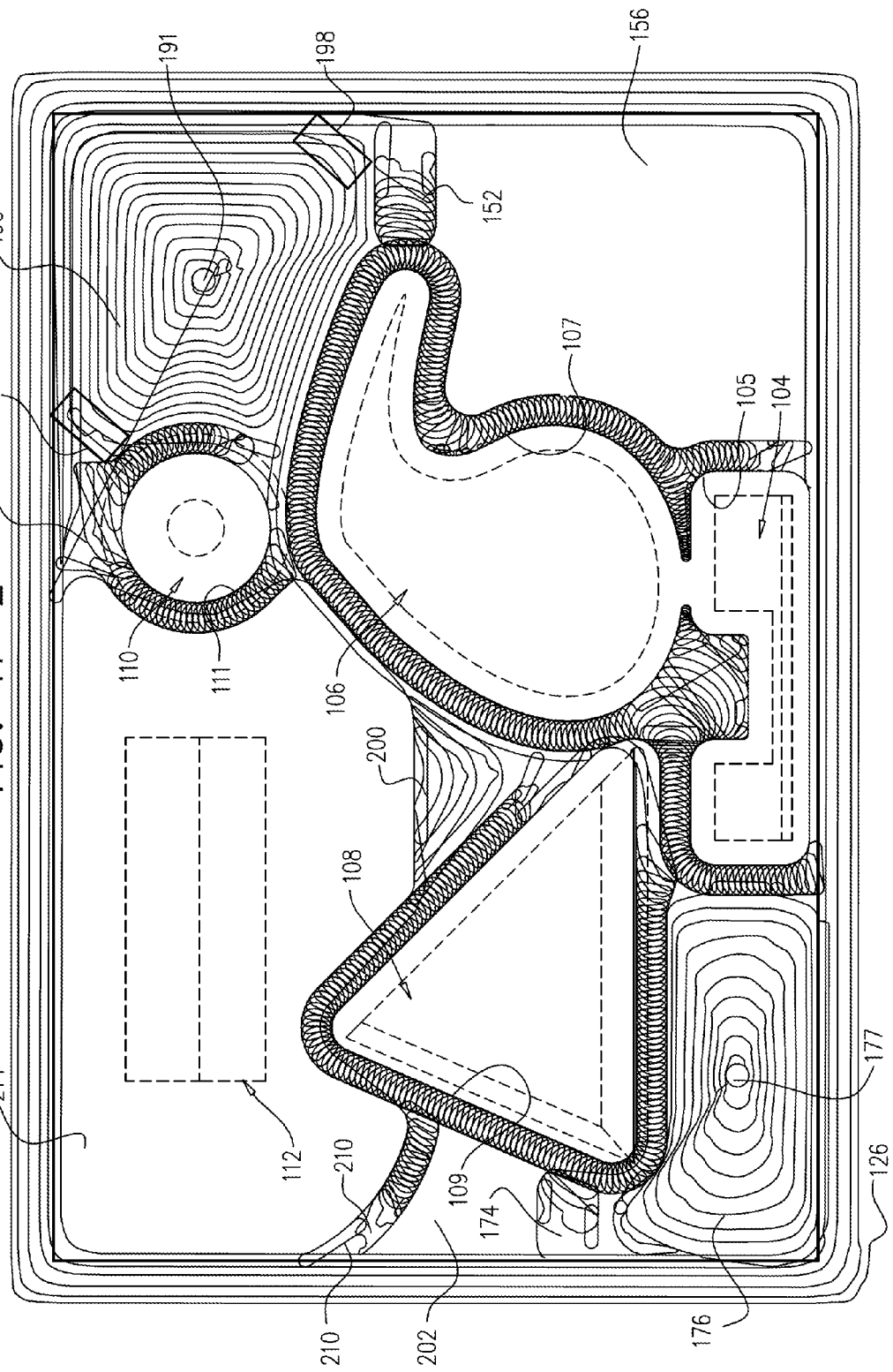

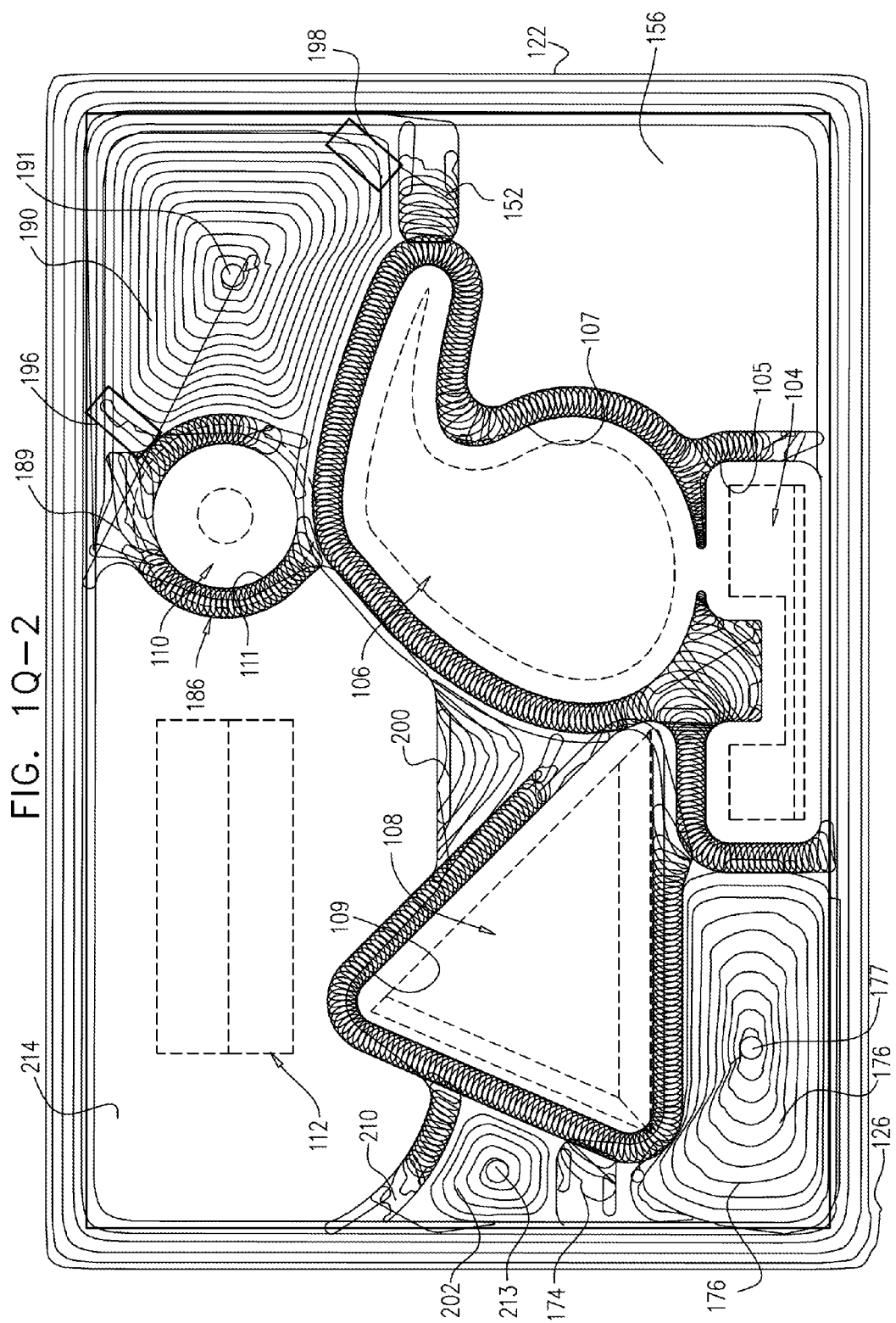

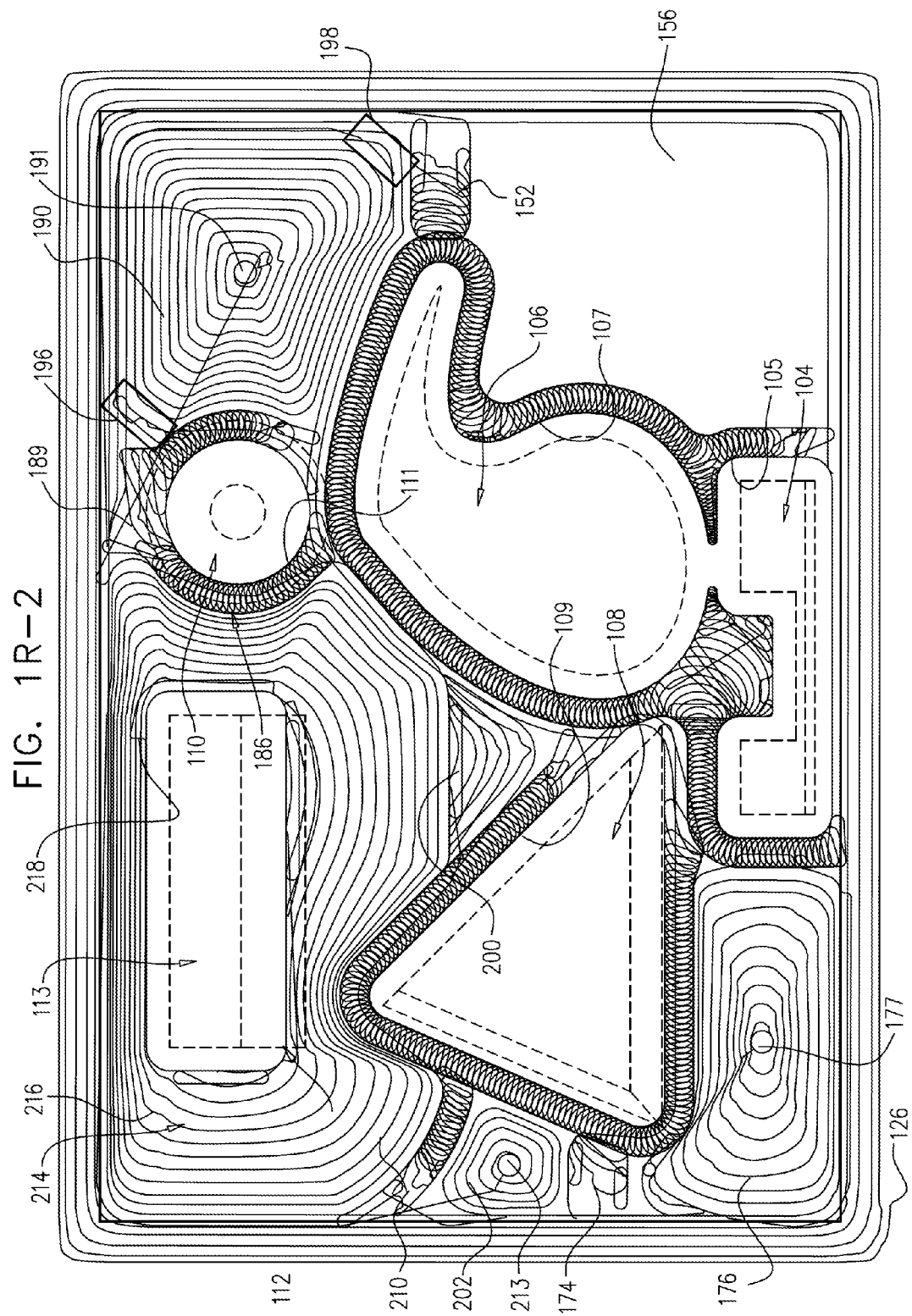

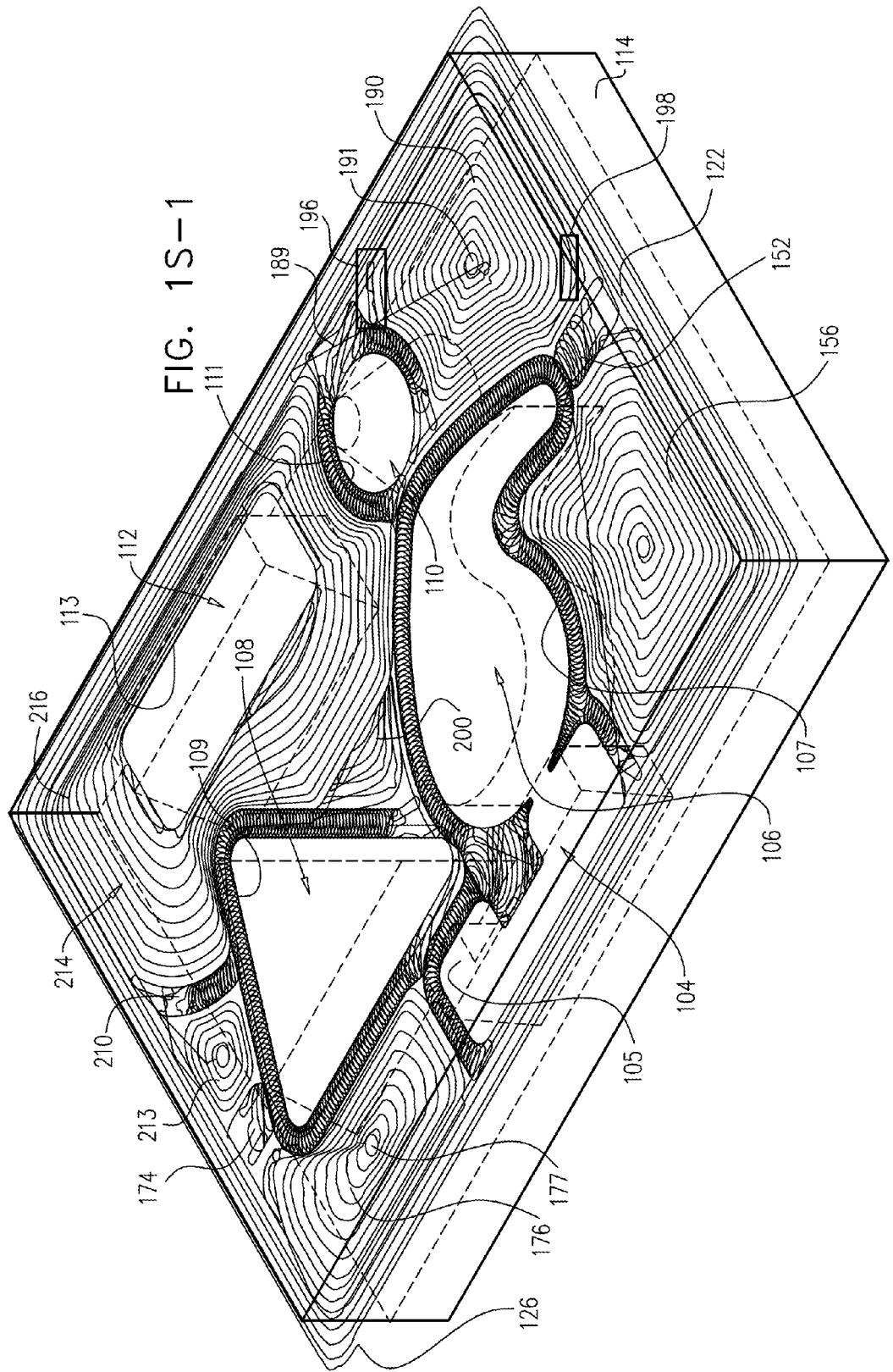

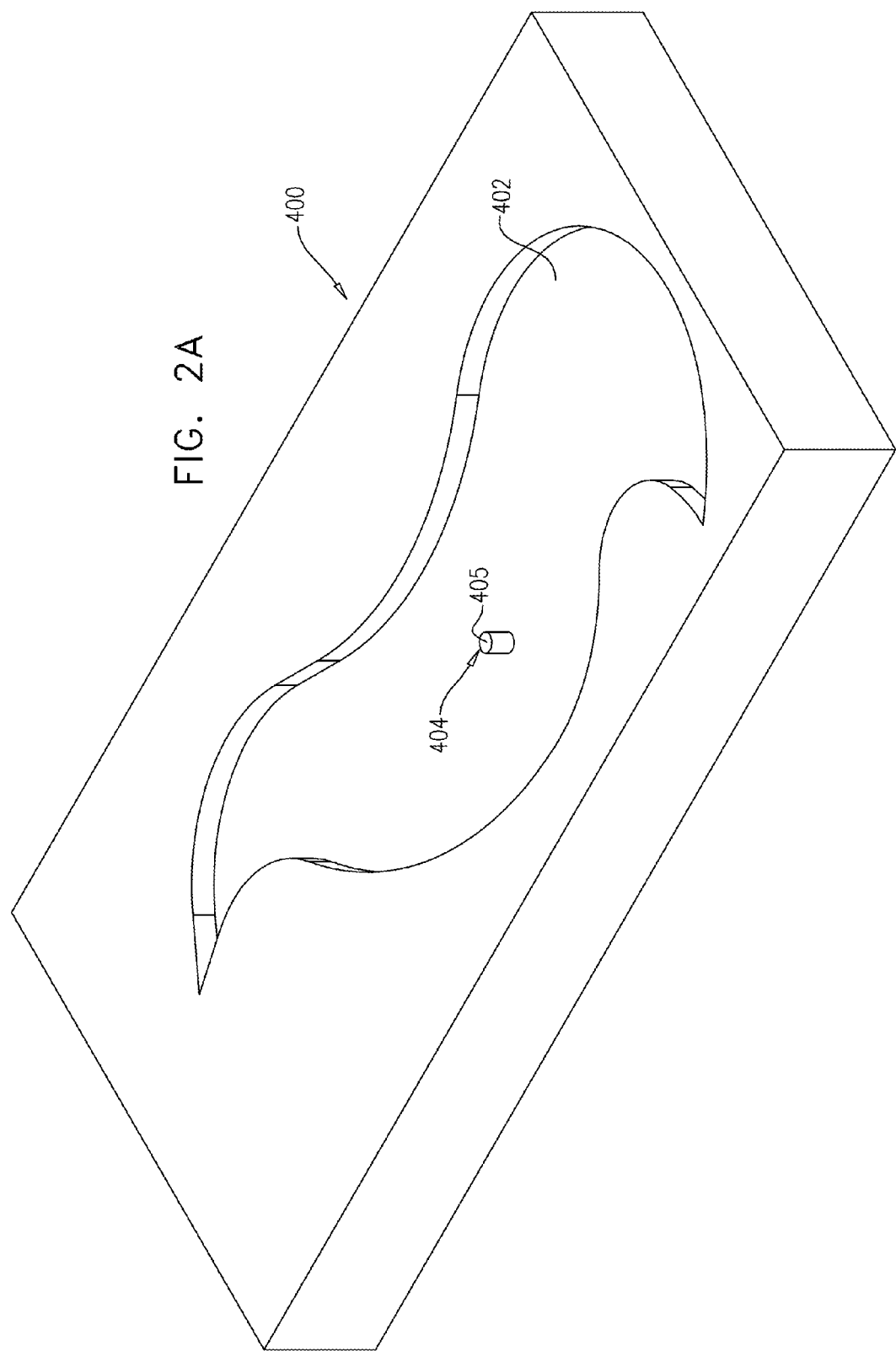

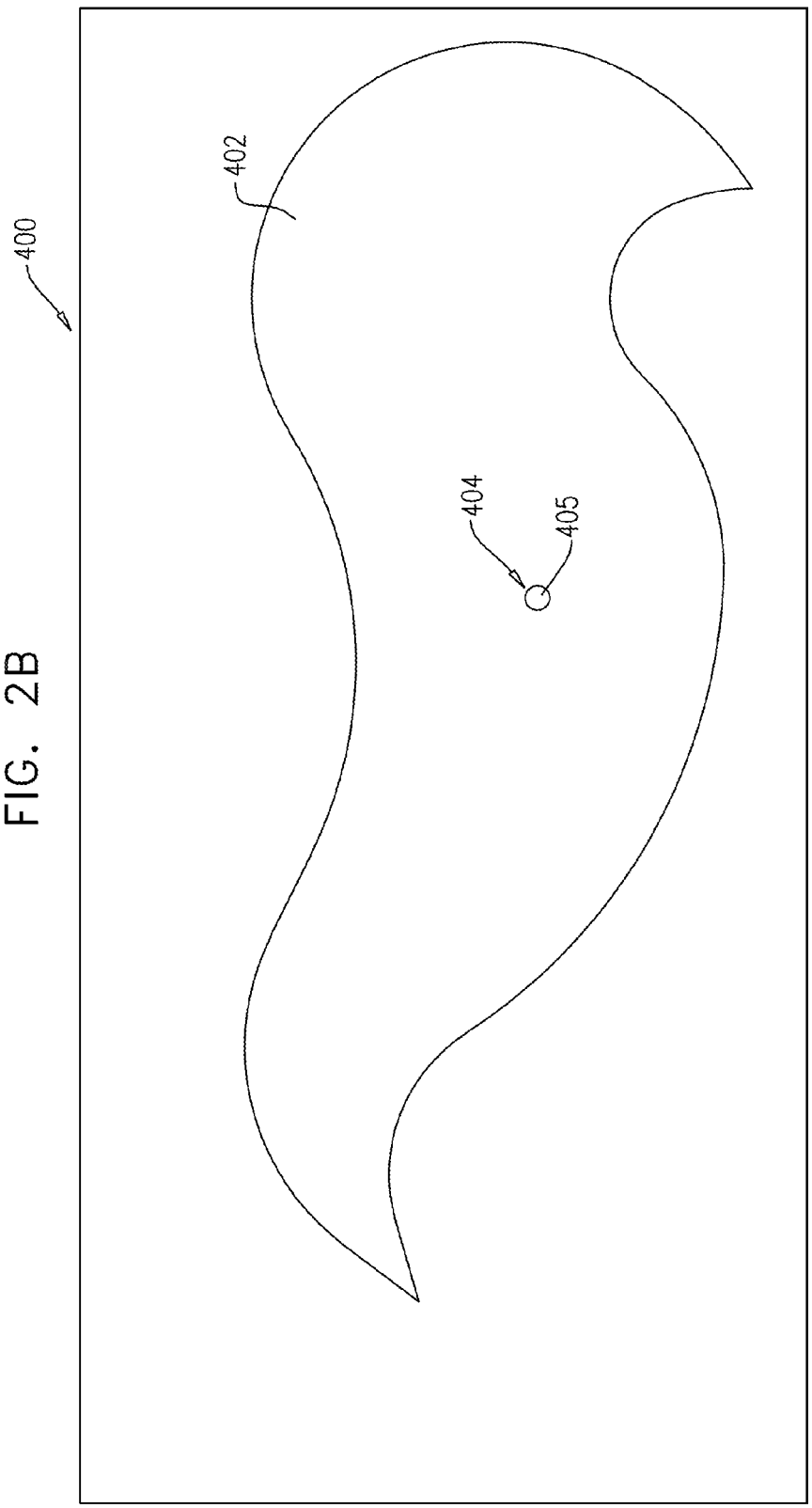

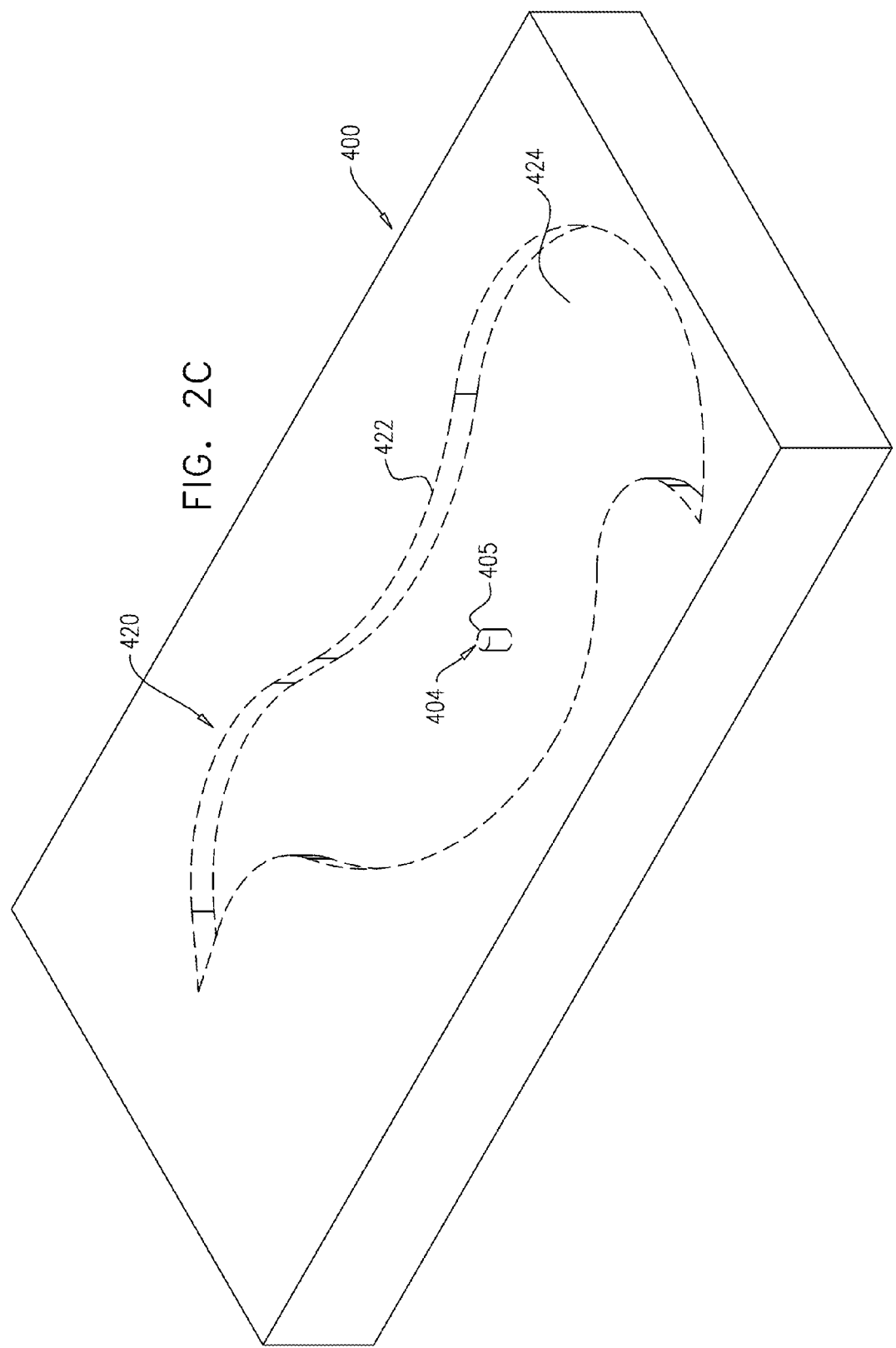

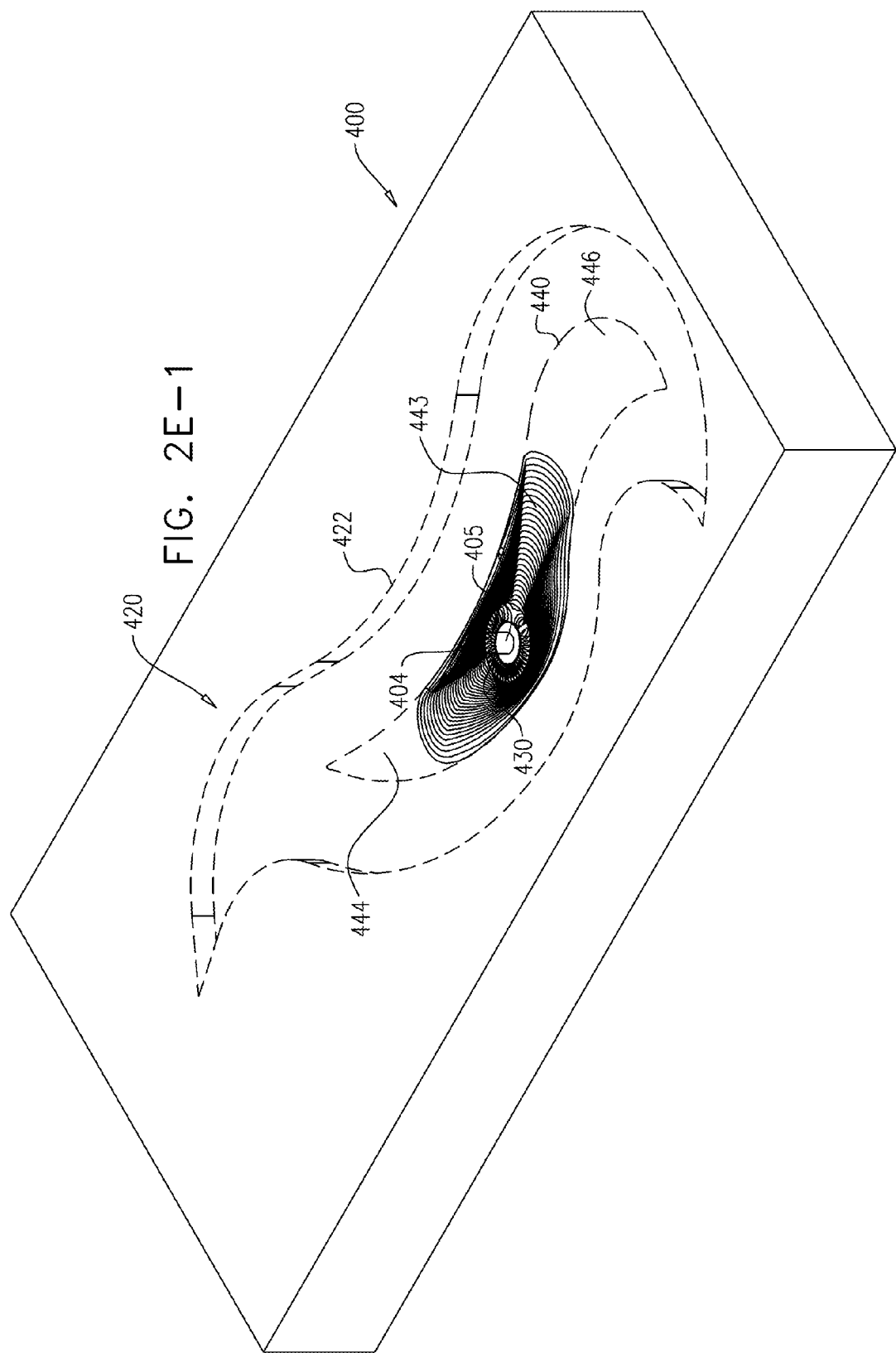

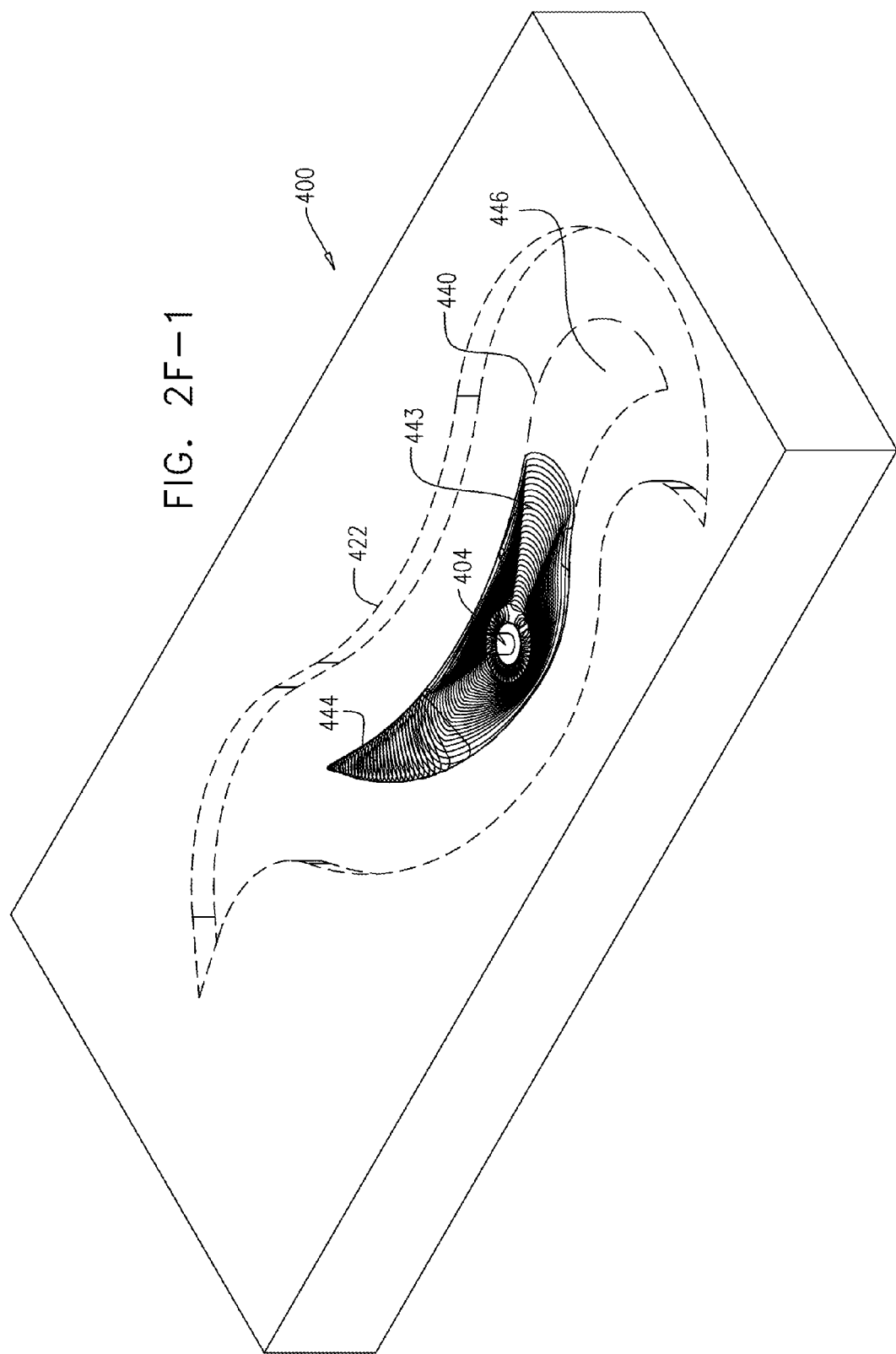

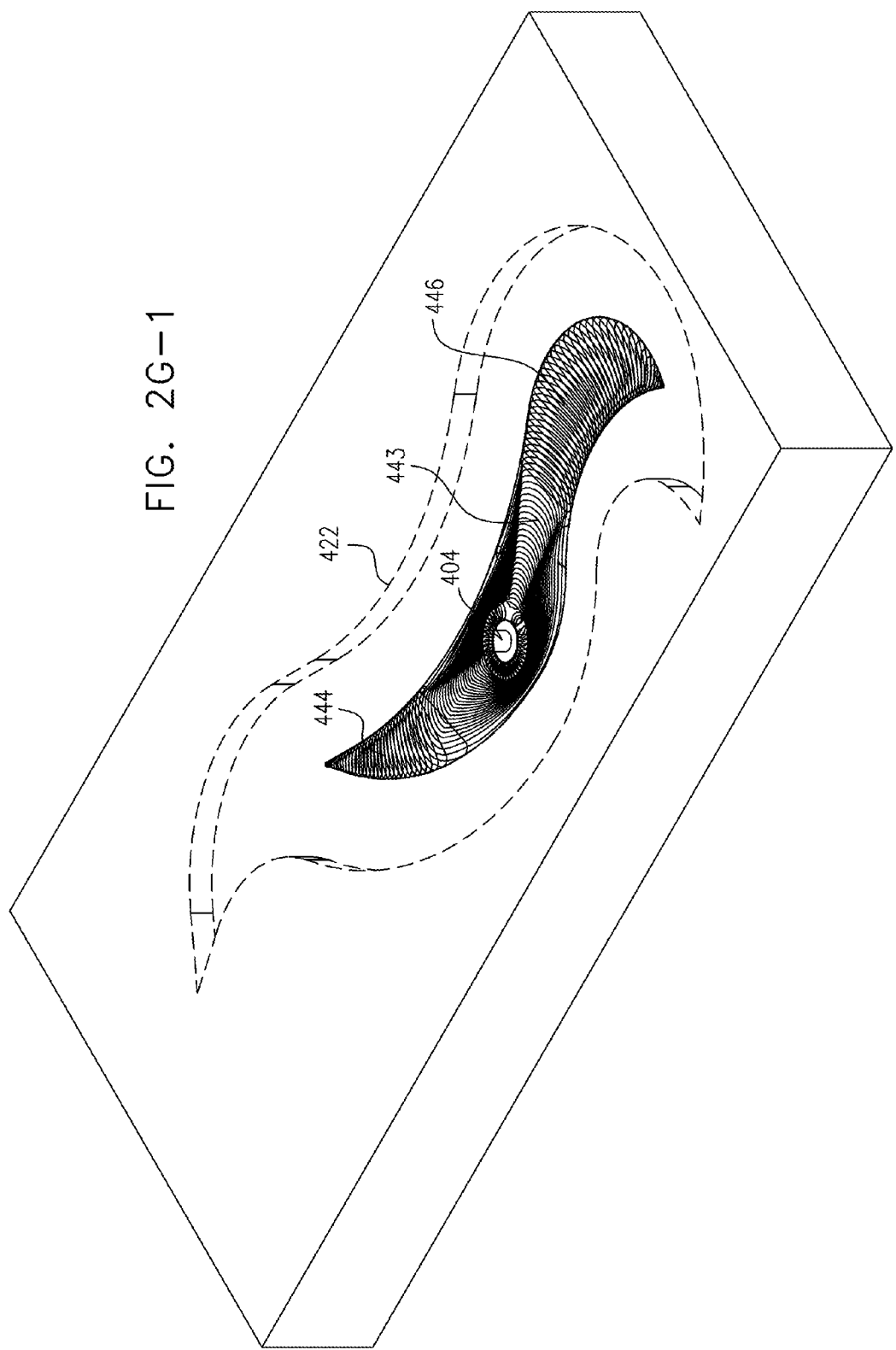

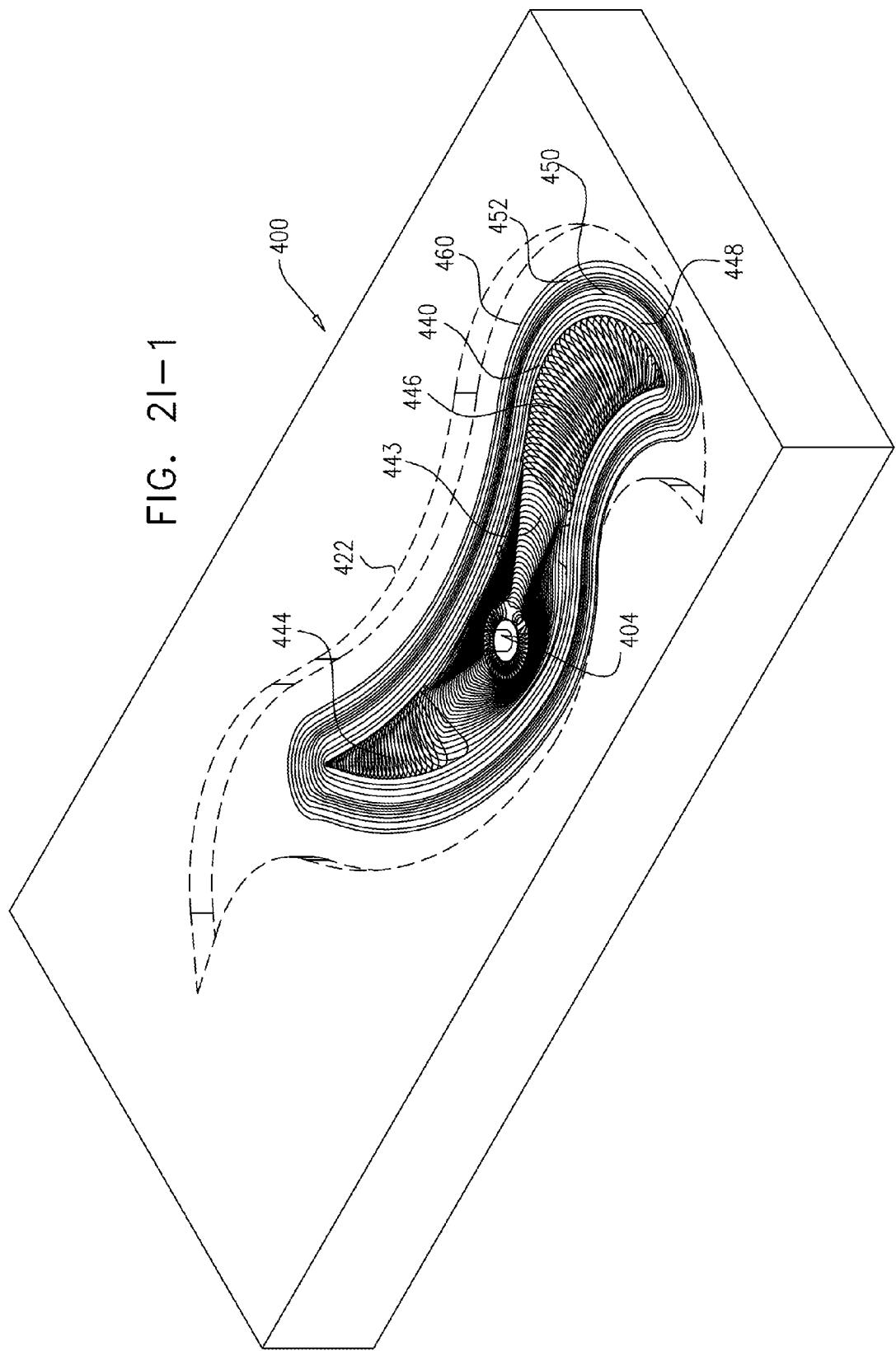

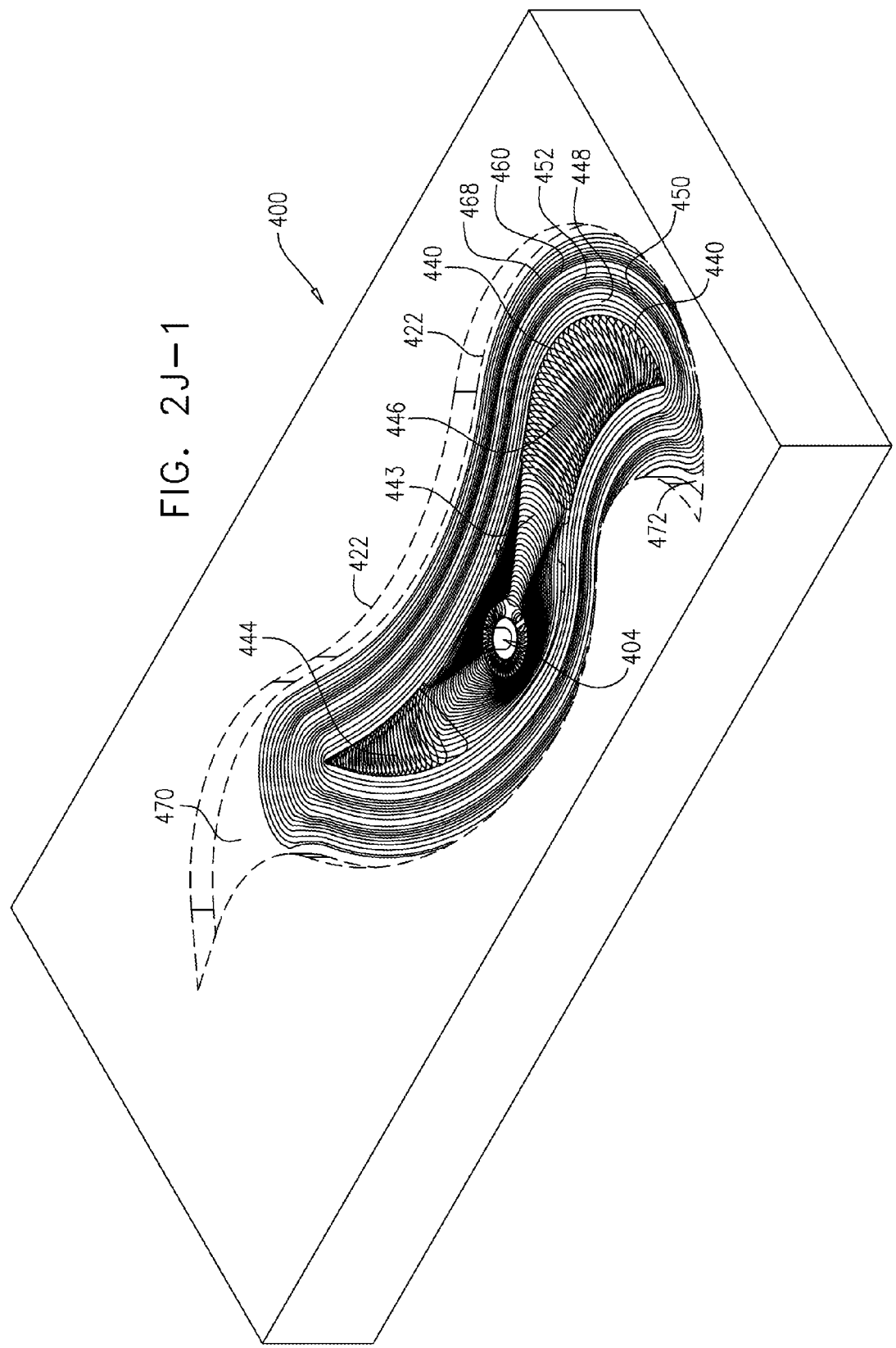

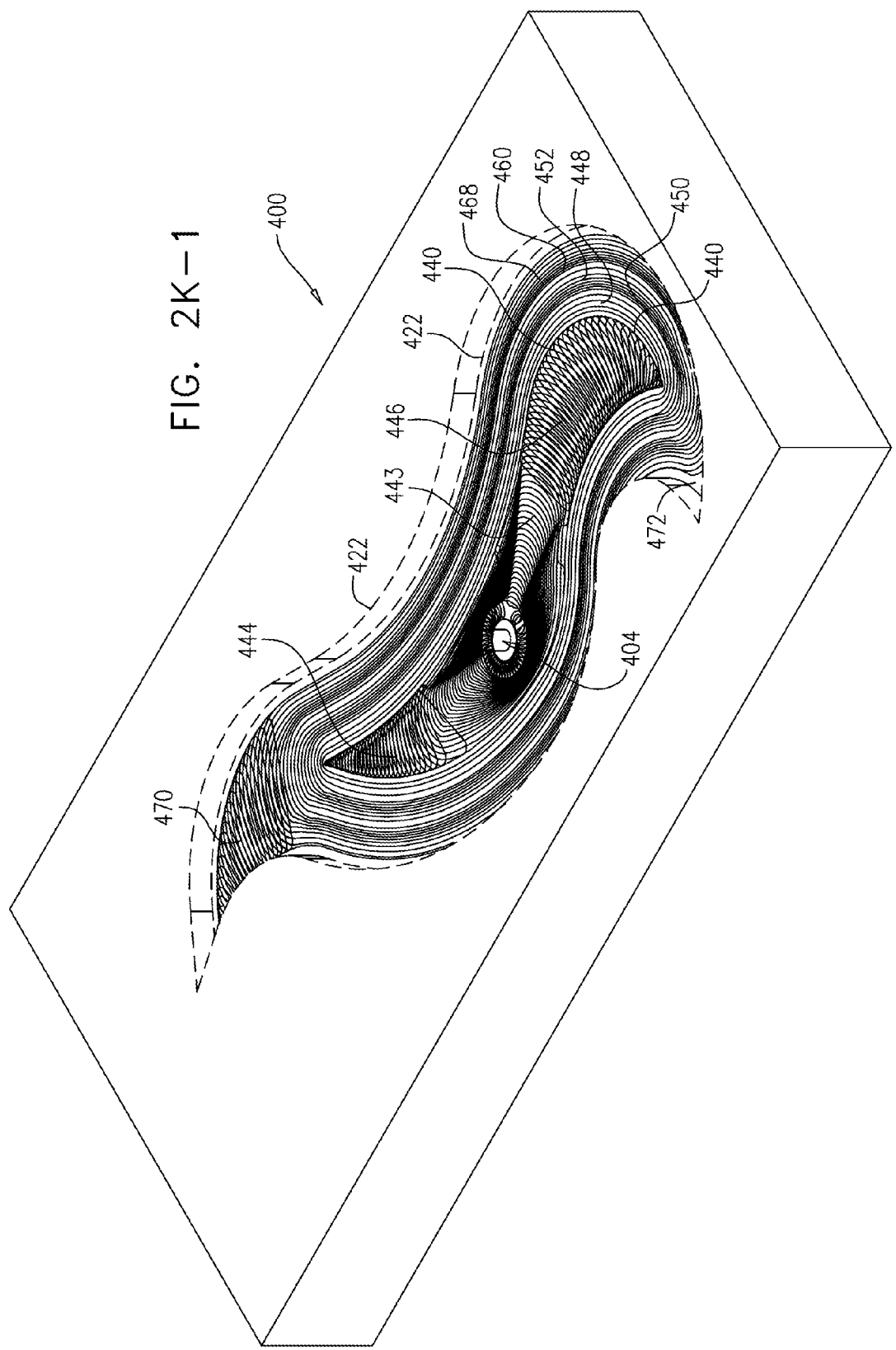

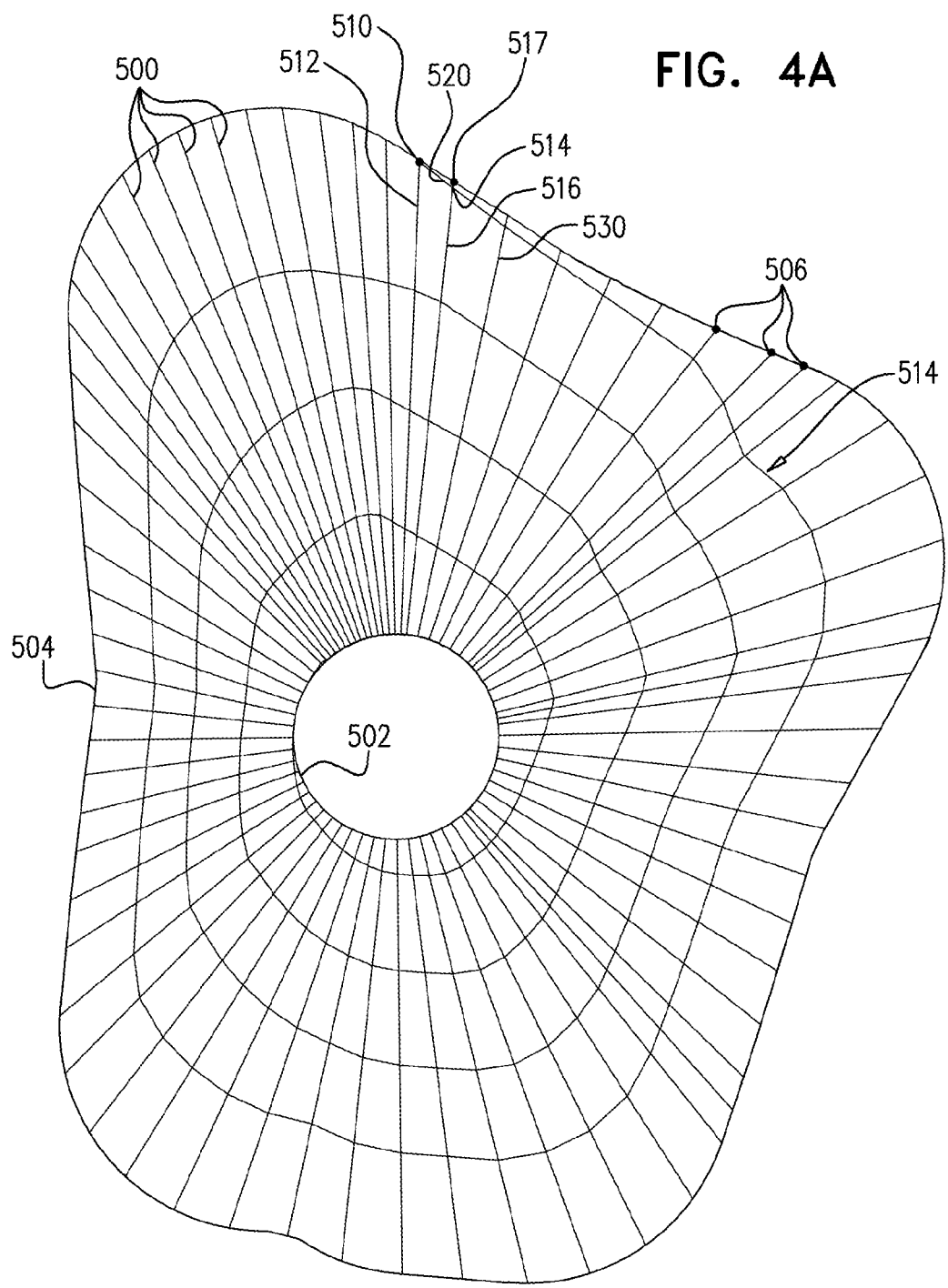

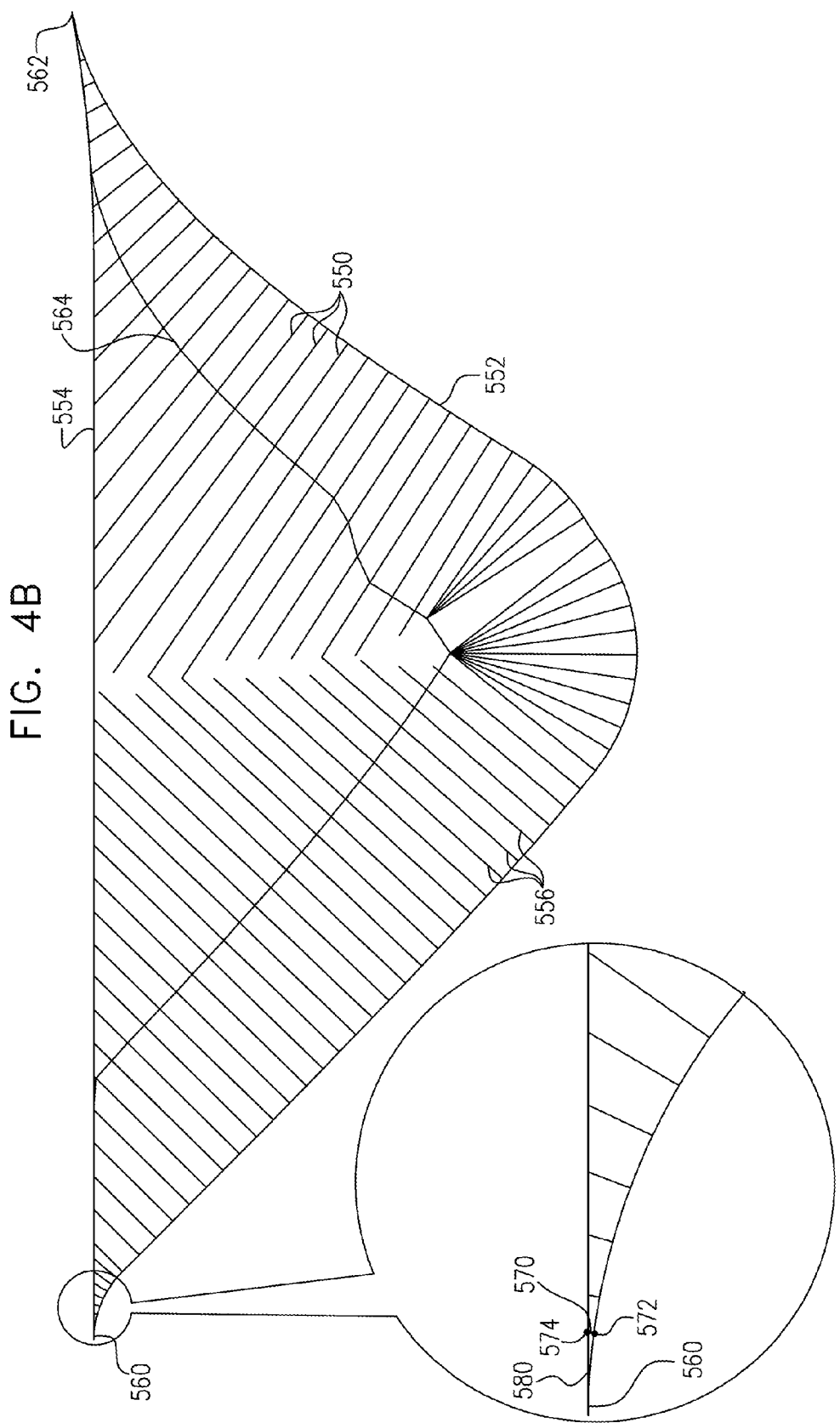

COMPUTERIZED TOOL PATH GENERATION

This is a divisional of application Ser. No. 13/036,726 filed Feb. 28, 2011; the disclosure of which is incorporated herein by reference.

FIELD OF THE INVENTION

The present invention relates to systems and methodologies for automated tool path design and computer controlled machining and products produced thereby.

BACKGROUND OF THE INVENTION

The following publications are believed to represent the current state of the art and are hereby incorporated by reference:

U.S. Pat. Nos. 4,745,558; 4,907,164; 5,363,308; 6,363,298; 6,447,223; 6,591,158; 7,451,013; 7,577,490 and 7,831,332; and US Published Patent Application No.: 2005/0256604.

SUMMARY OF THE INVENTION

The present invention seeks to provide systems and methodologies for automated tool path design and computer controlled machining and products produced thereby.

There is thus provided in accordance with a preferred embodiment of the present invention an automated computer-implemented method for generating commands for controlling a computer numerically controlled machine to fabricate an object from a workpiece, the method including the steps of selecting a maximum permitted engagement angle between a rotating cutting tool and the workpiece, selecting a minimum permitted engagement angle between the rotating cutting tool and the workpiece, and configuring a tool path for the tool relative to the workpiece in which the engagement angle gradually varies between the maximum permitted engagement angle and the minimum permitted engagement angle.

In accordance with a preferred embodiment of the present invention, responsive to consideration of at least one of characteristics of the computer numerically controlled machine, rotating cutting tool and material of the workpiece, the configuring also includes minimizing, subject to other constraints, the rate of change of the engagement angle over time, gradually changing the feed speed of the tool corresponding to the changing engagement angle, maintaining a generally constant work load on the tool, and minimizing the cost of fabricating the object, whereby the cost is a combination of the cost of operating the machine for the duration of the fabrication and the cost of the wear inflicted on the tool during the fabrication.

Preferably, the tool path includes a plurality of tool path segments and configuring a tool path includes recursively configuring each of the tool path segments, and wherein responsive to consideration of at least one of characteristics of the computer numerically controlled machine, rotating cutting tool and material of the workpiece, configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

There is also provided in accordance with another preferred embodiment of the present invention a method for machining a workpiece employing a computer controlled machine tool, the method including directing the tool along a tool path wherein an engagement angle between the tool and the workpiece gradually varies between a preselected maximum permitted engagement angle and a preselected minimum permitted engagement angle.

There is further provided in accordance with yet another preferred embodiment of the present invention an automated computer-implemented apparatus for generating commands for controlling a computer numerical controlled machine to fabricate an object from a workpiece, the apparatus including a tool path configuration engine operative for configuring a tool path for a tool relative to the workpiece in which the engagement angle gradually varies between a preselected maximum permitted engagement angle and a preselected minimum permitted engagement angle.

Preferably, the configuring includes minimizing, subject to other constraints, the rate of change of the engagement angle over time. Preferably, the configuring also includes gradually changing the feed speed of the tool corresponding to the changing engagement angle. Preferably, the configuring is also operative to maintain a generally constant work load on the tool. Preferably, the configuring is also operative to minimize the cost of fabricating the object, whereby the cost is a combination of the cost of operating the machine for the duration of the fabrication and the cost of the wear inflicted on the tool during the fabrication. The preferred features referenced in this paragraph are also applicable to all appropriate claimed embodiments of the present invention.

Preferably, the tool path includes a plurality of tool path segments and configuring a tool path includes recursively configuring each of the tool path segments, and wherein the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining. The preferred features referenced in this paragraph are also applicable to all appropriate claimed embodiments of the present invention.

Preferably, each of the tool path segments includes a plurality of tool path subsegments and recursively configuring each of the tool path segments includes recursively configuring each of the tool path subsegments, and wherein the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining. The preferred features referenced in this paragraph are also applicable to all appropriate claimed embodiments of the present invention.

Preferably, the configuring also includes considering at least one of characteristics of the computer numerically controlled machine, rotating cutting tool and material of the workpiece. The preferred features referenced in this paragraph are also applicable to all appropriate claimed embodiments of the present invention.

There is yet further provided in accordance with still another preferred embodiment of the present invention an automated computer-controlled machine to fabricate an object from a workpiece, the machine including a controller operative for directing a rotating cutting tool along a tool path relative to the workpiece in which an engagement angle between the tool and the workpiece gradually varies between a preselected maximum permitted engagement angle and a preselected minimum permitted engagement angle.

There is yet further provided in accordance with still another preferred embodiment of the present invention an object fabricated from a workpiece machined using a computer controlled machine tool by directing a rotating cutting tool along a tool path wherein an engagement angle between the rotating cutting tool and the workpiece gradually varies between a preselected maximum permitted engagement angle and a preselected minimum permitted engagement angle.

There is yet further provided in accordance with still another preferred embodiment of the present invention an automated computer-implemented method for generating commands for controlling a computer numerical controlled machine to fabricate an object from a workpiece, the method including the steps of selecting a region of the workpiece to be removed by a rotating cutting tool, configuring an asymmetric spiral tool path for the rotating cutting tool in the region of the workpiece, which asymmetric spiral tool path maximizes the portion of the region of the workpiece which is removed by the rotating cutting tool moving along the asymmetric spiral tool path.

Preferably, the method also includes configuring at least one trochoidal-like tool path for the rotating cutting tool in a remaining portion of the region of the workpiece which is removed by the tool moving along the trochoidal-like tool path.

Preferably, the method also includes selecting a maximum permitted engagement angle between a rotating cutting tool and the workpiece, selecting a minimum permitted engagement angle between the rotating cutting tool and the workpiece, and configuring the asymmetric spiral tool path and the at least one trochoidal-like tool path relative to the workpiece so that the engagement angle gradually varies between the maximum permitted engagement angle and the minimum permitted engagement angle.

Preferably, responsive to consideration of at least one of characteristics of the computer numerically controlled machine, rotating cutting tool and material of the workpiece, the configuring also includes minimizing, subject to other constraints, the rate of change of the engagement angle over time, gradually changing the feed speed of the tool corresponding to the changing engagement angle, maintaining a generally constant work load on the tool, and minimizing the cost of fabricating the object, whereby the cost is a combination of the cost of operating the machine for the duration of the fabrication and the cost of the wear inflicted on the tool during the fabrication.

Preferably, the asymmetric spiral tool path includes a plurality of spiral tool path segments, the at least one trochoidal-like tool path includes a plurality of trochoidal-like tool path segments, configuring an asymmetric spiral tool path includes recursively configuring each of the spiral tool path segments, and configuring at least one trochoidal-like tool path includes recursively configuring each of the trochoidal-like tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

Preferably, the asymmetric spiral tool path is one of a converging spiral tool path and a diverging spiral tool path.

There is yet further provided in accordance with still another preferred embodiment of the present invention a method for machining a workpiece employing a computer controlled machine tool, the method including selecting a region of the workpiece to be removed by a rotating cutting tool, and directing the tool along an asymmetric spiral tool path in the region of the workpiece, wherein the asymmetric spiral tool path maximizes the portion of the region of the workpiece which is removed by the rotating cutting tool moving along the asymmetric spiral tool path. Preferably, the method also includes directing the rotating cutting tool along at least one trochoidal-like tool path in a remaining portion of the region of the workpiece which is removed by the tool moving along the trochoidal-like tool path.

There is yet further provided in accordance with still another preferred embodiment of the present invention an automated computer-implemented apparatus for generating commands for controlling a computer numerical controlled machine to fabricate an object from a workpiece, the apparatus including a tool path configuration engine operative for selecting a region of the workpiece to be removed by a rotating cutting tool, and for configuring an asymmetric spiral tool path for the rotating cutting tool in the region of the workpiece, which spiral tool path maximizes the portion of the region of the workpiece which is removed by the rotating cutting tool moving along the asymmetric spiral tool path.

Preferably, the tool path configuration engine is also operative for configuring at least one trochoidal-like tool path for the rotating cutting tool in a remaining portion of the region of the workpiece which is removed by the tool moving along the trochoidal-like tool path.

Preferably, the configuring includes selecting a maximum permitted engagement angle between a rotating cutting tool and the workpiece, selecting a minimum permitted engagement angle between the rotating cutting tool and the workpiece, and configuring the asymmetric spiral tool path and the at least one trochoidal-like tool path relative to the workpiece so that the engagement angle gradually varies between the maximum permitted engagement angle and the minimum permitted engagement angle.

Preferably, the configuring includes minimizing, subject to other constraints, the rate of change of the engagement angle over time. Preferably, the configuring also includes gradually changing the feed speed of the tool corresponding to the changing engagement angle. Preferably, the configuring is also operative to maintain a generally constant work load on the tool. Preferably, the configuring is also operative to minimize the cost of fabricating the object, whereby the cost is a combination of the cost of operating the machine for the duration of the fabrication and the cost of the wear inflicted on the tool during the fabrication.

Preferably, the asymmetric spiral tool path includes a plurality of spiral tool path segments, the at least one trochoidal-like tool path includes a plurality of trochoidal-like tool path segments, configuring an asymmetric spiral tool path includes recursively configuring each of the spiral tool path segments, and configuring at least one trochoidal-like tool path includes recursively configuring each of the trochoidal-like tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

Preferably, the asymmetric spiral tool path is one of a converging spiral tool path and a diverging spiral tool path.

There is yet further provided in accordance with still another preferred embodiment of the present invention an automated computer-controlled machine to fabricate an object from a workpiece, the machine including a controller operative for selecting a region of the workpiece to be removed by a rotating cutting tool, and for directing the rotating cutting tool along an asymmetric spiral tool path in the region of the workpiece, which spiral tool path maximizes the portion of the region of the workpiece which is removed by the rotating cutting tool moving along the asymmetric spiral tool path.

Preferably, the controller is also operative for directing the rotating cutting tool along at least one trochoidal-like tool path in a remaining portion of the region of the workpiece which is removed by the tool moving along the trochoidal-like tool path.

There is yet further provided in accordance with still another preferred embodiment of the present invention an object fabricated from a workpiece machined using a computer controlled machine tool by selecting a region of the workpiece to be removed by a rotating cutting tool and by directing the rotating cutting tool along an asymmetric spiral tool path in the region of the workpiece, which spiral tool path maximizes the portion of the region of the workpiece which is removed by the rotating cutting tool moving along the asymmetric spiral tool path.

Preferably, the object is fabricated also by directing the rotating cutting tool along at least one trochoidal-like tool path in a remaining portion of the region of the workpiece which is removed by the tool moving along the trochoidal-like tool path.

There is yet further provided in accordance with still another preferred embodiment of the present invention an automated computer-implemented method for generating commands for controlling a computer numerical controlled machine to fabricate an object from a workpiece, the method including the steps of selecting a region of the workpiece to be removed by a rotating cutting tool, selecting a first portion of the region to be removed by an asymmetric spiral tool path, and configuring at least one trochoidal-like tool path for removing a remaining portion of the region, and wherein the selecting a first portion of the region is operative to minimize the machining time necessary to remove the region.

Preferably, the method also includes selecting a maximum permitted engagement angle between a tool and the workpiece, selecting a minimum permitted engagement angle between the tool and the workpiece, and configuring the asymmetric spiral tool path and the at least one trochoidal-like tool path relative to the workpiece so that the engagement angle gradually varies between the maximum permitted engagement angle and the minimum permitted engagement angle.

Preferably, responsive to consideration of at least one of characteristics of the computer numerically controlled machine, rotating cutting tool and material of the workpiece, the configuring also includes minimizing, subject to other constraints, the rate of change of the engagement angle over time, gradually changing the feed speed of the tool corresponding to the changing engagement angle, maintaining a generally constant work load on the tool, and minimizing the cost of fabricating the object, whereby the cost is a combination of the cost of operating the machine for the duration of the fabrication and the cost of the wear inflicted on the tool during the fabrication.

Preferably, the asymmetric spiral tool path includes a plurality of spiral tool path segments, the at least one trochoidal-like tool path includes a plurality of trochoidal-like tool path segments, the configuring an asymmetric spiral tool path includes recursively configuring each of the spiral tool path segments, the configuring at least one trochoidal-like tool path includes recursively configuring each of the trochoidal-like tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Preferably, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

Preferably, the asymmetric spiral tool path is one of a converging spiral tool path and a diverging spiral tool path.

There is yet further provided in accordance with still another preferred embodiment of the present invention a method for machining a workpiece employing a computer controlled machine tool, the method including selecting a region of the workpiece to be removed by a rotating cutting tool, selecting a first portion of the region to be removed by an asymmetric spiral tool path, and directing the tool along at least one trochoidal-like tool path in a remaining portion of the region of the workpiece, and wherein selecting a first portion of the region is operative to minimize the machining time necessary to remove the region.

There is yet further provided in accordance with still another preferred embodiment of the present invention an automated computer-implemented apparatus for generating commands for controlling a computer numerical controlled machine to fabricate an object from a workpiece, the apparatus including a tool path configuration engine operative for selecting a region of the workpiece to be removed by a rotating cutting tool, selecting a first portion of the region to be removed by an asymmetric spiral tool path and for configuring at least one trochoidal-like tool path for removing a remaining portion of the region, and wherein the selecting a first portion of the region is operative to minimize the machining time necessary to remove the region.

Preferably, the configuring includes selecting a maximum permitted engagement angle between a rotating cutting tool and the workpiece, selecting a minimum permitted engagement angle between the rotating cutting tool and the workpiece, and configuring the asymmetric spiral tool path and the at least one trochoidal-like tool path relative to the workpiece so that the engagement angle gradually varies between the maximum permitted engagement angle and the minimum permitted engagement angle.

Preferably, the configuring includes minimizing, subject to other constraints, the rate of change of the engagement angle over time. Preferably, the configuring also includes gradually changing the feed speed of the tool corresponding to the changing engagement angle. Preferably, the configuring is also operative to maintain a generally constant work load on the tool. Preferably, the configuring is also operative to minimize the cost of fabricating the object, whereby the cost is a combination of the cost of operating the machine for the duration of the fabrication and the cost of the wear inflicted on the tool during the fabrication.

Preferably, the asymmetric spiral tool path includes a plurality of spiral tool path segments, the at least one trochoidal-like tool path includes a plurality of trochoidal-like tool path segments, configuring an asymmetric spiral tool path includes recursively configuring each of the spiral tool path segments and configuring at least one trochoidal-like tool path includes recursively configuring each of the trochoidal-like tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool and minimizing the cost of machining the each of the tool path subsegments, whereby the cost is a combination of the cost of operating the machine for the duration of the machining and the cost of the wear inflicted on the tool during the machining.

Preferably, the asymmetric spiral tool path is one of a converging spiral tool path and a diverging spiral tool path.

There is yet further provided in accordance with still another preferred embodiment of the present invention an automated computer-controlled machine to fabricate an object from a workpiece, the machine including a controller operative for selecting a region of the workpiece to be removed by a rotating cutting tool, selecting a first portion of the region to be removed by an asymmetric spiral tool path and for directing the rotating cutting tool along at least one trochoidal-like tool path in the region of the workpiece, and wherein the selecting a first portion of the region is operative to minimize the machining time necessary to remove the region.

There is yet further provided in accordance with still another preferred embodiment of the present invention an object fabricated from a workpiece machined using a computer controlled machine tool by selecting a region of the workpiece to be removed by a rotating cutting tool, selecting a first portion of the region to be removed by an asymmetric spiral tool path and by directing the rotating cutting tool along at least one trochoidal-like tool path in the region of the workpiece, and wherein the selecting a first portion of the region is operative to minimize the machining time necessary to remove the region.

There is yet further provided in accordance with still another preferred embodiment of the present invention an automated computer-implemented method for generating commands for controlling a computer numerical controlled machine to fabricate an object from a workpiece by removing portions of the workpiece which are not to be included in the object, the method including the steps of considering the cross section of a desired object to be fabricated from a workpiece, defining isolated regions of the cross section on the workpiece surface which are not to be removed as islands, commencing configuring of a tool path in a region not having islands, and upon the tool path encountering an island, configuring a moat tool path which defines a moat surrounding the island.

Preferably, the method also includes defining a composite region including the island, the moat surrounding the island and regions already removed from the workpiece as a removed region and configuring a tool path to remove a remaining region of the workpiece, which remaining region does not include the removed region.

Preferably, the method also includes selecting a maximum permitted engagement angle between a tool and the workpiece, selecting a minimum permitted engagement angle between the tool and the workpiece and configuring the moat tool path relative to the workpiece so that the engagement angle gradually varies between the maximum permitted engagement angle and the minimum permitted engagement angle.

Preferably, responsive to consideration of at least one of characteristics of the computer numerically controlled machine, rotating cutting tool and material of the workpiece, the configuring also includes minimizing, subject to other constraints, the rate of change of the engagement angle over time, gradually changing the feed speed of the tool corresponding to the changing engagement angle, maintaining a generally constant work load on the tool and minimizing the cost of fabricating the object, whereby the cost is a combination of the cost of operating the machine for the duration of the fabrication and the cost of the wear inflicted on the tool during the fabrication.

Additionally, the tool paths include a plurality of tool path segments and configuring the tool paths includes recursively configuring each of the tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

There is yet further provided in accordance with still another preferred embodiment of the present invention a method for machining a workpiece employing a computer controlled machine tool, the method including considering the cross section of a desired object to be fabricated from a workpiece, defining isolated regions of the cross section on the workpiece surface which are not to be removed as islands, initially directing the tool along a tool path in a region not having islands, and upon the tool path encountering an island, directing the tool along a moat tool path which defines a moat surrounding the island.

There is yet further provided in accordance with still another preferred embodiment of the present invention an automated computer-implemented apparatus for generating commands for controlling a computer numerical controlled machine to fabricate an object from a workpiece, the apparatus including a tool path configuration engine operative for considering the cross section of a desired object to be fabricated from a workpiece, defining isolated regions of the cross section on the workpiece surface which are not to be removed as islands, commencing configuring of a tool path in a region not having islands, and upon the tool path encountering an island, for configuring a moat tool path which defines a moat surrounding the island.

Preferably, the configuration engine is also operative for defining a composite region including the island, the moat surrounding the island and regions already removed from the workpiece as a removed region and for configuring a tool path to remove a remaining region of the workpiece, which remaining region does not include the removed region.

Preferably, the configuration engine is also operative for selecting a maximum permitted engagement angle between a tool and the workpiece, selecting a minimum permitted engagement angle between the tool and the workpiece and for configuring the moat tool path relative to the workpiece so that the engagement angle gradually varies between the maximum permitted engagement angle and the minimum permitted engagement angle.

Preferably, responsive to consideration of at least one of characteristics of the computer numerically controlled machine, rotating cutting tool and material of the workpiece, the configuring also includes minimizing, subject to other constraints, the rate of change of the engagement angle over time, gradually changing the feed speed of the tool corresponding to the changing engagement angle, maintaining a generally constant work load on the tool, and minimizing the cost of fabricating the object, whereby the cost is a combination of the cost of operating the machine for the duration of the fabrication and the cost of the wear inflicted on the tool during the fabrication.

Additionally, the tool paths include a plurality of tool path segments and configuring tool paths includes recursively configuring each of the tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

There is yet further provided in accordance with still another preferred embodiment of the present invention an automated computer-controlled machine to fabricate an object from a workpiece, the machine including a controller operative for considering the cross section of a desired object to be fabricated from a workpiece, defining isolated regions of the cross section on the workpiece surface which are not to be removed as islands, and for initially directing the tool along a tool path in a region not having islands, and upon the tool path encountering an island, for directing the tool along a tool path which defines a moat surrounding the island.

There is yet further provided in accordance with still another preferred embodiment of the present invention an object fabricated from a workpiece machined using a computer controlled machine tool by considering the cross section of a desired object to be fabricated from a workpiece, defining isolated regions of the cross section on the workpiece surface which are not to be removed as islands, initially directing the tool along a tool path in a region not having islands, and upon the tool path encountering an island, directing the tool along a tool path which defines a moat surrounding the island.

There is yet further provided in accordance with still another preferred embodiment of the present invention an automated computer-implemented method for generating commands for controlling a computer numerical controlled machine to fabricate an object from a workpiece by removing portions of the workpiece which are not to be included in the object, the method including the steps of identifying at least one open region for which a first machining time needed to remove the region is longer than a second machining time needed to divide the region into two independent regions by removing a separating channel by a rotating cutting tool between the two independent regions and removing the two independent regions, and defining in the region at least one separating channel extending between two points on edges of an external boundary of the region, thereby dividing the region into at least two independent regions.

Preferably, the method also includes configuring at least one trochoidal-like tool path for the rotating cutting tool in the separating channel which is removed by the tool moving along the trochoidal-like tool path.

Preferably, the method also includes selecting a maximum permitted engagement angle between a rotating cutting tool and the workpiece, selecting a minimum permitted engagement angle between the rotating cutting tool and the workpiece, and configuring the at least one trochoidal-like tool path relative to the workpiece so that the engagement angle gradually varies between the maximum permitted engagement angle and the minimum permitted engagement angle.

Additionally, responsive to consideration of at least one of characteristics of the computer numerically controlled machine, rotating cutting tool and material of the workpiece, the configuring also includes minimizing, subject to other constraints, the rate of change of the engagement angle over time, gradually changing the feed speed of the tool corresponding to the changing engagement angle, maintaining a generally constant work load on the tool and minimizing the cost of fabricating the object, whereby the cost is a combination of the cost of operating the machine for the duration of the fabrication and the cost of the wear inflicted on the tool during the fabrication.

Preferably, the at least one trochoidal-like tool path includes a plurality of trochoidal-like tool path segments and configuring at least one trochoidal-like tool path includes recursively configuring each of the trochoidal-like tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

There is yet further provided in accordance with still another preferred embodiment of the present invention a method for machining a workpiece employing a computer controlled machine tool, the method including identifying at least one open region for which a first machining time needed to remove the region is longer than a second machining time needed to divide the region into two independent regions by removing a separating channel by a rotating cutting tool between the two independent regions and removing the two independent regions, and directing the tool along a trochoidal-like tool path in the at least one separating channel extending between two points on edges of an external boundary of the region, thereby dividing the region into at least two independent regions.

There is yet further provided in accordance with still another preferred embodiment of the present invention an automated computer-implemented apparatus for generating commands for controlling a computer numerical controlled machine to fabricate an object from a workpiece by removing portions of the workpiece which are not to be included in the object, the apparatus including a tool path configuration engine operative for identifying at least one open region for which a first machining time needed to remove the region is longer than a second machining time needed to divide the region into two independent regions by removing a separating channel by a rotating cutting tool between the two independent regions and removing the two independent regions, and for defining in the region at least one separating channel extending between two points on edges of an external boundary of the region, thereby dividing the region into at least two independent regions.

Preferably, the tool path configuration engine is also operative for configuring at least one trochoidal-like tool path for the rotating cutting tool in the separating channel which is removed by the tool moving along the trochoidal-like tool path.

Additionally, the configuring includes selecting a maximum permitted engagement angle between a rotating cutting tool and the workpiece, selecting a minimum permitted engagement angle between the rotating cutting tool and the workpiece, and configuring the at least one trochoidal-like tool path relative to the workpiece so that the engagement angle gradually varies between the maximum permitted engagement angle and the minimum permitted engagement angle.

Additionally, responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of fabricating the object, whereby the cost is a combination of the cost of operating the machine for the duration of the fabrication and the cost of the wear inflicted on the tool during the fabrication.

Additionally, the at least one trochoidal-like tool path includes a plurality of trochoidal-like tool path segments and the configuring at least one trochoidal-like tool path includes recursively configuring each of the trochoidal-like tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

There is yet further provided in accordance with still another preferred embodiment of the present invention an automated computer-controlled machine to fabricate an object from a workpiece, the machine including a controller operative for identifying at least one open region for which a first machining time needed to remove the region is longer than a second machining time needed to divide the region into two independent regions by removing a separating channel by a rotating cutting tool between the two independent regions and removing the two independent regions, and for directing the tool along a trochoidal-like tool path in the at least one separating channel extending between two points on edges of an external boundary of the region, thereby dividing the region into at least two independent regions.

There is yet further provided in accordance with still another preferred embodiment of the present invention an object fabricated from a workpiece machined using a computer controlled machine tool by identifying at least one open region for which a first machining time needed to remove the region is longer than a second machining time needed to divide the region into two independent regions by removing a separating channel by a rotating cutting tool between the two independent regions and removing the two independent regions, and defining in the region at least one separating channel extending between two points on edges of an external boundary of the region, thereby dividing the region into at least two independent regions.

Preferably, the object is fabricated also by directing the rotating cutting tool along at least one trochoidal-like tool in the separating channel which is removed by the tool moving along the trochoidal-like tool path.

There is yet further provided in accordance with still another preferred embodiment of the present invention an automated computer-implemented method for generating commands for controlling a computer numerical controlled machine to fabricate an object from a workpiece by removing portions of the workpiece which are not to be included in the object, and including the steps of identifying at least one semi-open region for which a first machining time needed to remove the region by employing a trochoidal-like tool path is longer than a second machining time needed to isolate the region by removing separating channels between the region and all closed external boundary segments of the region and removing the remainder of the region, and defining in the region to be removed at least one separating channel between the region and all closed external boundary segments of the region, thereby defining a remaining open region to be removed.

Preferably, the method also includes configuring at least one trochoidal-like tool path for the rotating cutting tool in the separating channel which is removed by the tool moving along the at least one trochoidal-like tool path.

Preferably, the method also includes selecting a maximum permitted engagement angle between a rotating cutting tool and the workpiece, selecting a minimum permitted engagement angle between the rotating cutting tool and the workpiece, and configuring the at least one trochoidal-like tool path relative to the workpiece so that the engagement angle gradually varies between the maximum permitted engagement angle and the minimum permitted engagement angle.

Additionally, responsive to consideration of at least one of characteristics of the computer numerically controlled machine, rotating cutting tool and material of the workpiece, the configuring also includes minimizing, subject to other constraints, the rate of change of the engagement angle over time, gradually changing the feed speed of the tool corresponding to the changing engagement angle, maintaining a generally constant work load on the tool, and minimizing the cost of fabricating the object, whereby the cost is a combination of the cost of operating the machine for the duration of the fabrication and the cost of the wear inflicted on the tool during the fabrication.

Preferably, the at least one trochoidal-like tool path includes a plurality of trochoidal-like tool path segments and the configuring at least one trochoidal-like tool path includes recursively configuring each of the trochoidal-like tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

There is yet further provided in accordance with still another preferred embodiment of the present invention a method for machining a workpiece employing a computer controlled machine tool, the method including identifying at least one semi-open region for which a first machining time needed to remove the region by employing a trochoidal-like tool path is longer than a second machining time needed to isolate the region by removing separating channels between the region and all closed external boundary segments of the region and removing the remainder of the region, and defining in the region to be removed at least one separating channel between the region and all closed external boundary segments of the region, thereby defining a remaining open region to be removed.

There is yet further provided in accordance with still another preferred embodiment of the present invention an automated computer-implemented apparatus for generating commands for controlling a computer numerical controlled machine to fabricate an object from a workpiece by removing portions of the workpiece which are not to be included in the object, the apparatus including a tool path configuration engine operative for identifying at least one semi-open region for which a first machining time needed to remove the region by employing a trochoidal-like tool path is longer than a second machining time needed to isolate the region by removing separating channels between the region and all closed external boundary segments of the region and removing the remainder of the region, and for defining in the region to be removed at least one separating channel between the region and all closed external boundary segments of the region, thereby defining a remaining open region to be removed.

Preferably, the tool path configuration engine is also operative for configuring at least one trochoidal-like tool path for the rotating cutting tool in the separating channel which is removed by the tool moving along the trochoidal-like tool path.

Additionally, the configuring includes selecting a maximum permitted engagement angle between a rotating cutting tool and the workpiece, selecting a minimum permitted engagement angle between the rotating cutting tool and the workpiece, and configuring the at least one trochoidal-like tool path relative to the workpiece so that the engagement angle gradually varies between the maximum permitted engagement angle and the minimum permitted engagement angle.

Preferably, responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of fabricating the object, whereby the cost is a combination of the cost of operating the machine for the duration of the fabrication and the cost of the wear inflicted on the tool during the fabrication.

Additionally, the at least one trochoidal-like tool path includes a plurality of trochoidal-like tool path segments and the configuring at least one trochoidal-like tool path includes recursively configuring each of the trochoidal-like tool path segments, and wherein responsive to consideration of at least one of characteristics of the computer numerically controlled machine, rotating cutting tool and material of the workpiece, the configuring each of the tool path segments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path segments, whereby the cost is a combination of the cost of operating the machine for the duration of the machining and the cost of the wear inflicted on the tool during the machining.

Additionally, each of the tool path segments includes a plurality of tool path subsegments and recursively configuring each of the tool path segments includes recursively configuring each of the tool path subsegments, and wherein responsive to consideration of at least one of characteristics of the computer numerically controlled machine, rotating cutting tool and material of the workpiece, the configuring each of the tool path subsegments also includes minimizing, subject to other constraints, the rate of change of the engagement angle over time, gradually changing the feed speed of the tool corresponding to the changing engagement angle, maintaining a generally constant work load on the tool, and minimizing the cost of machining the each of the tool path subsegments, whereby the cost is a combination of the cost of operating the machine for the duration of the machining and the cost of the wear inflicted on the tool during the machining.

There is yet further provided in accordance with still another preferred embodiment of the present invention an automated computer-controlled machine to fabricate an object from a workpiece, the machine including a controller operative for identifying at least one semi-open region for which a first machining time needed to remove the region by employing a trochoidal-like tool path is longer than a second machining time needed to isolate the region by removing separating channels between the region and all closed external boundary segments of the region and removing the remainder of the region, and for directing the tool along a trochoidal-like tool path in the at least one separating channel between the region and all closed external boundary segments of the region, thereby defining a remaining open region to be removed.

There is yet further provided in accordance with still another preferred embodiment of the present invention an object fabricated from a workpiece machined using a computer controlled machine tool by identifying at least one semi-open region for which a first machining time needed to remove the region by employing a trochoidal-like tool path is longer than a second machining time needed to isolate the region by removing separating channels between the region and all closed external boundary segments of the region and removing the remainder of the region, and by defining in the region to be removed at least one separating channel between the region and all closed external boundary segments of the region, thereby defining a remaining open region to be removed.

Preferably, the object is fabricated also by directing the rotating cutting tool along at least one trochoidal-like tool in the separating channel which is removed by the tool moving along the trochoidal-like tool path.

BRIEF DESCRIPTION OF THE DRAWINGS

The present invention will be understood and appreciated more fully from the following detailed description, taken in conjunction with the drawings in which:

FIGS. 2A-2L-2 are together another series of simplified illustrations which are helpful in understanding the invention;

FIGS. 4A and 4B are simplified illustrations of details of functionality illustrated more generally in certain ones of FIGS. 1A-1S-2 and FIGS. 2A-2L-2.

DETAILED DESCRIPTION OF A PREFERRED EMBODIMENT

The present invention relates to various aspects of an automated computer-implemented method for generating commands for controlling a computer numerical controlled (CNC) machine to fabricate an object from a stock material, various aspects of a method for machining the stock material which employs the above commands, automated computer-implemented apparatus for generating the above commands, a numerically-controlled machine operative to fabricate an object from a stock material by using the above commands, and an object fabricated by using the above commands.

The invention, in its various aspects, is described hereinbelow with respect to a series of drawings, which initially illustrate an example of an object to be fabricated, a simulated overlay of the object on a stock material to be machined and sequences of machining steps that are produced by commands generated in accordance with the present invention. It is appreciated that although sequential machining steps are illustrated, the invention is not limited to a machining method but extends as noted above to the generation of the commands, the apparatus, which generates them, the apparatus which carries them out and to the result produced thereby.

The term "calculation" is used throughout to refer to the generation of commands which produce sequences of machining steps to be employed in the machining of a particular region of the stock material. The definitions "calculate", "calculation" and calculation are of corresponding meaning.

Figure 1A:
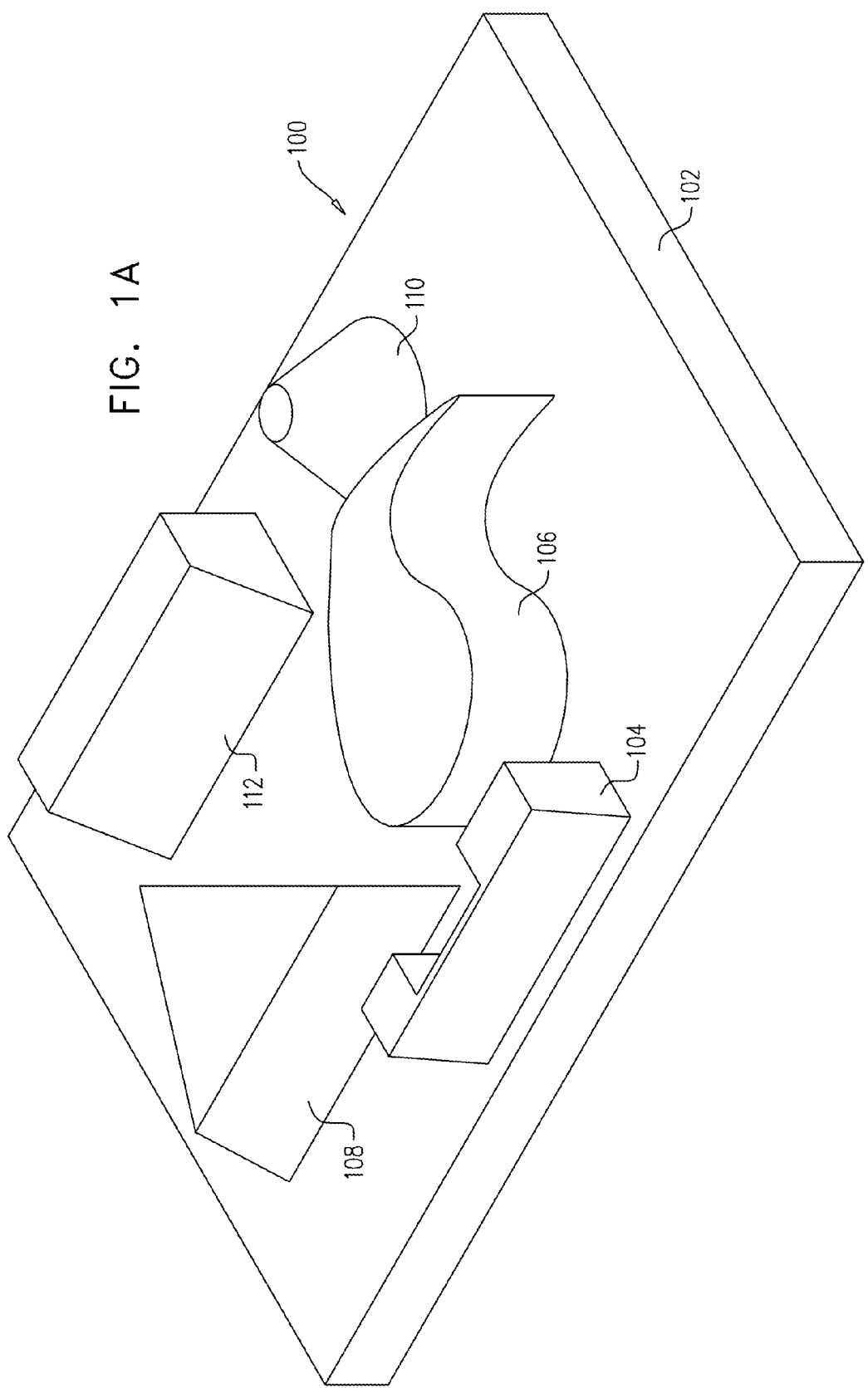
FIGS. 1A-1S-2 are together a series of simplified illustrations which are helpful in understanding the invention.

FIGS. 1A and 1B are respective pictorial and top view illustrations of an object 100 which is an example of objects that can be fabricated in accordance with the present invention. The configuration of the object 100 is selected to illustrate various particular features of the present invention. It is noted that any suitable three-dimensional object that can be machined by a conventional 3-axis CNC machine tool may be fabricated in accordance with a preferred embodiment of the present invention.

As seen in FIGS. 1A & 1B, the object 100 is seen to have a generally planar base portion 102 from which five protrusions, here designated by reference numerals 104, 106, 108, 110 and 112 extend. FIG. 1C shows stock material 114 overlaid by an outline of object 100.

In accordance with a preferred embodiment of the present invention, a tool path designer, using the automated computer-implemented method for generating commands for controlling a computer numerical controlled machine of the present invention, accesses a CAD drawing of the object 100 in a standard CAD format, such as SOLIDWORKS®. He selects a specific machine tool to be used in fabrication of the object 100 from a menu and selects a specific rotating cutting tool to carry out each machining function required to fabricate the object.

For the sake of simplicity, the illustrated object 100 is chosen to be an object that can be fabricated by a single machining function, it being appreciated that the applicability of the present invention is not limited to objects which can be fabricated by a single machining function.

The tool path designer then defines the geometry of the stock material to be used in fabrication of the object 100. This may be done automatically by the automated computer-implemented apparatus of the present invention or manually by the tool path designer. The tool path designer then specifies the material which constitutes the stock material, for example, INCONEL® 718. The present invention utilizes the choice of machine tool, rotating cutting tool and the material by the tool path designer to calculate various operational parameters, based on characteristics of the machine tool, rotating cutting tool and material.

In accordance with a preferred embodiment of the present invention, a series of display screens are employed to provide a display for the tool path designer, indicating the various operational parameters, such as minimum and maximum surface cutting speed, minimum and maximum chip thickness, minimum and maximum feed speed, minimum and maximum spindle rotational speed, minimum and maximum engagement angles between the rotating cutting tool and the workpiece, axial depth of cut, machining aggressiveness level. An example of such a series of display screens appears in FIGS. 3A-3D.

The tool path designer is given limited latitude in changing some of the parameters, such as particularly, the machining aggressiveness level. Preferably, the tool path designer may also instruct the system to select parameters for which, for example, optimization of machining time, wear inflicted on the cutting tool, machining cost or any combination thereof is achieved. It is appreciated that although for some of the operational parameters described hereinabove a range of values is displayed to the tool path designer, the present invention also calculates an optimal operational value for all of the operational parameters to be employed.

Once all of the parameters appearing on the screen, such as the display screens of FIGS. 3A-3D, are finalized, a tool path for machining the workpiece is calculated in accordance with a preferred embodiment of the present invention. The calculation of a tool path in accordance with a preferred embodiment of the present invention is described hereinbelow with reference to FIGS. 1A-1S-2 which illustrate the actual progression of tool path in stock material 114.

It is a particular feature of the present invention that the tool path is calculated recursively, whereby initially a first tool path segment of the tool path is calculated for an initial region of the workpiece, and thereafter a subsequent sequential tool path segment of the tool path is similarly calculated for an initial region of a remaining region of the workpiece. Additional subsequent sequential tool path segments are similarly calculated, until a tool path for machining the entire workpiece to the desired object has been calculated.

Initially, a first cross section of the stock material having the outline of the object 100 overlaid thereon and having a depth equal to the designated axial depth of cut is calculated. This cross section is illustrated schematically in FIG. 1D and is designated by reference numeral 116. Cross section 116 is characterized as having an external boundary 118 and a plurality of islands 105, 107, 109, 111 and 113 respectively corresponding to the cross sections of protrusions 104, 106, 108, 110 and 112 at the depth of cross section 116. It is appreciated that islands 105, 107, 109, 111 and 113 are offset externally to the cross sections of protrusions 104, 106, 108, 110 and 112 by a distance which is generally a bit larger than the radius of the rotating cutting tool, thereby when machining a tool path which circumvents the islands, a narrow finishing width remains to be finish machined at a later stage.

It is appreciated that the axial depth of cross section 116 constitutes a first step down which is a first phase in the machining of object 100. Throughout, the term "step down" is used to describe a single machining phase at a constant depth. As shown in FIG. 1C, the complete machining of object 100 requires two additional step downs corresponding to cross sections 119 and 120. Therefore, subsequent to the calculation of cross section 116, a second step down and thereafter a third step down are calculated, corresponding to cross sections 119 and 120. Preferably, the vertical distance between subsequent step downs is generally between 1 and 4 times the diameter of the rotating cutting tool.

In accordance with a preferred embodiment of the present invention, a machining region is initially automatically identified in cross section 116. There are preferably three types of machining regions which are classified by the characteristics of their exterior boundaries. Throughout, a segment of the boundary of a region through which the region can be reached by a rotating cutting tool from the outside of the region by horizontal progression of the rotating cutting tool is termed an "open edge". All other boundary segments are termed throughout as "closed edges".

The three types of machining regions are classified as follows:

Type I—an open region characterized in that the entire exterior boundary of the region consists solely of open edges;

Type II—a semi-open region characterized in that the exterior boundary of the region consists of both open edges and closed edges;

Type III—a closed region characterized in that the entire exterior boundary of the region consists solely of closed edges;

Preferably, a tool path to be employed in machining a region is calculated to comprise one or more tool path segments, wherein each tool path segment is one of a converging spiral tool path segment, a trochoidal-like tool path segment and a diverging spiral tool path segment. Generally, a converging spiral tool path segment is preferred when machining a Type I region, a trochoidal-like tool path segment is preferred when machining a Type II region, and a diverging spiral tool path is preferred when machining a Type III region.

The term "trochoidal-like" is used throughout to mean a trochoidal tool path or a modification thereof that retains a curved cutting path and a return path which could be either curved or generally straight.

As known to persons skilled in the art, the machining of spiral tool path segments is generally more efficient with respect to the amount of material removed per unit of time than the machining of trochoidal-like tool path segments for generally similar average stepovers. Therefore, the present invention seeks to maximize the area to be machined by spiral tool path segments.

A converging spiral tool path segment calculated to machine a Type I region preferably is a tool path segment which spirals inwardly from an external boundary of the region to an internal contour. The internal contour is preferably calculated as follows:

In a case where there are no islands within the external boundary of the Type I region, the internal contour is preferably calculated to be a small circle having a radius which is generally smaller than the radius of the cutting tool, and which is centered around the center of area of the region;

In a case where there is one island within the external boundary of the Type I region, and the shortest distance between the one island and the external boundary of the Type I region is longer than a selected fraction of the diameter of the rotating cutting tool, the internal contour is preferably calculated to be generally alongside the external boundary of the island; and In a case where:
there is one island within the external boundary of the Type I region and the shortest distance between the single island and the external boundary of the Type I region is shorter than a selected fraction of the diameter of the rotating cutting tool; or
there is more than one island within the external boundary of the Type I region the internal contour is preferably calculated to be a contour which is offset interiorly to the external boundary of the region by a distance which is generally equal to 1.5 radii of the rotating cutting tool.

Once the internal contour is calculated, it is automatically verified that the internal contour does not self intersect. In a case where the internal contour does self intersect at one or more locations, preferably a bottleneck is identified in the vicinity of each such self intersection. If the bottleneck does not overlap with an island, a separating channel is preferably calculated at each such bottleneck. A separating channel preferably divides the region into two Type I regions which can be machined independently of each other by separate converging spiral tool path segments. If the bottleneck does overlap with an island, the internal contour is preferably recalculated to be offset interiorly to the external boundary by generally half of the original offset. This process is repeated until an internal contour which does not self-intersect is calculated.

It is a particular feature of the present invention that a converging spiral tool path segment which spirals inwardly from an external boundary of a region to an internal contour is calculated to be a "morphing spiral". The term "morphing spiral" is used throughout to mean a spiral tool path segment which gradually morphs the geometrical shape of one boundary or contour to the geometrical shape of a second boundary or contour as the spiral tool path segment spirals therebetween. While various methods of morphing are known to persons skilled in the art, the present invention seeks to implement particular methods of morphing in accordance with preferred embodiments of the present invention, as described hereinbelow.

It is another particular feature of the present invention that the engagement angle of the cutting tool employed throughout the tool path segment is not fixed, but rather may vary between the predetermined minimum and maximum engagement angles over the course of the tool path segment. This varying of the engagement angle allows for varying stepovers over the course of the tool path segment, and thereby enables the tool path segment to morph between two generally dissimilar geometrical shapes. The term "stepover" is used throughout to designate the distance between sequential loops of a spiral tool path segment. It is appreciated that the cutting tool efficiency which is achieved by employing a morphing spiral tool path segment is generally significantly greater than the cutting tool efficiency which is achieved by employing a trochoidal-like tool path segment. It is also appreciated that where appropriate, an engagement angle which is generally close to the maximum engagement angle is preferred.

While it is appreciated that employing varying engagement angles over the course of a tool path segment may have a negative impact of increasing the wear of the cutting tool due to the varying mechanical load on the cutting tool and to chip thinning, it is a particular feature of the present invention that this negative impact is generally compensated for by automatically dynamically adjusting the feed velocity to correspond to the varying engagement angle. It is another particular feature of the present invention that the engagement angle is varied gradually over the course of the tool path segment, thereby preventing sudden and sharp changes in cutting tool load, and thereby further reducing excess wear of the cutting tool.

Returning now to the calculation of a converging spiral tool path segment employed to machine a Type I region, once an internal contour has been calculated, the number of loops to be included in a converging spiral tool path segment which spirals inwardly from the external boundary of the region to the internal contour is calculated preferably as illustrated in FIG. 4A.

As shown in FIG. 4A, a plurality of bridges 500 of a predefined density are each stretched from the internal contour 502 to the external boundary 504. A bridge point 506 of each of bridges 500 is initially defined as the point of intersection of bridge 500 with external boundary 504. The length of the shortest bridge divided by the minimum stepover is generally equal to the maximum number of loops that can be included in the spiral tool path segment. The length of the longest bridge divided by the maximum stepover is generally equal to the minimum number of loops which must be included in the spiral tool path. As described hereinabove, minimum and maximum engagement angles are determined based on information provided by the tool path designer, which angles determine the minimum and maximum stepover of the spiral tool path segment.

It is appreciated that the furthest distance, in any direction, from internal contour 502 which can be machined by a converging spiral tool path segment is the number of loops included in the converging spiral tool path segment multiplied by the maximum stepover. Areas between internal contour 502 and external boundary 504 beyond this furthest distance from the internal contour cannot be machined by the converging spiral tool path segment, and are therefore preferably machined by clipping prior to the machining of the converging spiral tool path segment. Throughout, the term "clipping" is used to define the calculation of machining of areas of a region which cannot be machined by an optimal spiral tool path segment. Typically, clipped areas are machined either by a trochoidal-like tool path segment, before the machining of the spiral tool path segment, or by machining a separating channel which separates the clipped area from the remainder of the region and by subsequently machining the separated clipped area separately by a spiral tool path segment.

Throughout, a parameter 'n' will be used to designate a possible number of loops to be included in a spiral tool path segment, wherein n is a number between the minimum number of loops which must be included in the spiral tool path segment and the maximum number of loops that can be included in the spiral tool path segment.

For each possible value of n, a first work time for a first machining method needed to machine the area between external boundary 504 and internal contour 502 is calculated by summing the time needed to machine the spiral tool path segment and the time needed to machine all clipped areas which were identified between external boundary 504 and internal contour 502 as described hereinabove. The optimal number of loops to be included in the spiral tool path segment is chosen to be the value of n for which the first calculated work time is the shortest.

In a case where the internal contour is calculated to be a small circle which is centered around the center of area of the region, a second work time for a second machining method is calculated by summing the work time needed to machine a separating channel extending along the shortest bridge connecting the external boundary to the internal contour, further extending through the small circle and then further extending along an opposite bridge up to an opposite segment of the external boundary, thus dividing the region into two independent Type I regions, and the work time needed to machine the two independent Type I regions. In a case where the second work time is shorter than the first work time, the second machining method is preferred over the first machining method.

Once the optimal number of loops to be included in the converging spiral tool path segment is chosen, clipped areas and tool paths for their removal are calculated as described hereinabove. Subsequently, a new external boundary defined by the clipped areas is calculated and all bridge points are updated accordingly to be located on the new external boundary. Thereafter, the actual path of the spiral tool path segment is calculated, as follows:

Initially, the bridge point 510 of a first bridge 512 is preferably selected as a first spiral point of spiral tool path segment 514. First bridge 512 is preferably selected to minimize the time required to move the cutting tool from its previous position. A possible second spiral point of spiral tool path segment 514 is calculated as a point on a second bridge 516, immediately adjacent to first bridge 512 in a climbing direction of the cutting tool from first bridge 512, which point is distanced from bridge point 517 of second bridge 516 along second bridge 516 by the length of second bridge 516 divided by the remaining number of loops to be included in tool path segment 514.

For the possible second spiral point, the engagement angle at which the cutting tool will engage the material by following the spiral tool path segment 514 from first spiral point 510 to the possible second spiral point is calculated. In a case where the calculated engagement angle is between the predetermined minimum and maximum engagement angles, the possible second spiral point is chosen as the second spiral point 518, and a new linear subsegment 520 between first spiral point 510 and second spiral point 518 is added to spiral tool path segment 514.

In a case where the engagement angle is less than the predetermined minimum engagement angle, a binary search for a second spiral point for which the calculated engagement angle is generally equal to the predetermined minimum engagement angle is performed. The binary search is performed between the possible second spiral point and a point on second bridge 516 distanced from bridge point 517 of second bridge 516 by the maximum stepover. Once a second spiral point 518 is found, a new linear subsegment 520 between first spiral point 510 and second spiral point 518 is added to spiral tool path segment 514.

In a case where the engagement angle is greater than the predetermined maximum engagement angle, a binary search for a second spiral point for which the calculated engagement angle is generally equal to the predetermined maximum engagement angle is performed. The binary search is performed between bridge point 517 of the second bridge 516 and the possible second spiral point. Once a second spiral point 518 is found, a new linear subsegment 520 between first spiral point 510 and second spiral point 518 is added to spiral tool path segment 514.

In a case where new linear subsegment 520 intersects with internal contour 502 of the region, the spiral tool path segment 514 is terminated at the point of intersection, possibly creating one or more separate unmachined residual areas generally adjacent to internal contour 502. For each such separate residual area, if the size of the separate residual area is larger than a predetermined small value, it is calculated to be machined by a trochoidal-like tool path segment.

In a case where new linear subsegment 520 intersects with an island, the calculation of spiral tool path segment 514 is terminated at the point of intersection, and a moat is calculated to commence at the point of intersection and circumvent the island. The remainder of the region for which a tool path has yet to be calculated is designated as a new Type I region to be calculated separately.

The term "moat" is used throughout to designate a trochoidal-like tool path segment which machines a channel generally adjacent to an island that circumvents the island, thereby separating the island from the remainder of the material which needs to be machined. The width of the moat is preferably at least 2.5 times the radius of the cutting tool and preferably at most 4 times the radius of the cutting tool. These values are predefined, however they may be modified by the tool path designer. It is a particular feature of the present invention that machining a moat around an island is operative to create a residual region which is of the same type as the original region. This is of particular value when machining a Type I region or a Type III region which are thus able to be generally machined by spiral tool path segments which are generally more efficient than trochoidal-like tool path segments.

Additionally, the machining of a moat to circumvent an island is effective in preventing the formation of two fronts of a machined region adjacent to the island, which may potentially form one or more long narrow residual walls between the two fronts. As known to persons skilled in the art, the formation of narrow residual walls is undesirable as machining them may lead to damage to the cutting tool and\or to the workpiece.

Once second spiral point 518 has been calculated, the remaining number of loops to be included in the remainder of tool path segment 514 is updated. It is appreciated that the remaining number of loops may be a mixed number. The subsequent segments of the remainder of spiral tool path segment 514 are calculated recursively, whereby second spiral point 518 is designated to be a new first point of the remainder of spiral tool path segment 514, and the bridge 530 immediately adjacent to second bridge 516 in a climbing direction of the cutting tool from second bridge 516 is designated to be a new second bridge. Additionally, second spiral point 518 is designated as a new bridge point of second bridge 516, and the remaining region to be machined is recalculated.

The machining of a Type II region is calculated as follows:

Initially, a spiral machining time is calculated as the sum of the machining time needed for machining separating channels adjacent to all closed edges of the Type II region and the machining time needed for machining the remaining area of the region by a converging spiral tool path segment. Additionally, a trochoidal-like machining time is calculated as the machining time needed for machining the entire Type II region by a trochoidal-like tool path segment. If the spiral machining time is shorter than the trochoidal-like machining time, separating channels are calculated adjacent to all closed edges of the region, and the remaining separated area is calculated to be machined by a converging spiral tool path segment. If the spiral machining time is longer than the trochoidal-like machining time, a trochoidal-like tool path segment is calculated as follows:

The longest open edge of the region is selected as the "front" of the region. The remainder of the exterior boundary of the region is defined as the "blocking boundary". A starting end is selected as one of the two ends of the front, for which when machining along the front from the starting end to the opposite end would result in a climb milling tool path.

As shown in FIG. 4B a plurality of bridge lines 550 of a predefined density are each stretched from a front 552 across the region towards a blocking boundary 554. A bridge point 556 of each of bridges 550 is initially defined as the point of intersection of each of bridges 550 with front 552. A starting end 560 and an opposite end 562 are selected so that bridges 550 are ordered from starting end 560 to opposite end 562 in a climbing direction of the cutting tool. A single open trochoidal-like tool path segment 564 for machining an area adjacent to front 552 having a width which is generally equal to the maximum stepover is calculated by selecting a suitable point on each of bridges 550 and interconnecting the suitable points in the order of bridge lines 550 between starting end 560 and opposite end 562, as follows:

Initially, starting end 560 is preferably selected as a first point of the single trochoidal-like tool path segment 564. A possible second point of the trochoidal-like tool path segment 564 is calculated as a point on a first bridge 570, immediately adjacent to first point 560 in a climbing direction of the cutting tool from first point 560, which possible second point is distanced from bridge point 572 of the first bridge by the larger of the maximum stepover and the length of first bridge 570. In the illustrated example of FIG. 4B, the possible second point is calculated to be at the intersection 574 of first bridge 572 and blocking boundary 554.

For the possible second point, the engagement angle at which the cutting tool will engage the material by following the cutting tool path from the first point to the possible second point is calculated. In a case where the calculated engagement angle is between the predetermined minimum and maximum engagement angles, the possible second point is chosen as the second point, and a new linear subsegment between first point 560 and the second point is added to the single trochoidal-like cutting tool path segment 564.

In a case where the engagement angle is less than the predetermined minimum engagement angle, a binary search for a second point for which the calculated engagement angle is generally equal to the predetermined minimum engagement angle is performed. The binary search is performed between the possible second point and a point on first bridge 570 distanced from bridge point 572 of first bridge 570, along first bridge 570, by the larger of the maximum stepover and the length of first bridge 570. Once a second point is found, a new linear subsegment between first point 560 and the second point is added to the single trochoidal-like cutting tool path segment 564.

In a case where the engagement angle is greater than the predetermined maximum engagement angle, a binary search for a second point for which the calculated engagement angle is generally equal to the predetermined maximum engagement angle is performed. The binary search is performed between bridge point 572 of first bridge 570 and the possible second point. Once a second point is found, a new linear subsegment between first point 560 and the second point is added to the single trochoidal-like cutting tool path segment 564.

In the illustrated example of FIG. 4B, intersection 574 is selected as the second point, and a new linear subsegment 580 between first point 560 and second point 574 is added to the single trochoidal-like cutting tool path segment 564.

Subsequently, calculation of the remainder of the single trochoidal-like tool path segment 564 is achieved by recursively performing the aforementioned calculation of tool path subsegments through suitable points on ordered bridges 550 up until opposite end 562 of selected front 552. In a case where the single trochoidal-like tool path segment 564 crosses an island, the single trochoidal-like tool path segment 564 is clipped at the intersecting points of the single trochoidal-like tool path segment 564 and the external boundary of the island, thereby creating two disjoint subsegments of the single trochoidal-like tool path segment 564. These two subsegments are then connected along a section of the external boundary of the island facing the front, which section is a closed edge.

The aforementioned calculation completes the calculation of a tool path segment for machining a part of the Type II region. At this point, the remainder of the Type II region to be machined is calculated, and a tool path for machining of the remainder of the Type II region is calculated recursively as described hereinabove. It is appreciated that the machining of the remainder of the Type II region requires repositioning of the cutting tool to a starting end of a front of the remainder of the Type II region. It is appreciated that repositioning techniques are well known to persons skilled in the art.

Referring now to the calculation of a tool path for machining of a Type III region, a diverging spiral tool path is preferred when machining Type III regions, as described hereinabove. A diverging spiral tool path segment calculated to machine a Type III region is a tool path segment which spirals outwardly from an innermost contour to an external boundary via a multiplicity of nested internal contours. The nested internal contours are calculated as follows:

A first nested internal contour is calculated to be a contour which is offset interiorly to the external boundary of the region by a distance which is generally equal to 1.5 radii of the cutting tool. Additional nested internal contours are then calculated recursively inwardly from the first nested internal contour, each nested internal contour being inwardly spaced from the nested internal contour immediately externally adjacent thereto by a distance which is generally equal to 1.5 radii of the rotating cutting tool. A last nested internal contour is calculated to be a contour having a center of area which is closer than 1.5 radii of the cutting tool to at least one point on the contour. Inwardly of the last nested internal contour, the innermost contour is calculated to be a small circle having a radius which is generally smaller than the radius of the cutting tool, and which is centered around the center of area of the last nested internal offset contour.

In a case where the innermost contour is either within the external boundary of an island or intersects with the external boundary of an island, a moat is calculated to circumvent the island, and the innermost contour is recalculated to be immediately external to the external boundary of the moat, such that the innermost contour does not intersect with any other islands. It is noted that nested internal contours which intersect with an external boundary of any island are discarded.

Once the nested internal contours have been calculated, the number of loops to be included in a diverging spiral tool path segment which will spiral outwardly from the innermost contour to the last nested internal offset contour is calculated preferably as follows:

A plurality of bridge lines are stretched from the innermost contour to a next internal offset contour immediately externally adjacent thereto. A bridge point of each bridge is initially defined as the point of intersection of the bridge with the innermost contour. The length of the shortest bridge divided by the minimum stepover provides a theoretical maximum of the number of loops that can be theoretically included in the diverging spiral tool path. The length of the longest bridge divided by the maximum stepover provides an absolute minimum of the number of loops which must be included in the diverging spiral tool path segment that is required to machine the entire area between the innermost contour and the next internal offset contour.

It is appreciated that the furthest distance, in any direction, from the innermost contour which can be reached by a diverging spiral tool path segment is the number of loops included in the diverging spiral tool path segment multiplied by the maximum stepover. Areas between the innermost contour and the next internal offset contour beyond this furthest distance cannot be machined by the diverging spiral tool path segment, and are preferably machined by clipping after the machining of the diverging spiral tool path segment.

Throughout, the parameter n is used to designate a possible number of loops to be included in the spiral tool path segment, wherein n is a number between the minimum number of loops which must be included in the spiral tool path segment and the maximum number of loops that can be included in the spiral tool path segment.

For each possible value of n, the work time needed to machine the area between the innermost contour and the next internal offset contour is calculated by summing the time needed to machine the spiral tool path segment and the time needed to machine all clipped areas which were identified between the innermost contour and the next internal offset contour as described hereinabove. The optimal value of loops to be included in the spiral tool path segment is chosen to be the value of n for which the calculated work time is the shortest.

Once the optimal value of loops to be included in the tool path segment is chosen, the actual path of the spiral tool path segment is calculated. Initially, the bridge point of a first bridge is preferably selected as a starting spiral point of the spiral tool path segment. The first bridge is preferably selected to minimize the time required to move the rotating cutting tool from its previous position. A possible second spiral point of the spiral tool path segment is calculated as a point on a second bridge, immediately adjacent to the first bridge in a climbing direction of the cutting tool from the first bridge, which point is distanced from the bridge point of the second bridge by the length of the second bridge divided by the remaining number of loops to be included in the tool path segment.

For the possible second spiral point, the engagement angle at which the cutting tool will engage the material by following the cutting tool path from the first spiral point to the possible second spiral point is calculated. In a case where the calculated engagement angle is between the predetermined minimum and maximum engagement angles, the possible second spiral point is chosen as the second spiral point, and a new linear subsegment between the first spiral point and the second spiral point is added to the spiral cutting tool path segment.

In a case where the engagement angle is less than the predetermined minimum engagement angle, a binary search for a second spiral point for which the calculated engagement angle is generally equal to the predetermined minimum engagement angle is performed. The binary search is performed between the possible second spiral point and a point on the second bridge distanced from the bridge point of the second bridge by the maximum stepover. Once a second spiral point is found, a new linear subsegment between the first spiral point and the second spiral point is added to the spiral tool path segment.

In a case where the engagement angle is greater than the predetermined maximum engagement angle, a binary search for a second spiral point for which the calculated engagement angle is generally equal to the predetermined maximum engagement angle is performed. The binary search is performed between the bridge point of the second bridge and the possible second spiral point. Once a second spiral point is found, a new linear subsegment between the first spiral point and the second spiral point is added to the spiral tool path segment.

In a case where the new linear subsegment intersects with an island, the calculation of the spiral tool path segment is terminated at the point of intersection, where a moat is calculated to commence and circumvent the island. The remainder of the region for which a tool path has yet to be calculated is designated as a new Type III region to be calculated separately.

In a case where the new linear subsegment intersects with the next internal offset contour, an additional loop of the diverging spiral tool path segment is calculated, and the portions of the additional loop which are internal to the next internal offset contour define one or more uncalculated residual regions between the diverging spiral tool path segment and the next internal offset contour, which residual regions are each calculated as a Type II region, preferably by employing a trochoidal-like tool path segment. The portions of the additional loop which are internal to the next internal offset contour are connected along the next internal offset contour to form a continuous loop which is the final loop of the diverging spiral tool path segment.

Once the second spiral point has been calculated, the remaining number of loops to be included in the tool path segment is recalculated and the subsequent segments of the spiral cutting tool path segment are calculated recursively, whereby the second spiral point is designated to be a new starting point of the remainder of the spiral tool path segment, and the bridge immediately adjacent to the second bridge in a climbing direction of the cutting tool from the second bridge is designated to be the new second bridge. Additionally, the second spiral point is designated as the new bridge point of the second bridge, and the remaining region to be machined is recalculated.

Subsequently, calculation of the remainder of the diverging spiral tool path for the remainder of the region is achieved by recursively performing the aforementioned calculation of diverging spiral tool path segments through subsequent consecutive pairs of nested internal contours between the last nested internal offset contour and the external boundary of the region.

It is appreciated that all of the calculations of the tool paths described hereinabove produce piecewise linear tool paths. In cases where a piecewise linear tool path is not suitable for a particular workpiece being machined by a particular CNC machine, a smoothing approximation of the piecewise linear tool path may be calculated. Such approximation methods are well known to persons skilled in the art.

Figures 1, 1E:
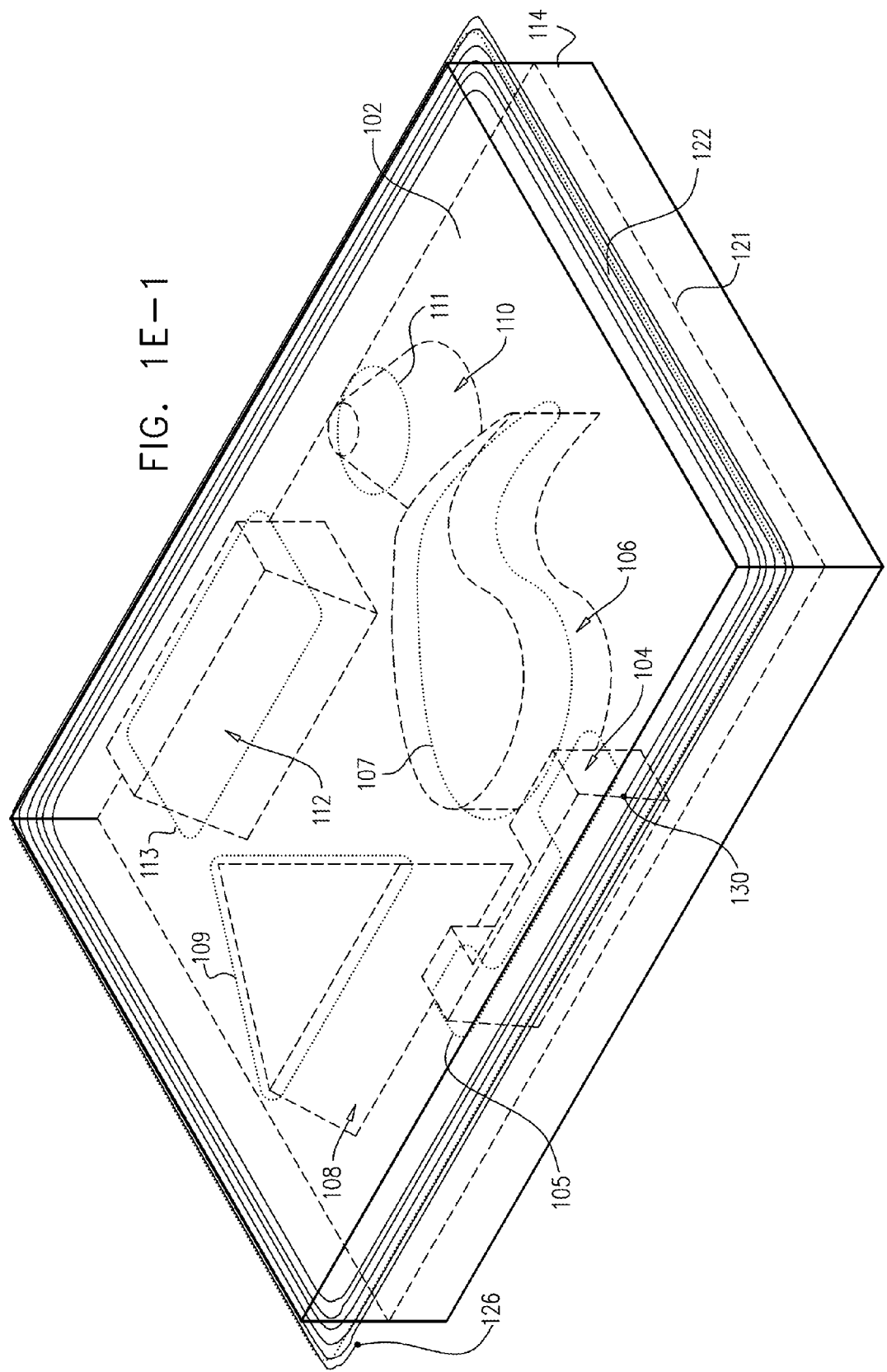
Figures 1, 1E, 2:
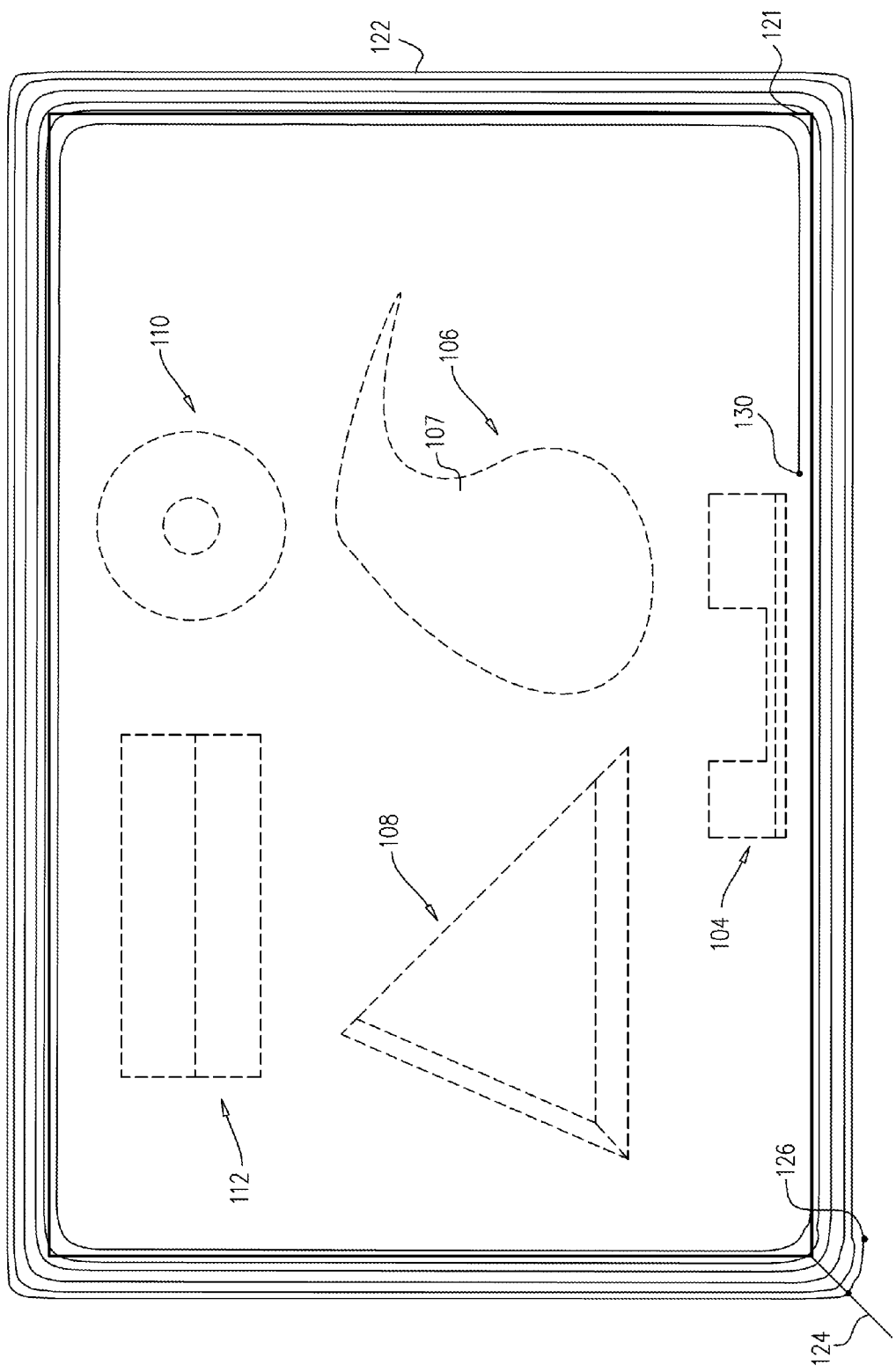

Returning now to the illustrated example of FIG. 1D, cross section 116 is initially identified as a Type I region which includes multiple protrusions. Therefore, a converging spiral tool path segment is calculated between the external boundary of the workpiece and a calculated internal contour, as the initial tool path segment. This calculation preferably begins with calculation of a spiral tool path segment which begins from a selected location just outside the periphery of cross section 116. Reference is made in this context to FIGS. 1E-1 and 1E-2, which are respective isometric and top view illustrations of the stock material 114 overlaid by outline 121 of object 100 in which the initial spiral tool path segment is indicated generally by reference numeral 122. It is noted that the spiral tool path is indicated by solid lines, which represent the center of the rotating cutting tool, whose cross-sectional extent is designated by reference numeral 124 in FIG. 1E-2. The selected location, here designated by reference numeral 126, is preferably selected to minimize the time required to move the rotating cutting tool from its previous position.

In the illustrated example of FIGS. 1E-1 and 1E-2, the initial tool path segment is a converging spiral segment which is calculated as described hereinabove. As shown in FIGS. 1E-1 and 1E-2, initial spiral tool path segment 122, ultimately intersects with island 105 at intersecting point 130 at which point spiral tool path segment 122 is terminated. As shown in FIGS. 1F-1 and 1F-2, a moat 132 which circumvents island 105 is calculated.

As shown in FIGS. 1F-1 and 1F-2, an inner boundary 134 of moat 132 is calculated to be generally alongside the outer boundary of island 105. It is appreciated that a narrow offset remains between the island 105 and an inner boundary 134 of the moat, which may be finish machined at a later stage. The outer boundary 136 of moat 132 is calculated as being offset from inner boundary 134 by the moat width.

As shown in FIGS. 1F-1 and 1F-2, the outer boundary 136 of moat 132 intersects with island 107 at points 138 and 139. Therefore, an additional moat 140 is calculated to circumvent island 107, whereby moats 132 and 140 are joined to form one continuous moat which circumvents islands 105 and 107. As clearly shown in FIGS. 1F-1 and 1F-2, the combination of the initial spiral tool path segment 122 and subsequent moats 132 and 140 which circumvent islands 105 and 107 define a new Type I region which is designated by reference numeral 142.

Figures 1, 1G:
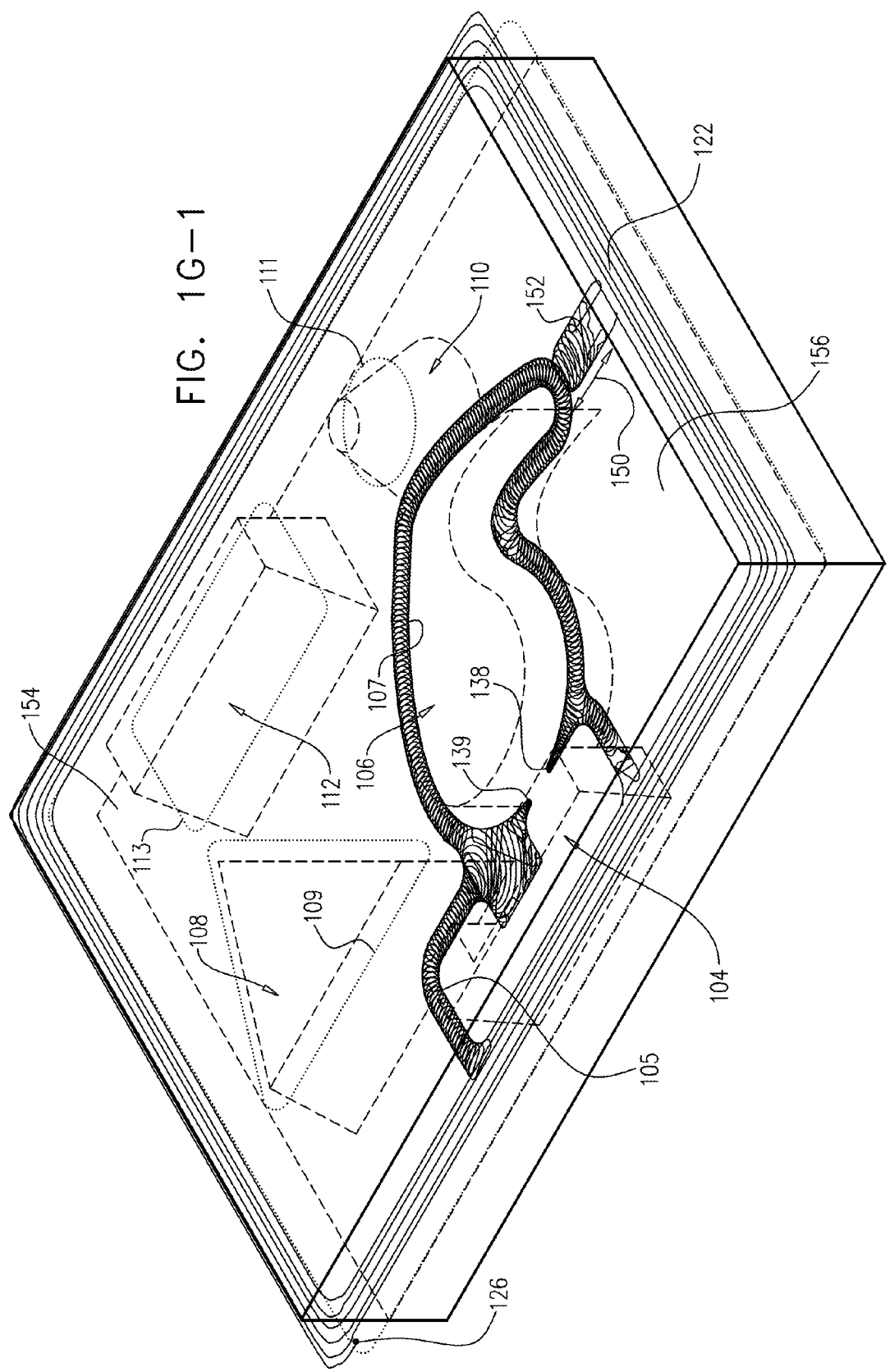

Region 142 includes multiple islands 109, 111 and 113. As clearly shown in FIGS. 1F-1 and 1F-2, a bottleneck 150 is detected in region 142. Therefore, as shown in FIGS. 1G-1 and 1G-2, a separating channel 152 is calculated at the location of bottleneck 150, effectively dividing region 142 into two independent Type I regions designated by reference numerals 154 and 156.

Figures 1, 1I:
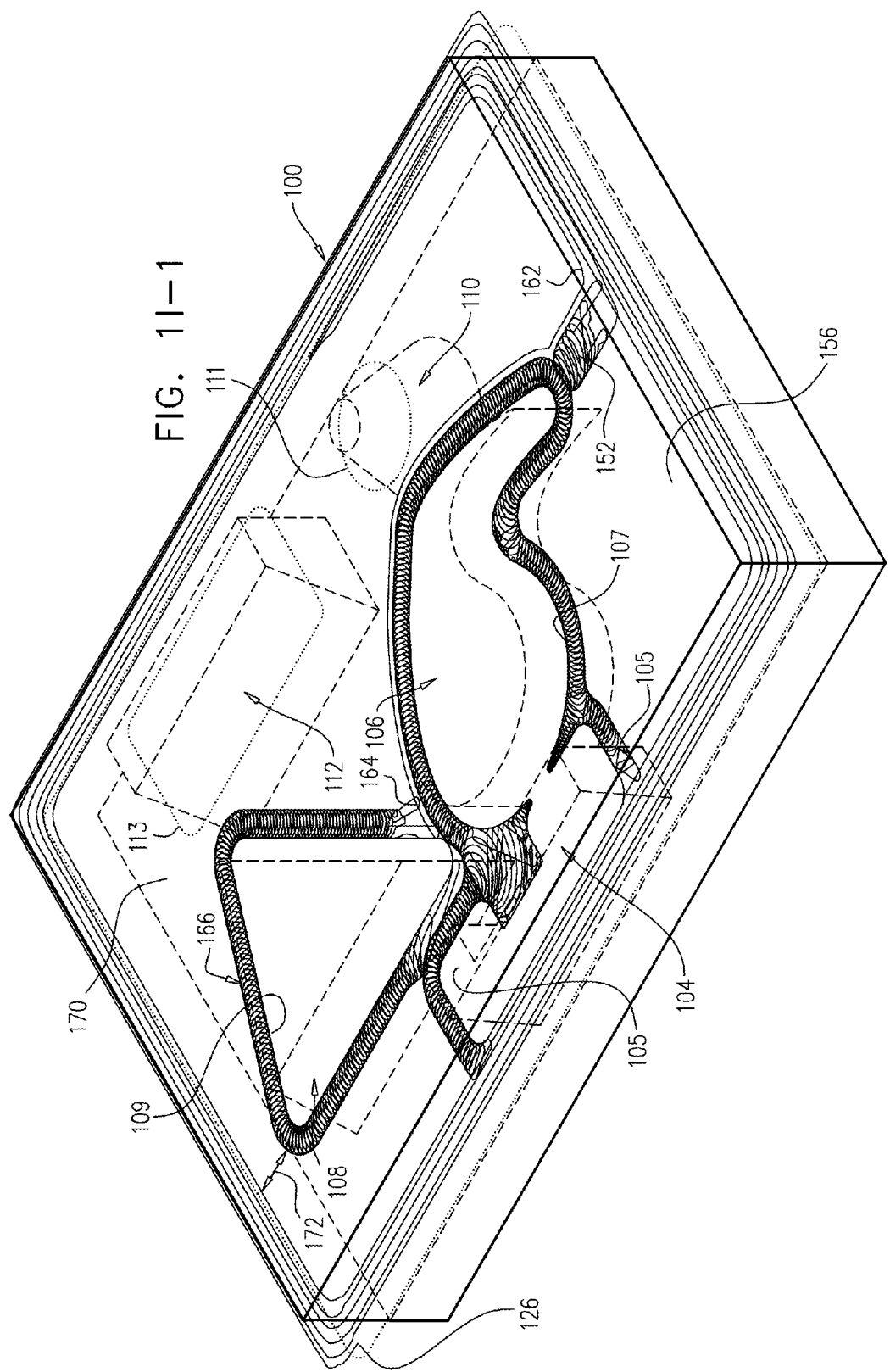
Figures 1, 1J, 2:
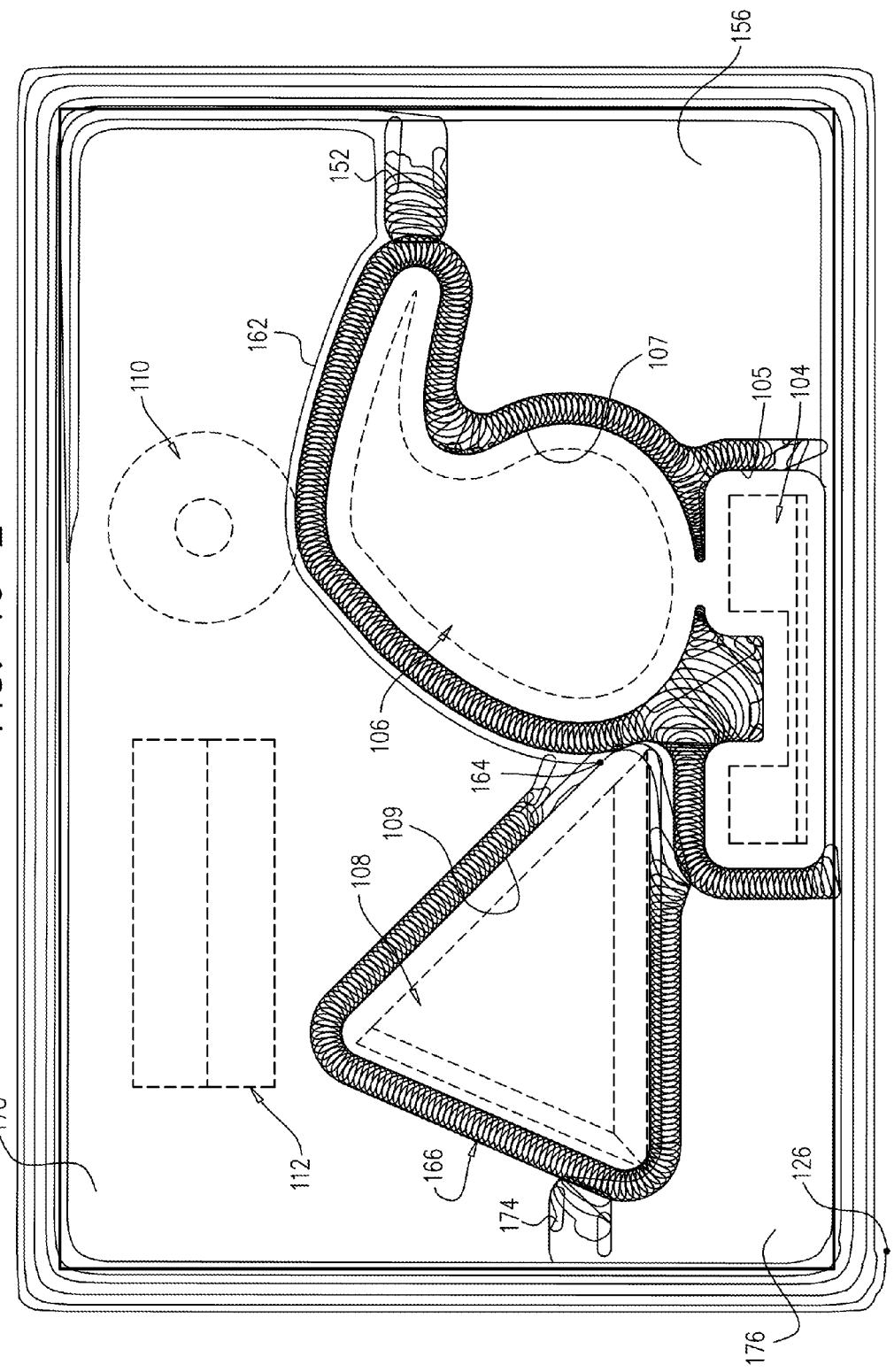

Turning now to FIGS. 1H-1 and 1H-2, it is shown that initially, a spiral tool path segment for region 154 is calculated, while the calculation of region 156 is deferred. As shown in FIGS. 1H-1 and 1H-2, a starting point 160 is chosen and a spiral tool path segment 162 extends from initial point 160 generally along the external boundary of region 154 until intersecting with island 109 at intersecting point 164 at which point spiral tool path segment 162 is terminated. As shown in FIGS. 1I-1 and 1I-2, a moat 166 which circumvents island 109 is calculated. The remainder of region 154 is identified as a Type I region designated by reference numeral 170.

Region 170 includes islands 111 and 113. As clearly shown in 1I-1 and 1I-2, a bottleneck 172 is detected in region 170. Therefore, as shown in 1J-1 and 1J-2, a separating channel 174 is calculated at the location of bottleneck 172, effectively dividing region 170 into two independent Type I regions designated by reference numerals 176 and 178.

Turning now to 1K-1 and 1K-2, it is shown that initially, a spiral path for machining region 176 is calculated, while the calculation of region 178 is deferred. As shown in FIGS. 1K-1 and 1K-2, region 176 does not include any islands, therefore a converging spiral tool path segment is calculated to machine region 176 with the internal boundary of region 176 being a small circle 177 of a radius which is generally smaller than the radius of the tool, and which is centered around the center of area of region 176.

Figures 1, 1L:
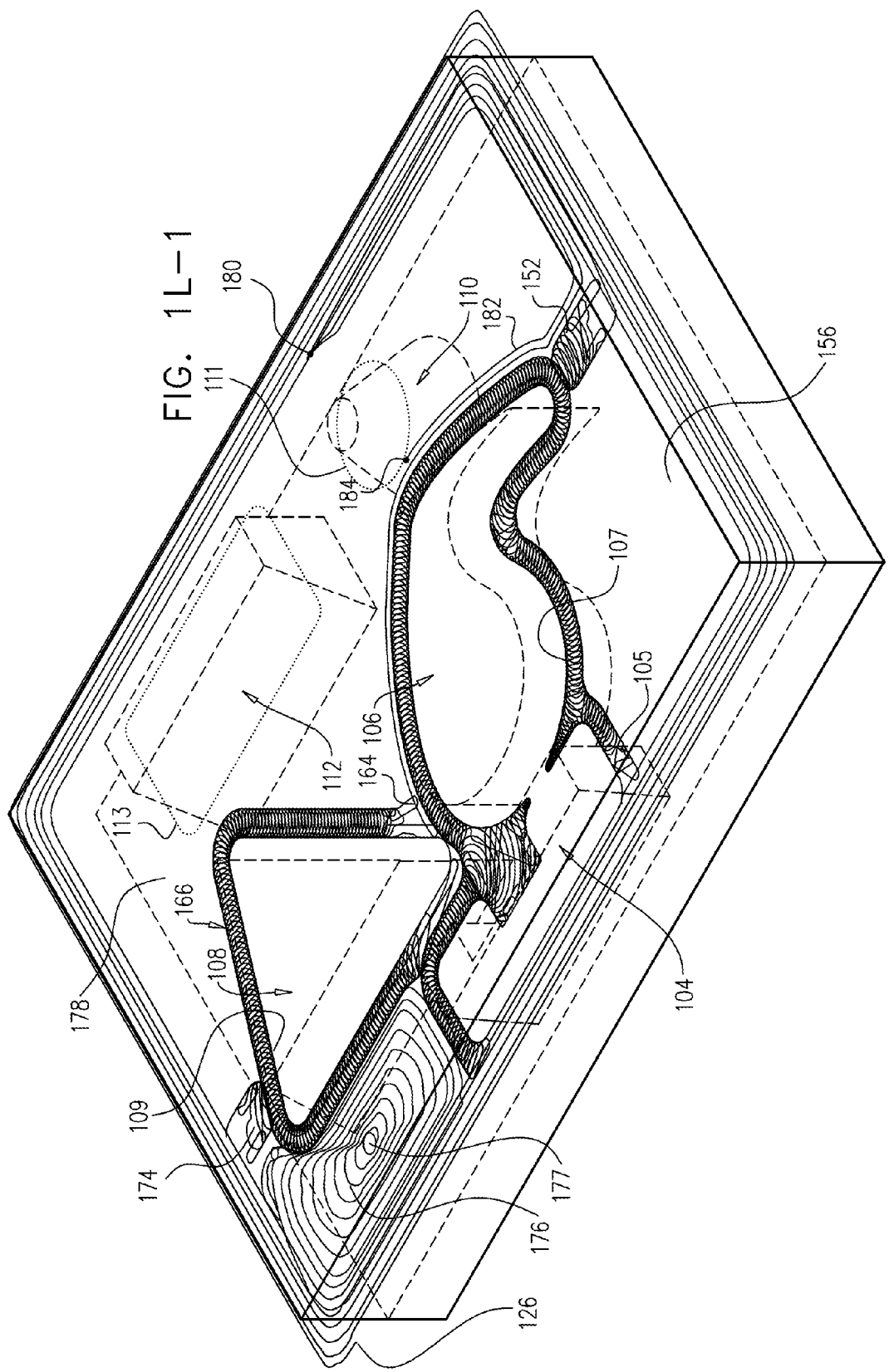
Figures 1, 1M:
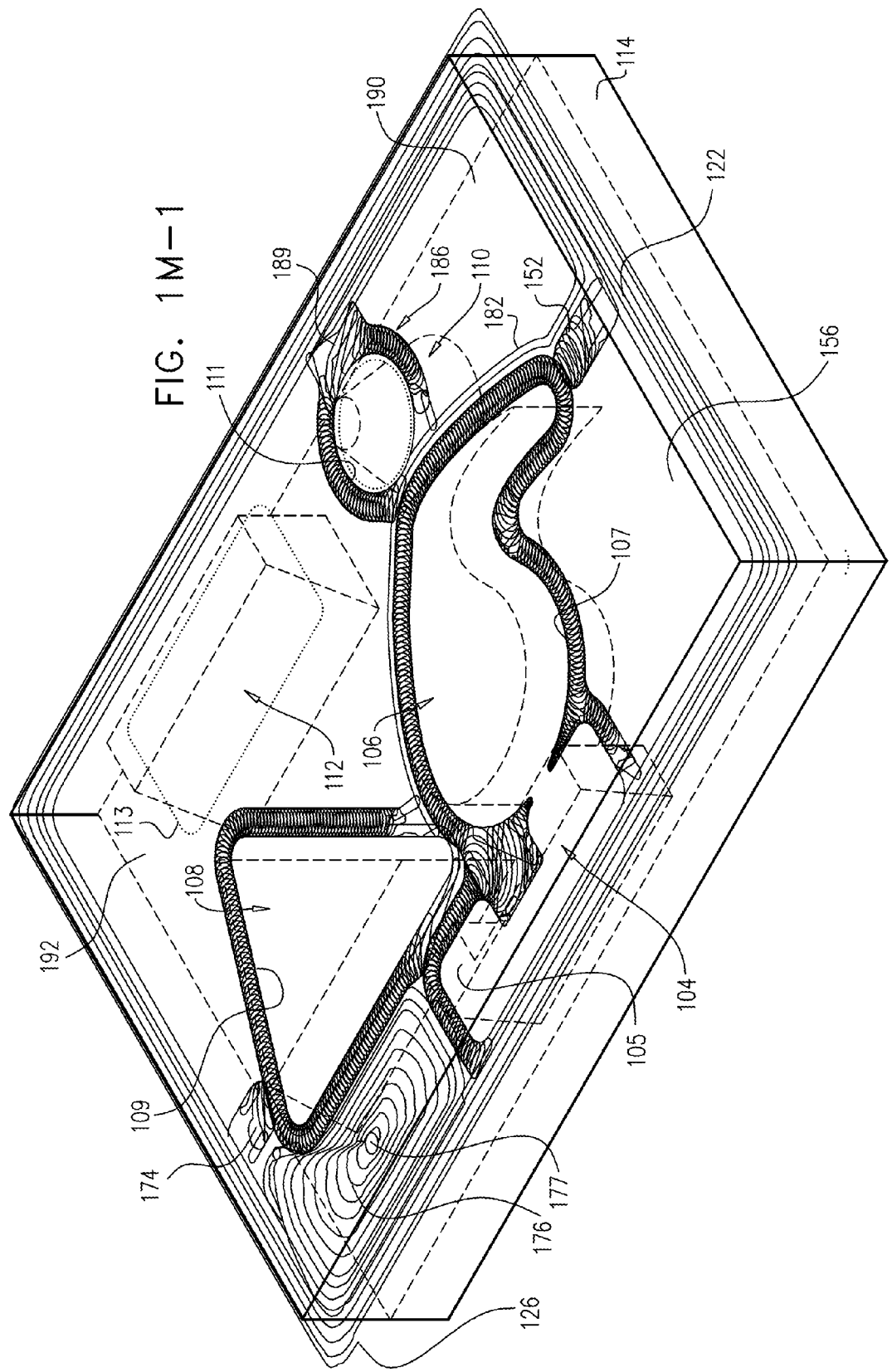
Figures 1, 1M, 2:
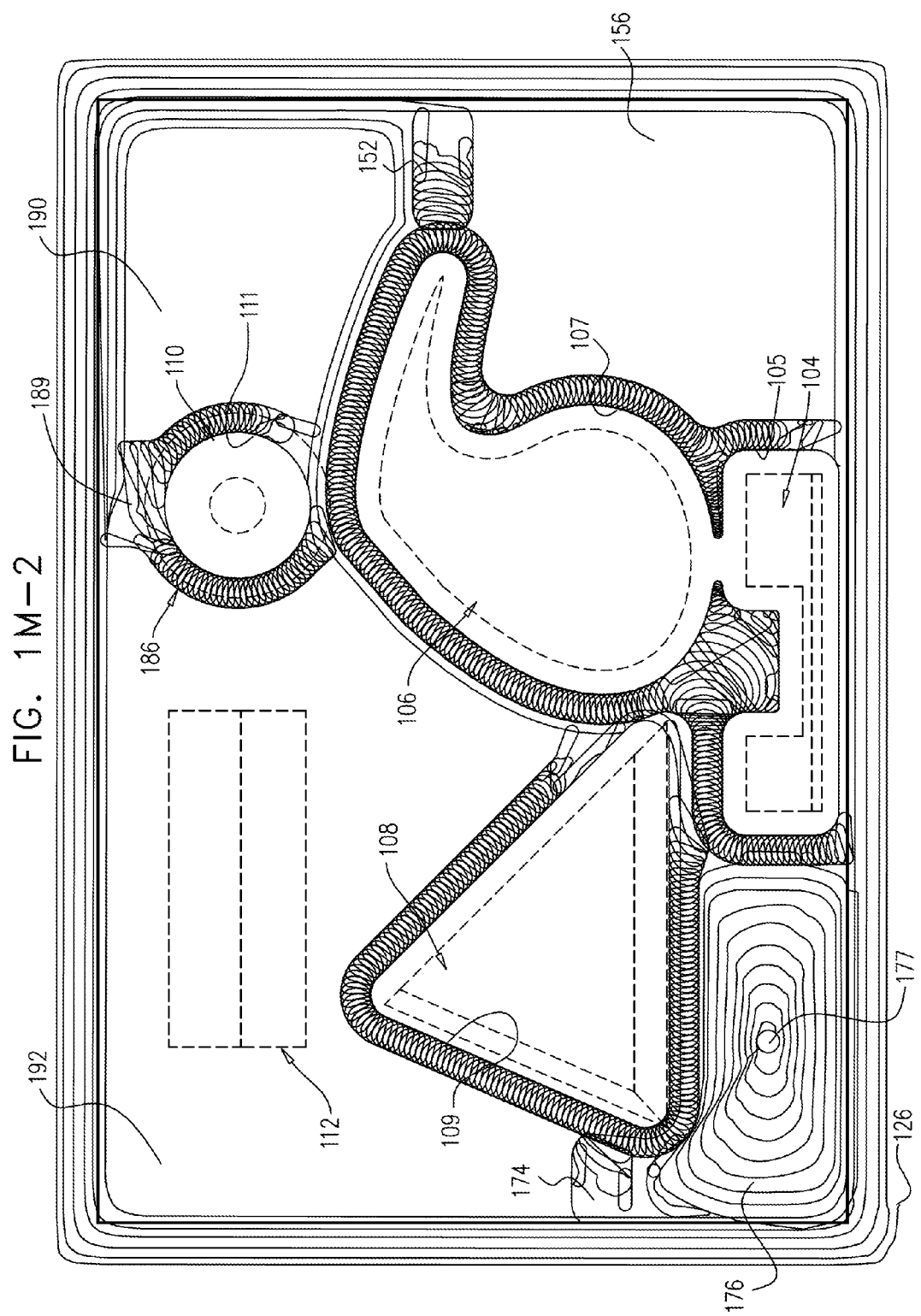

Subsequently, a spiral tool path segment for region 178 is calculated. As shown in FIGS. 1L-1 and 1L-2, a starting point 180 is chosen and a spiral tool path segment 182 is extended from initial point 180 generally along the external boundary of region 178 until intersecting with island 111 at intersecting point 184 at which point spiral tool path segment 182 is terminated. As shown in FIGS. 1M-1 and 1M-2, a moat 186 which circumvents protrusion 110 is calculated.

It is appreciated that in a case where the external boundary of a moat is calculated to be in close proximity to the external boundary of the Type I region which includes the moat, a local widening of the moat is calculated to prevent the forming of a narrow residual wall between the moat and the external boundary of the region. As known to persons skilled in the art, the formation of narrow residual walls is undesirable as machining them may lead to damage to the cutting tool and \ or to the workpiece.

As seen in FIGS. 1M-1 and 1M-2, the external boundary of moat 186 is calculated to be in close proximity to the external boundary of region 178. Therefore, moat 186 is locally widened up to the external boundary of region 178, along a narrow residual wall area 189 in which, without this widening, a narrow residual wall would be have been formed between moat 186 and the external boundary of region 178. Locally widened moat 186 divides region 178 into two independent Type I regions designated by reference numerals 190 and 192.

Figures 1, 1N:
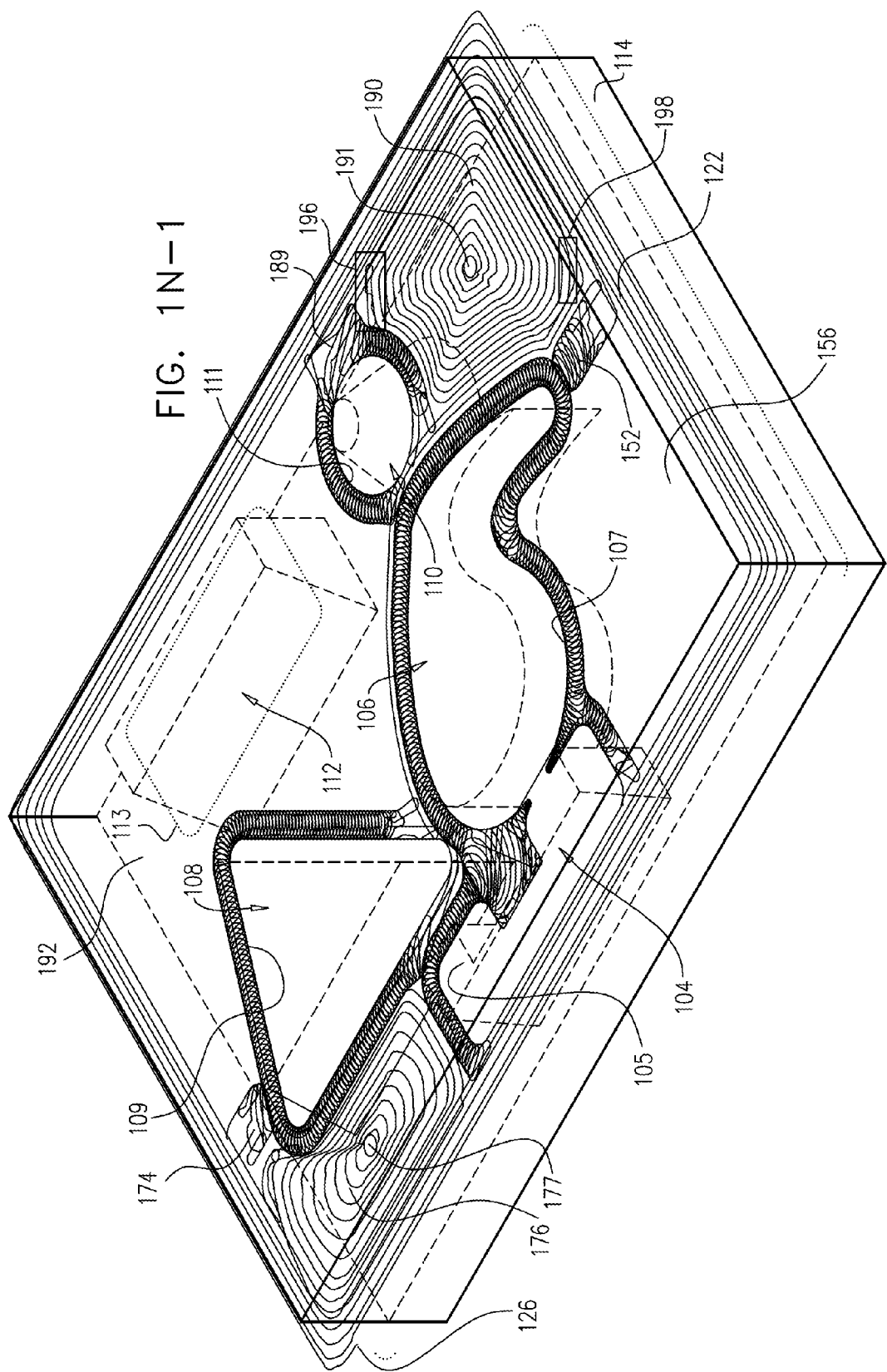
Figures 2, 10:
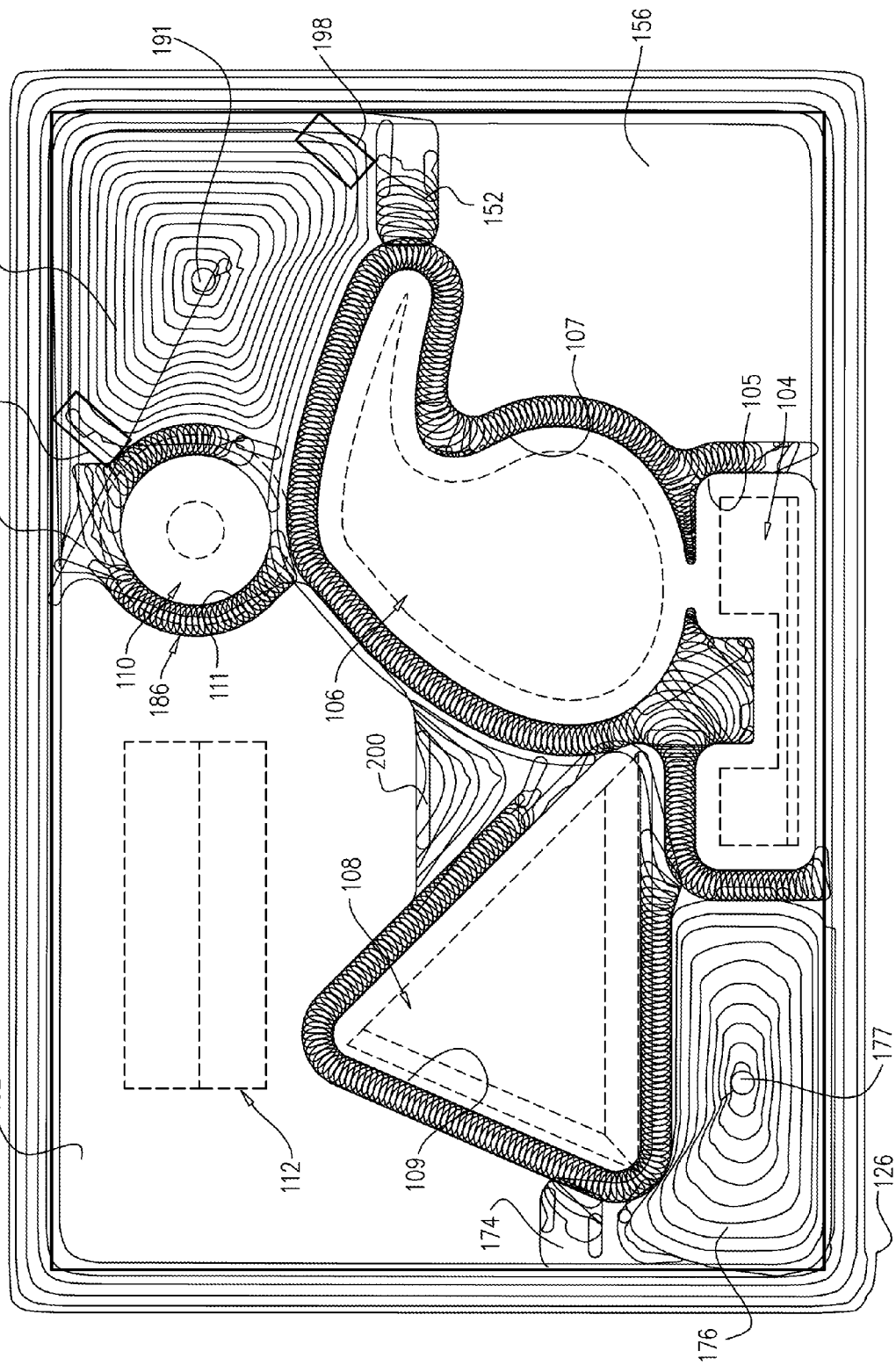

Turning now to FIGS. 1N-1 and 1N-2, it is shown that initially, region 190 is calculated, while the calculation of region 192 is deferred. As shown in FIGS. 1N-1 and 1N-2, two clipped areas of region 190 designated by numerals 196 and 198 are identified. Areas 196 and 198 are calculated to be machined by a trochoidal-like tool path segment prior to the machining of the remainder of region 190 by a spiral tool path segment.

The remainder of region 190 does not include any islands, therefore a converging spiral tool path segment is calculated to machine the remainder of region 190 with the internal boundary being a small circle 191 of a radius which is generally smaller than the radius of the tool, and which is centered around the center of area of the remainder of region 190.

Subsequentially, a spiral tool path segment for region 192 is calculated. As shown in FIGS. 1O-1 and 1O-2, one area of region 192, designated by numeral 200 is identified by clipping. Area 200 is calculated to be machined by a trochoidal-like tool path segment prior to the machining of the remainder of region 192 by a spiral tool path segment.

Figures 1, 1P:
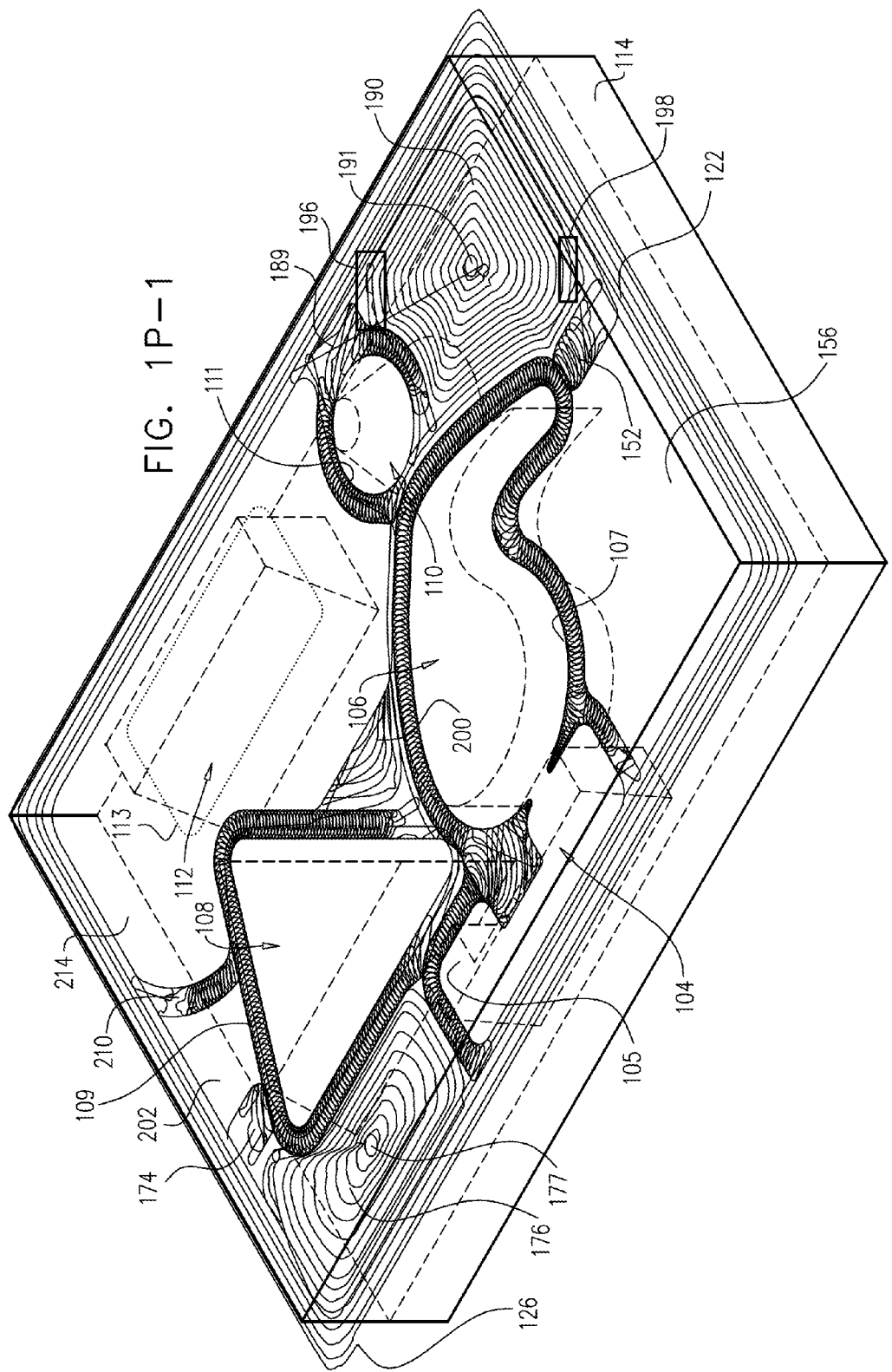
Figures 1, 1Q:
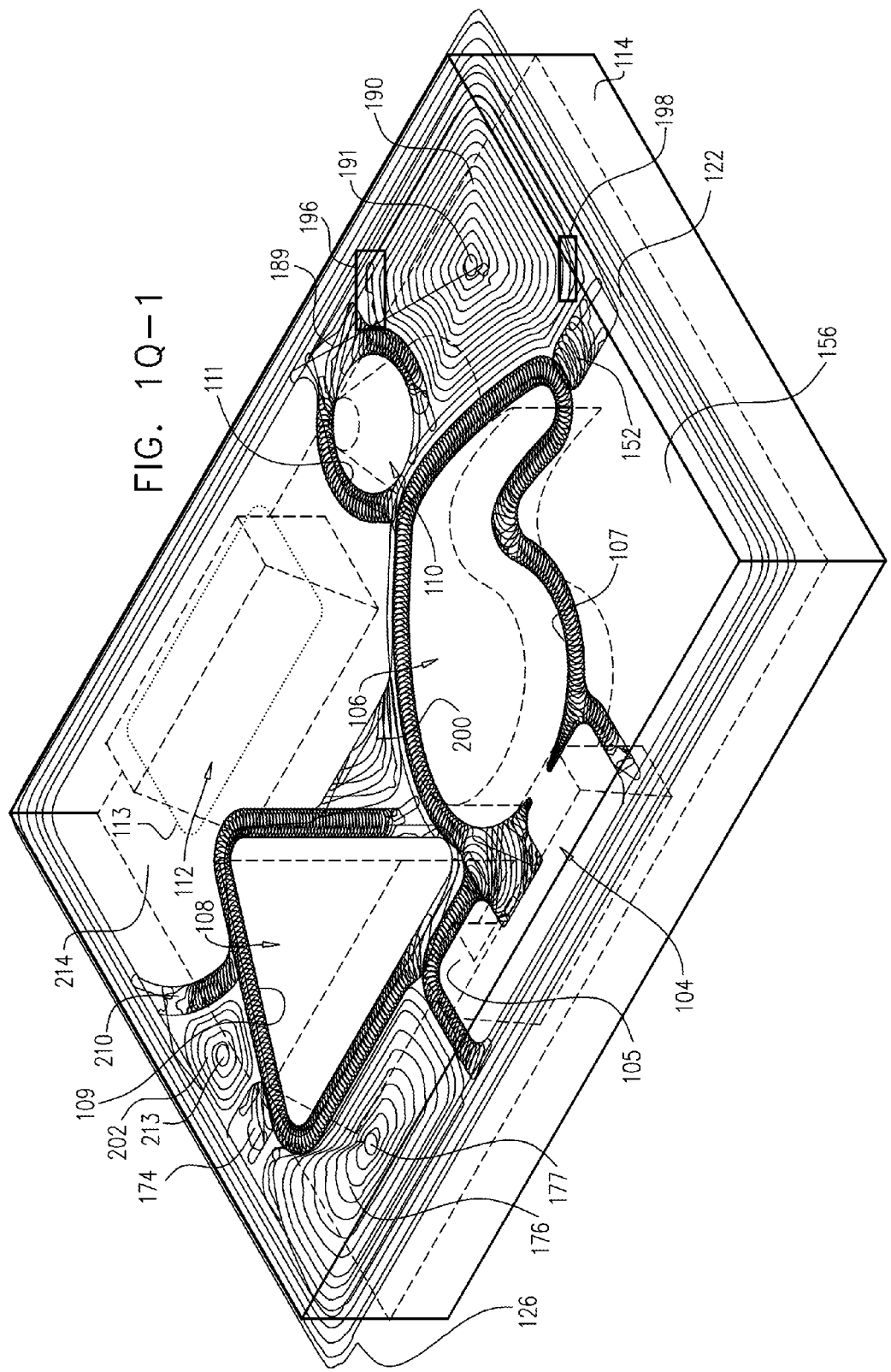

Additionally, as shown in FIGS. 1P-1 and 1P-2, an additional area of region 192, designated by numeral 202 is identified by clipping. However, it is calculated that area 202 would be more efficiently machined as a separate Type I region. Therefore, a separating channel 210 which divides the remainder of region 192 into two Type I regions designated by numerals 202 and 214 is calculated. Region 202 does not include any protrusions, therefore, as shown in FIGS. 1Q-1 and 1Q-2, a converging spiral tool path segment is calculated to machine region 202 with the internal boundary being a small circle 213 of a radius which is generally smaller than the radius of the tool, and which is centered around the center of area of region 202.

It is calculated that machining a separating channel 210 and machining region 202 as a Type I region results in a machining time which is shorter than the machining time of region 202 by a trochoidal-like tool path segment.

Figures 1, 1R:
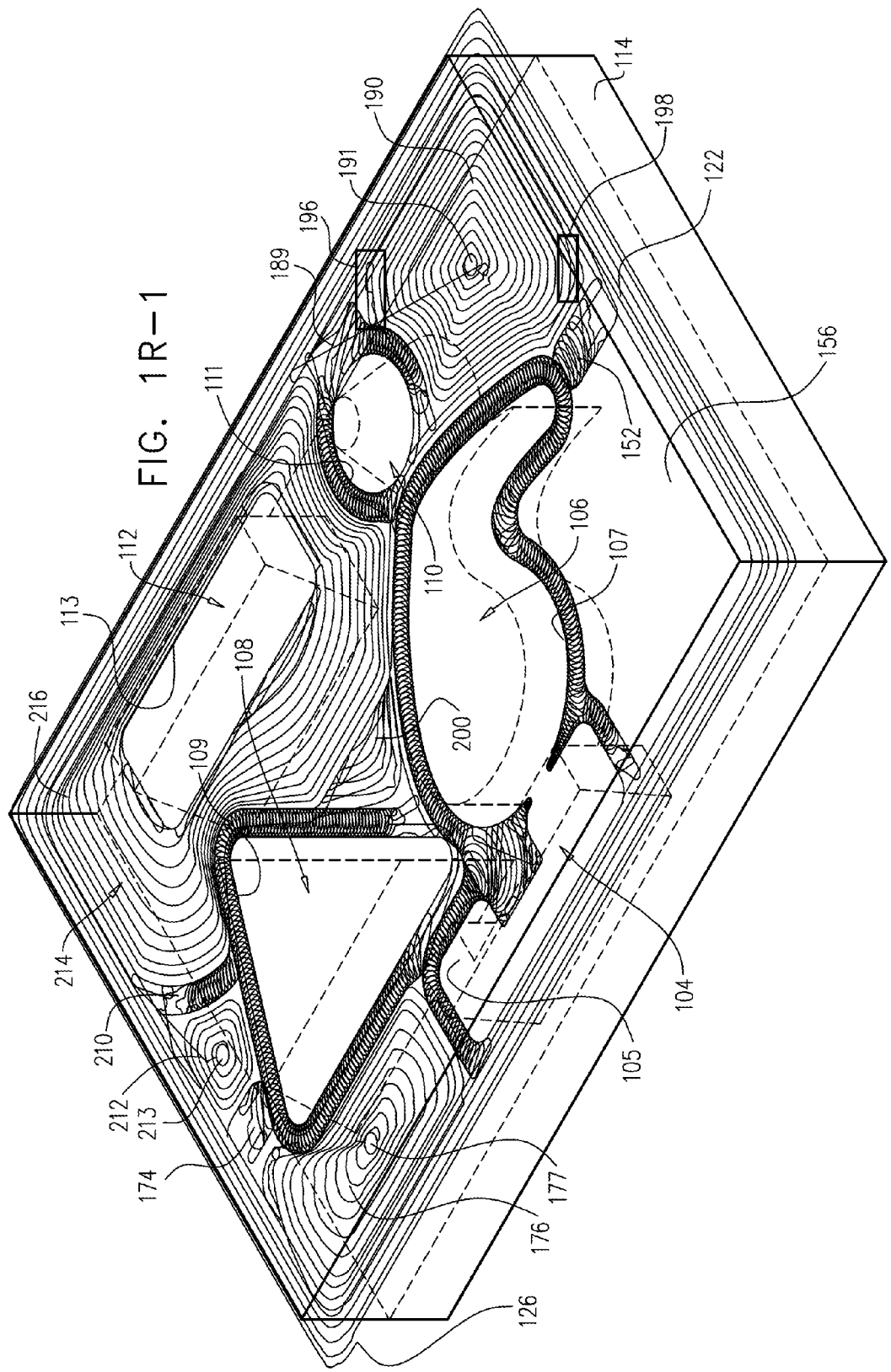

Turning now to FIGS. 1R-1 and 1R-2, it is shown that region 214 includes one island 113 which is generally centrally located within region 214. Therefore, a converging spiral tool path segment 216 is calculated to machine region 214 with the internal boundary being generally alongside the external perimeter of island 113. As shown in FIG. 1R-2, spiral tool path segment 216, ultimately intersects with island 113 at intersecting point 218 at which point spiral tool path segment 216 is terminated. It is appreciated that after machining segment 216, there may remain one or more Type II regions adjacent to island 113 which are machined by trochoidal-like tool path segments.

Figures 1, 1S, 2:
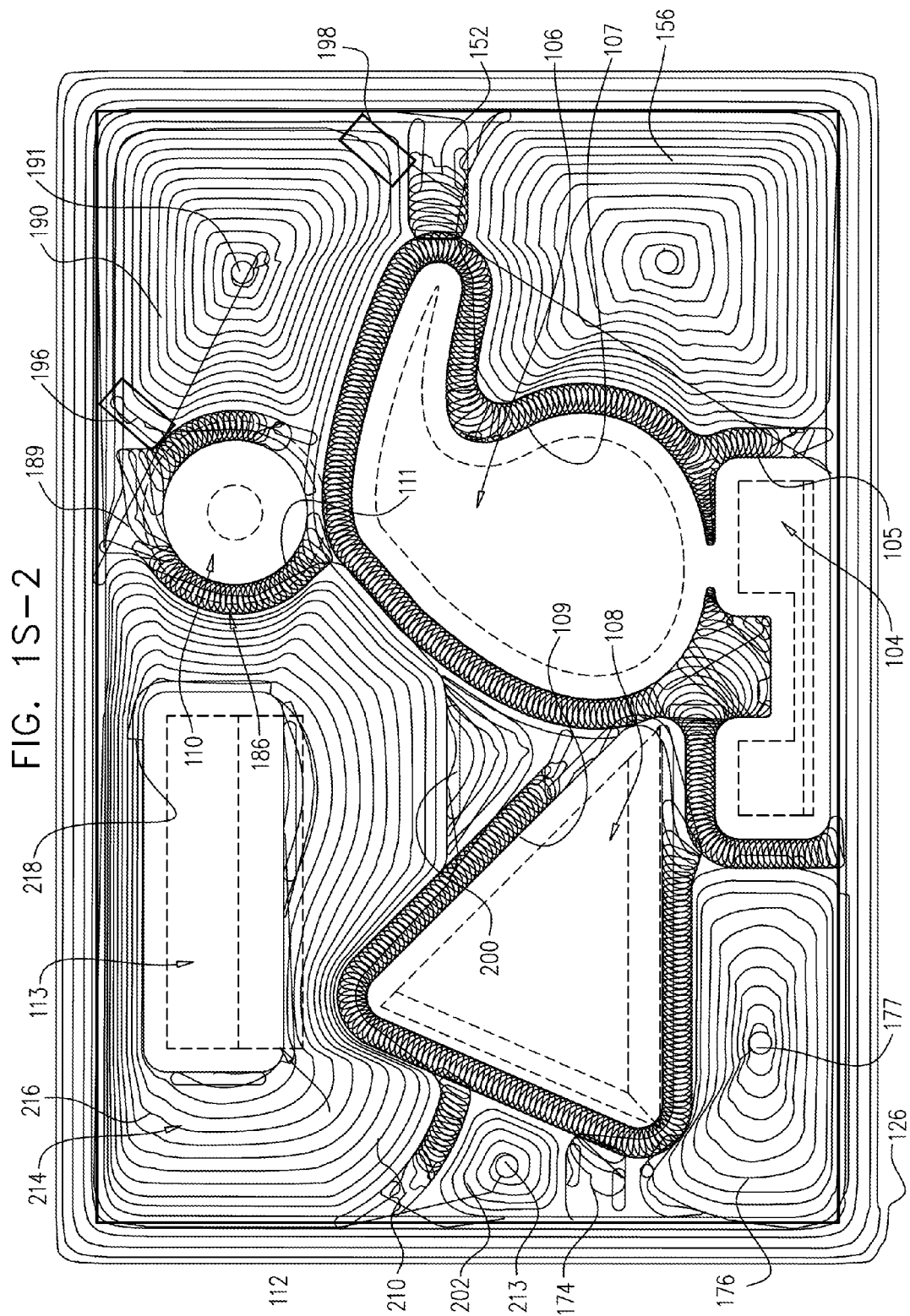

Turning now to FIGS. 1S-1 and 1S-2, it is shown that, the machining of region 156 is calculated. As shown in FIGS. 1S-1 and 1S-2, a clipped area of region 156 designated by numeral 230 is identified by clipping. Area 230 is preferably calculated to be machined by a trochoidal-like tool path segment, and the remainder of region 156 is then calculated to be machined by a spiral tool path segment.

It is appreciated that the calculation described hereinabove constitutes the calculation of a tool path for the machining of a first step down which is a first phase in the machining of object 100. Throughout, the term "step down" is used to describe a single machining phase at a constant depth. As shown in FIG. 1C, the complete machining of object 100 requires three step downs. Therefore, subsequent and similar to the calculation described hereinabove, the tool path designer calculates the machining of second step down 119 and thereafter of third step down 120, thereby completing the entire rough machining of object 100. Preferably, the vertical distance between subsequent step downs is generally between 1 and 4 times the diameter of the cutting tool.

It is appreciated that following the rough machining of a workpiece, an additional stage of rest rough machining is calculated, which reduces the large residual steps created by the series of step downs on the sloping surfaces of object 100.

Reference is now made to FIGS. 2A-2L-2, which illustrate the calculation of another tool path in accordance with a preferred embodiment of the present invention. FIGS. 2A and 2B are respective isometric and top view illustrations of an object 400, which is another example of objects that can be fabricated in accordance with the present invention. The configuration of the object 400 is selected to illustrate additional various particular features of the present invention. It is noted that any suitable three-dimensional object that can be machined by a conventional 3-axis machine tool may be fabricated in accordance with a preferred embodiment of the present invention.

As seen in FIGS. 2A & 2B, the object 400 is seen to have a generally planar base portion 402 from which one protrusion, here designated by reference numeral 404, extends. FIG. 2C shows stock material 410 overlaid by a cross section 420 of object 400. Cross section 420 is characterized as having an external boundary 422 and an island 405 corresponding to the cross section of protrusion 404 at the depth of cross section 420.

In the illustrated example of FIG. 2C, cross section 420 is initially identified as a Type III region 424 which includes one island 405. As described hereinabove, a plurality of nested offset contours is calculated between the external boundary 422 of region 424 and an innermost contour of region 424. The innermost contour is initially calculated to be overlapping with the external boundary of island 405. Therefore, as shown in FIGS. 2D-1 and 2D-2, a moat 428 is calculated to circumvent island 405, and the innermost contour 430 is calculated to be immediately external to the external boundary of moat 428.

Figures 1, 2D:
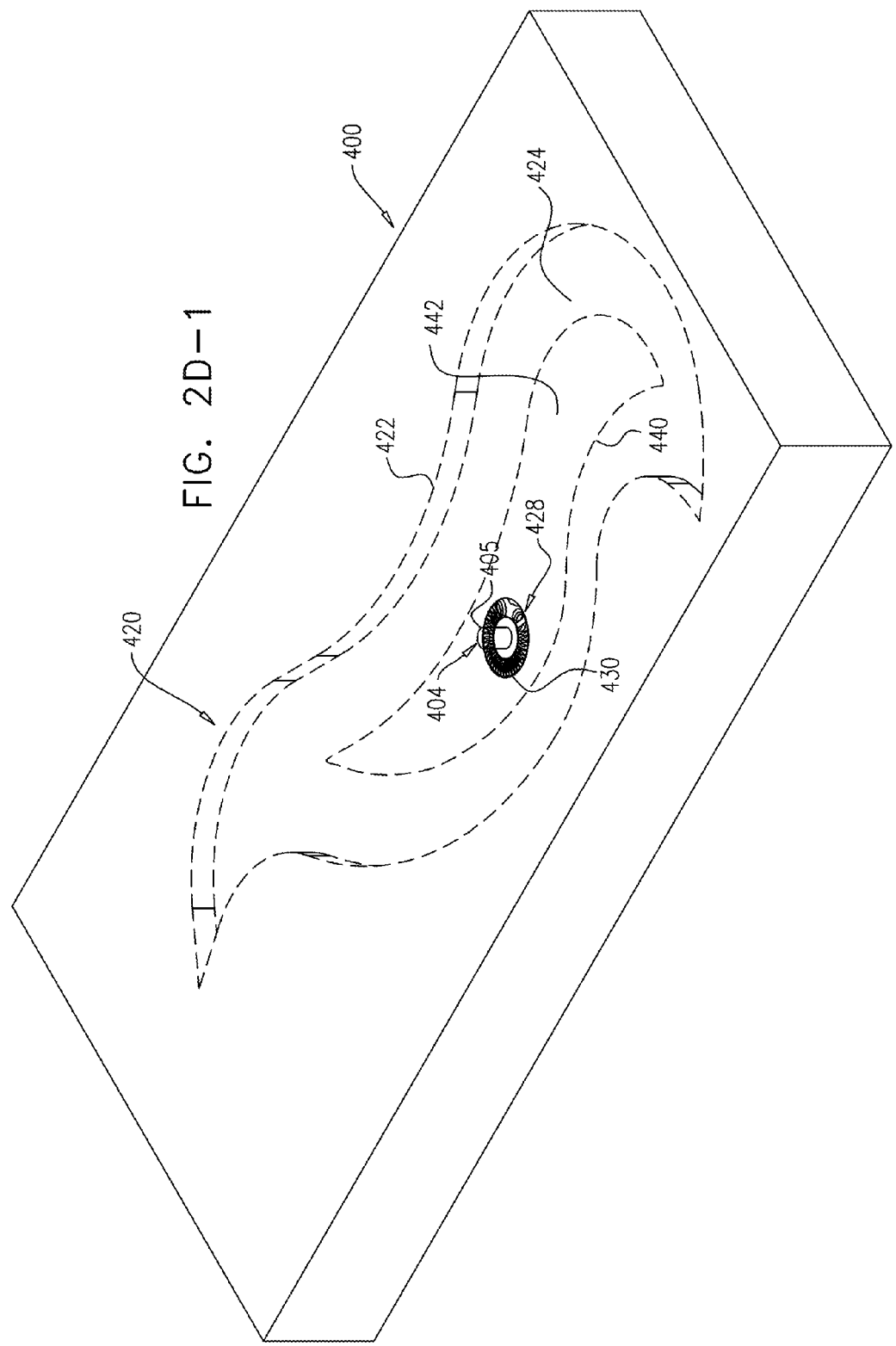
Figures 2, 2D:
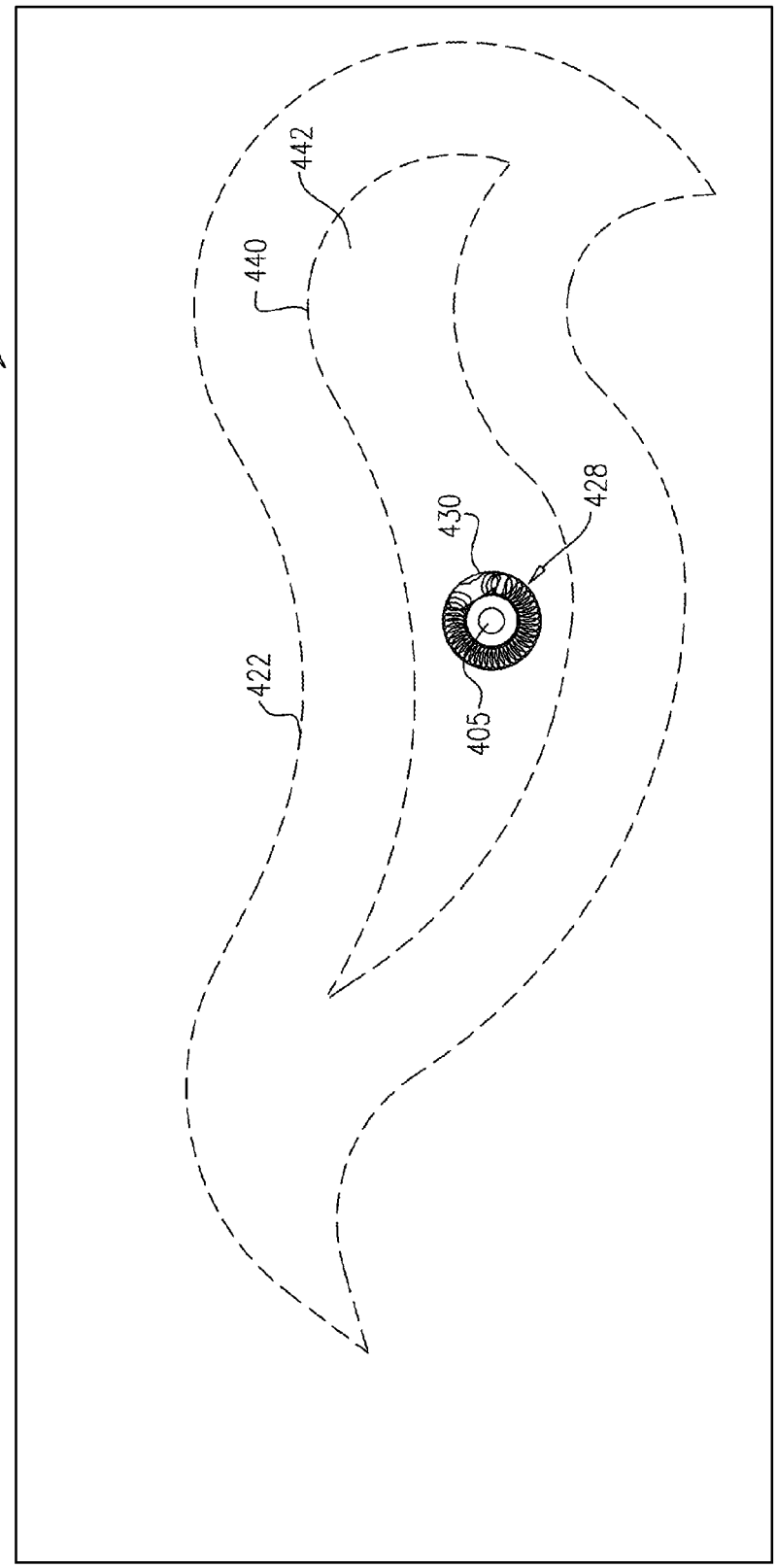
Figures 2, 2E:
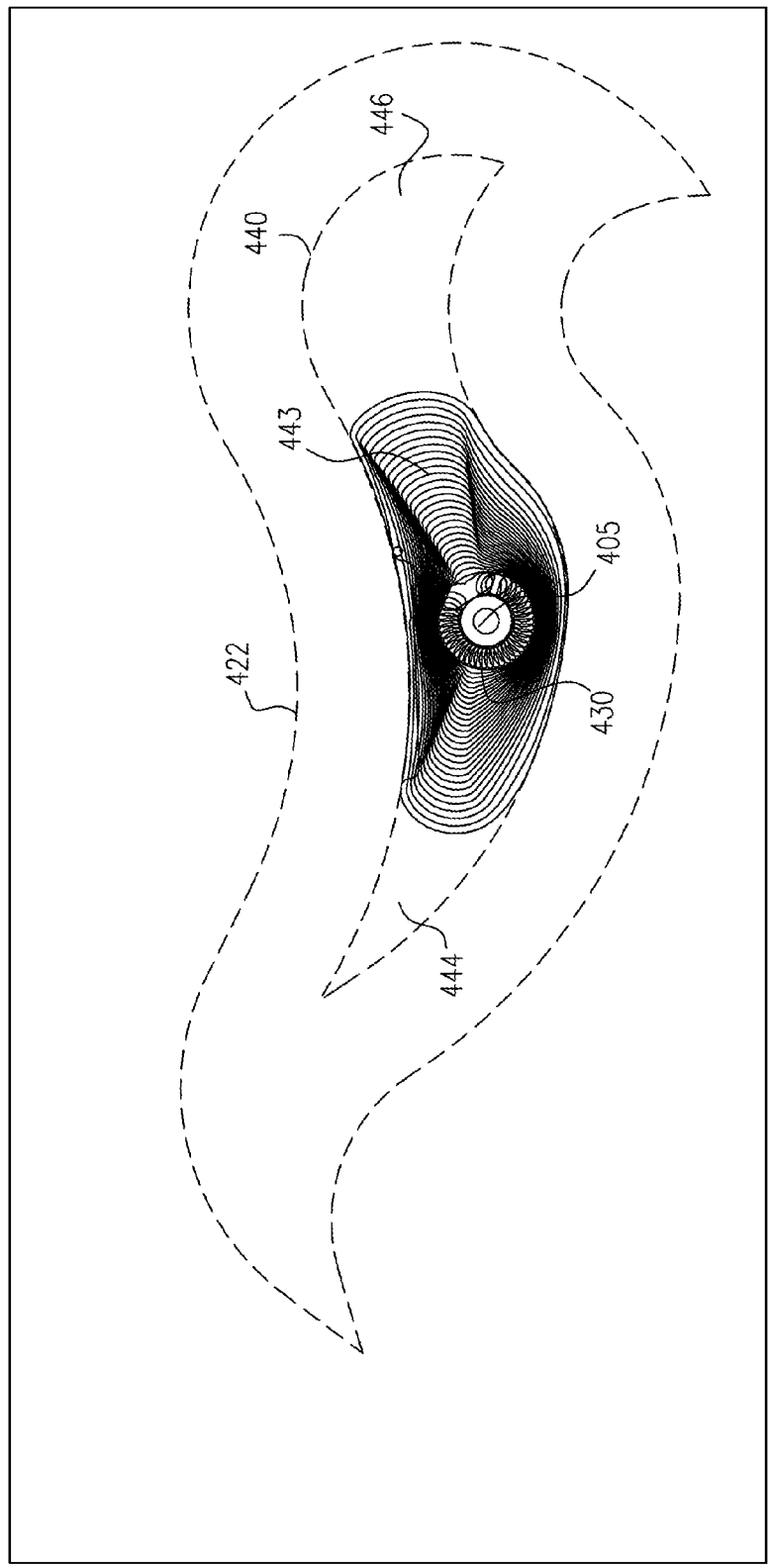
Figures 2, 2F:
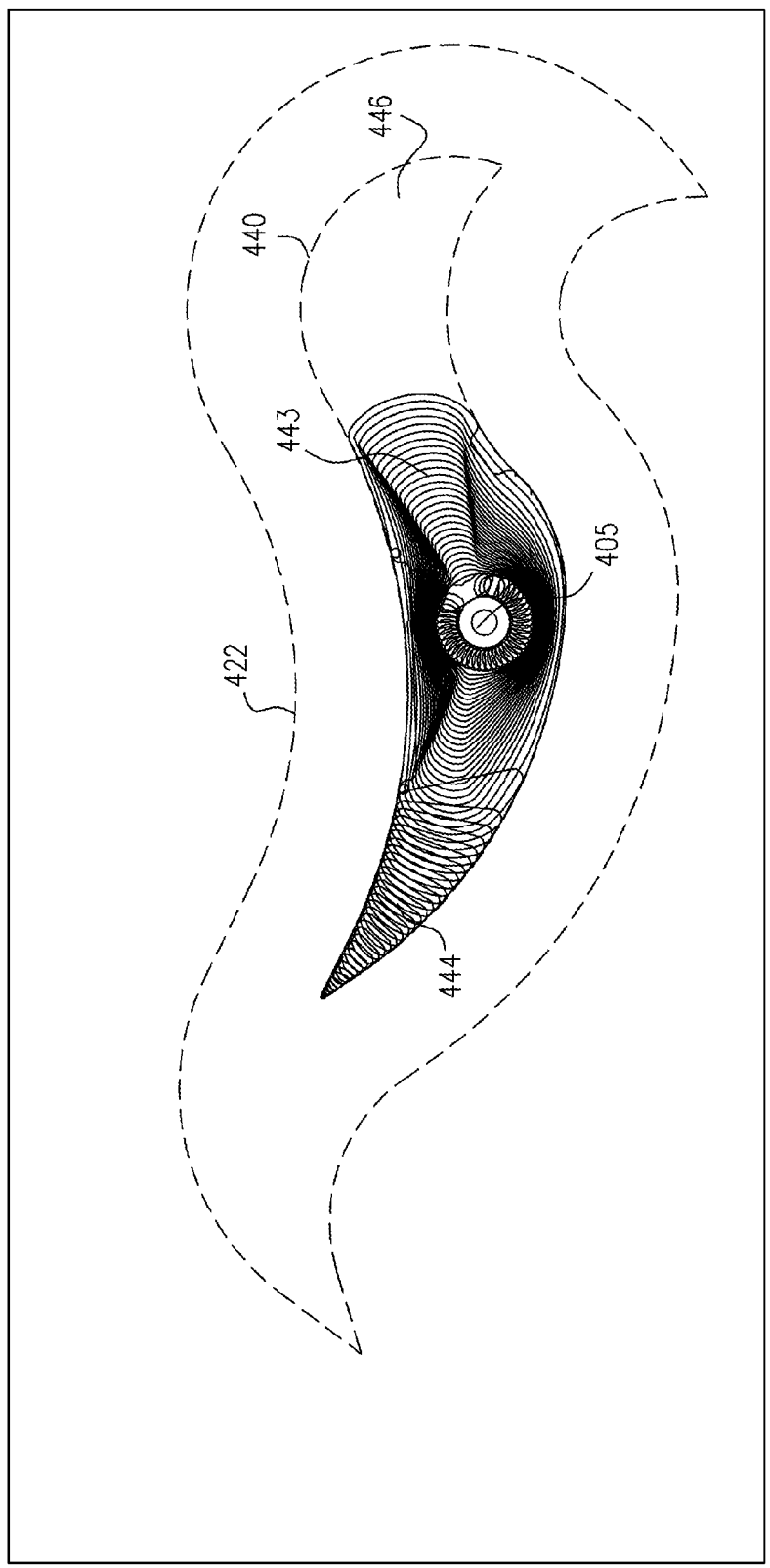
Figures 2, 2G:
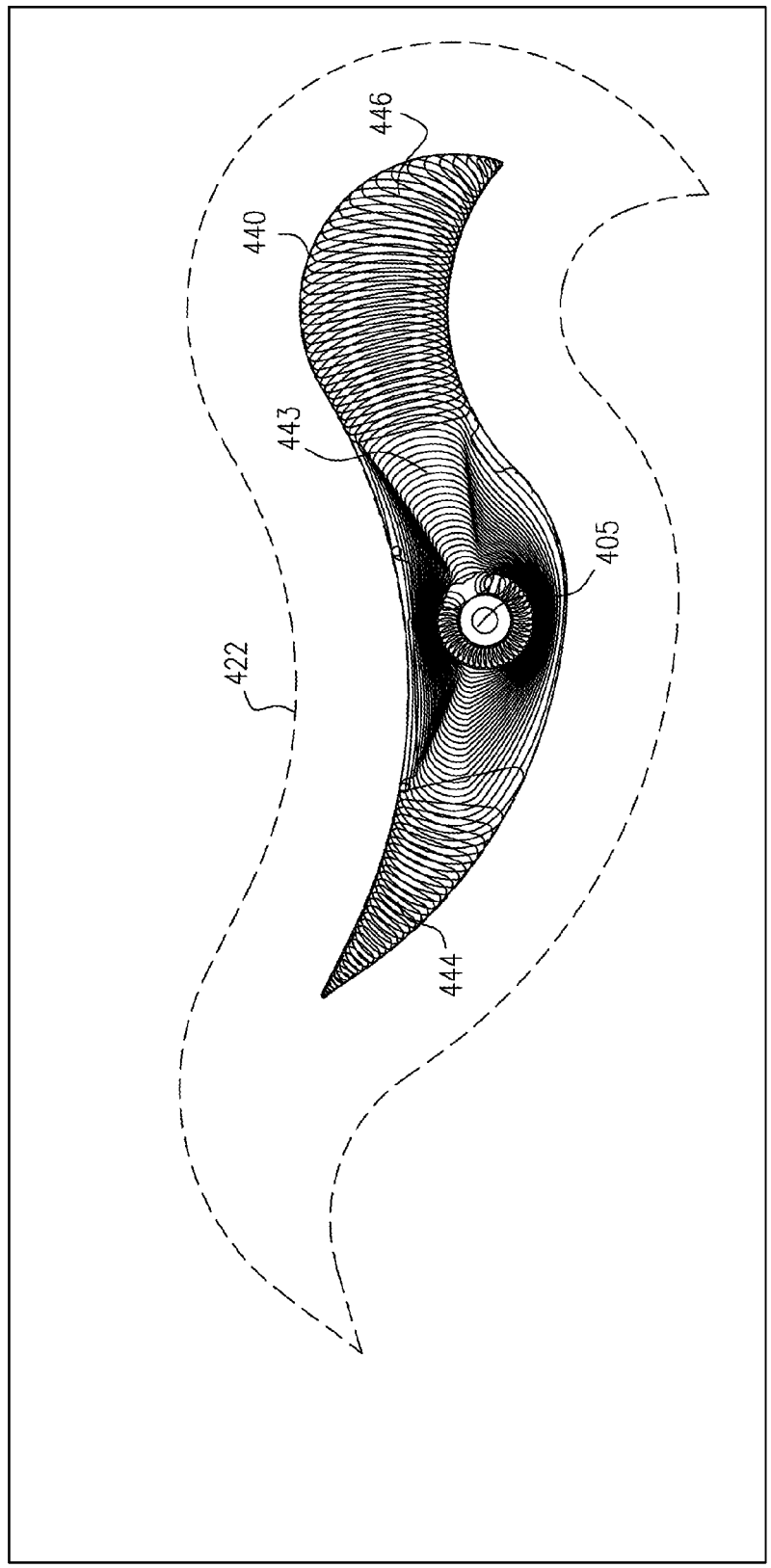

As shown in FIGS. 2D-1 and 2D-2, innermost contour 430 and nested internal contour 440, external to innermost contour 430, define a Type III region 442. As shown in FIGS. 2E-1 and 2E-2, a diverging tool path segment 443 is initially calculated to spiral outwardly between innermost contour 430 and nested internal contour 440, thereby creating two residual regions 444 and 446. As shown in FIGS. 2F-1 and 2F-2, residual region 444 is calculated to be machined as a Type II region by employing a trochoidal-like tool path segment. Similarly, as shown in FIGS. 2G-1 and 2G-2, residual region 446 is calculated to be machined as a Type II region by employing a trochoidal-like tool path segment.

Figures 1, 2H:
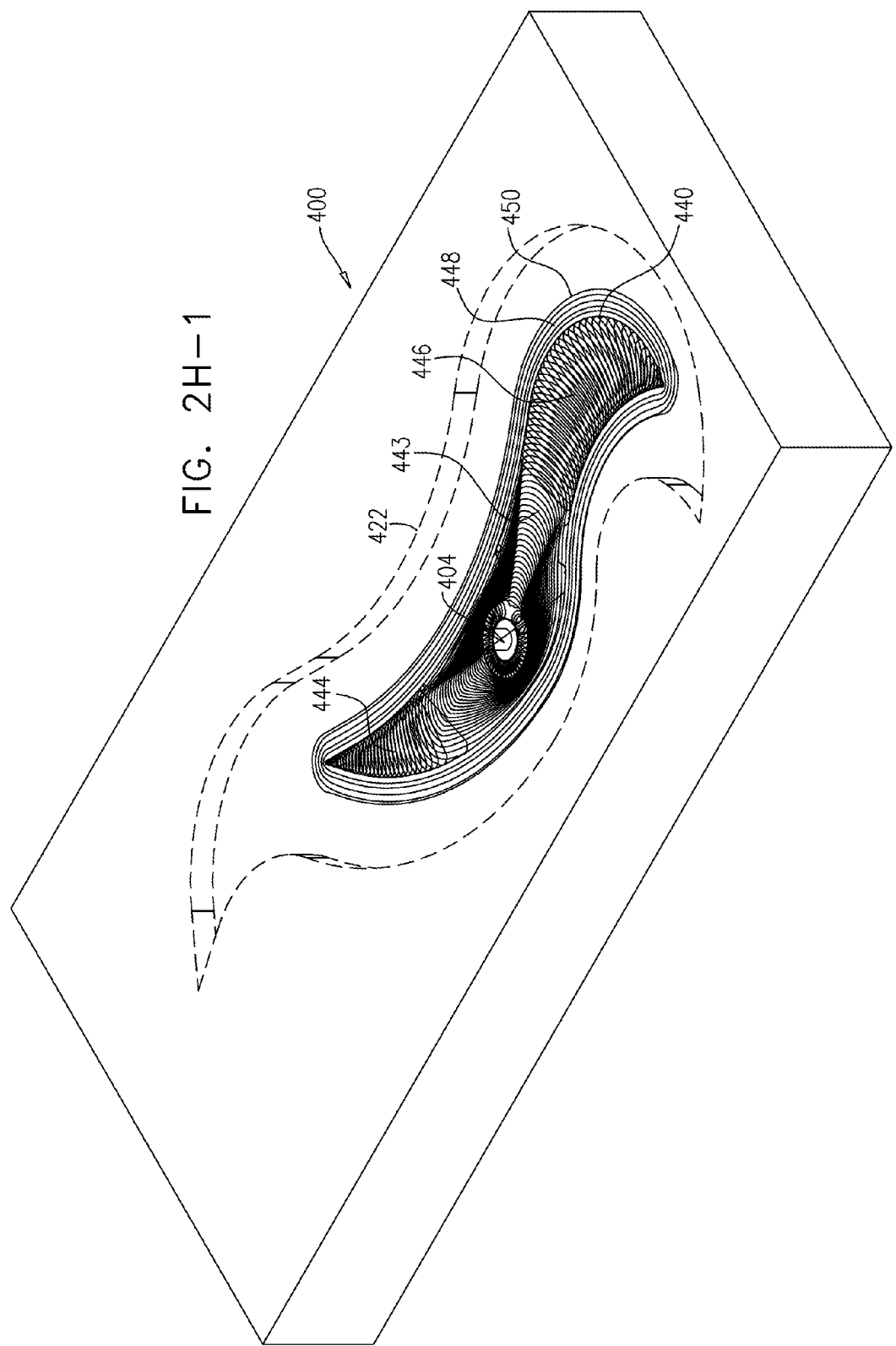
Figures 2, 2H:
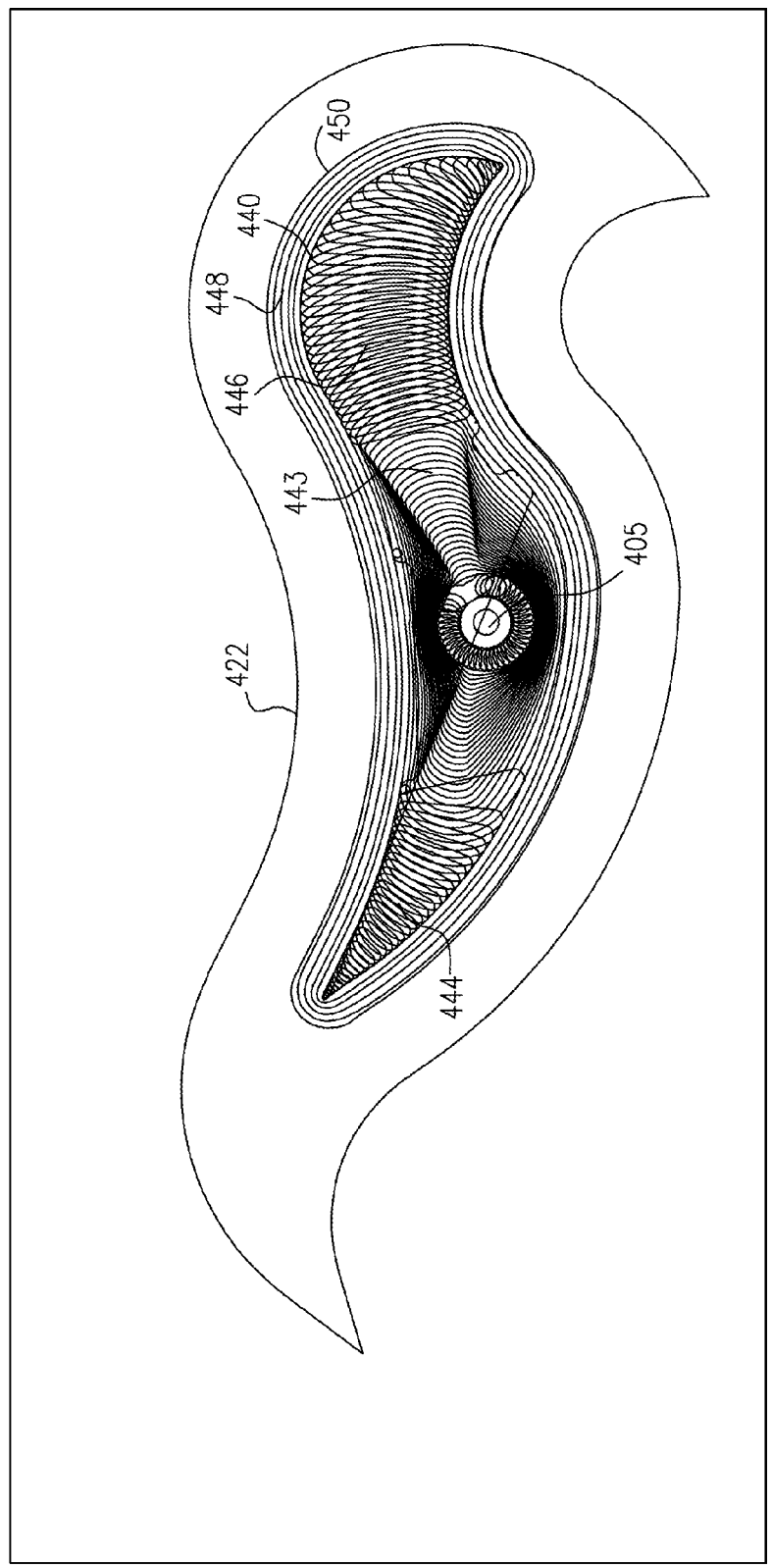
Figures 2, 21:
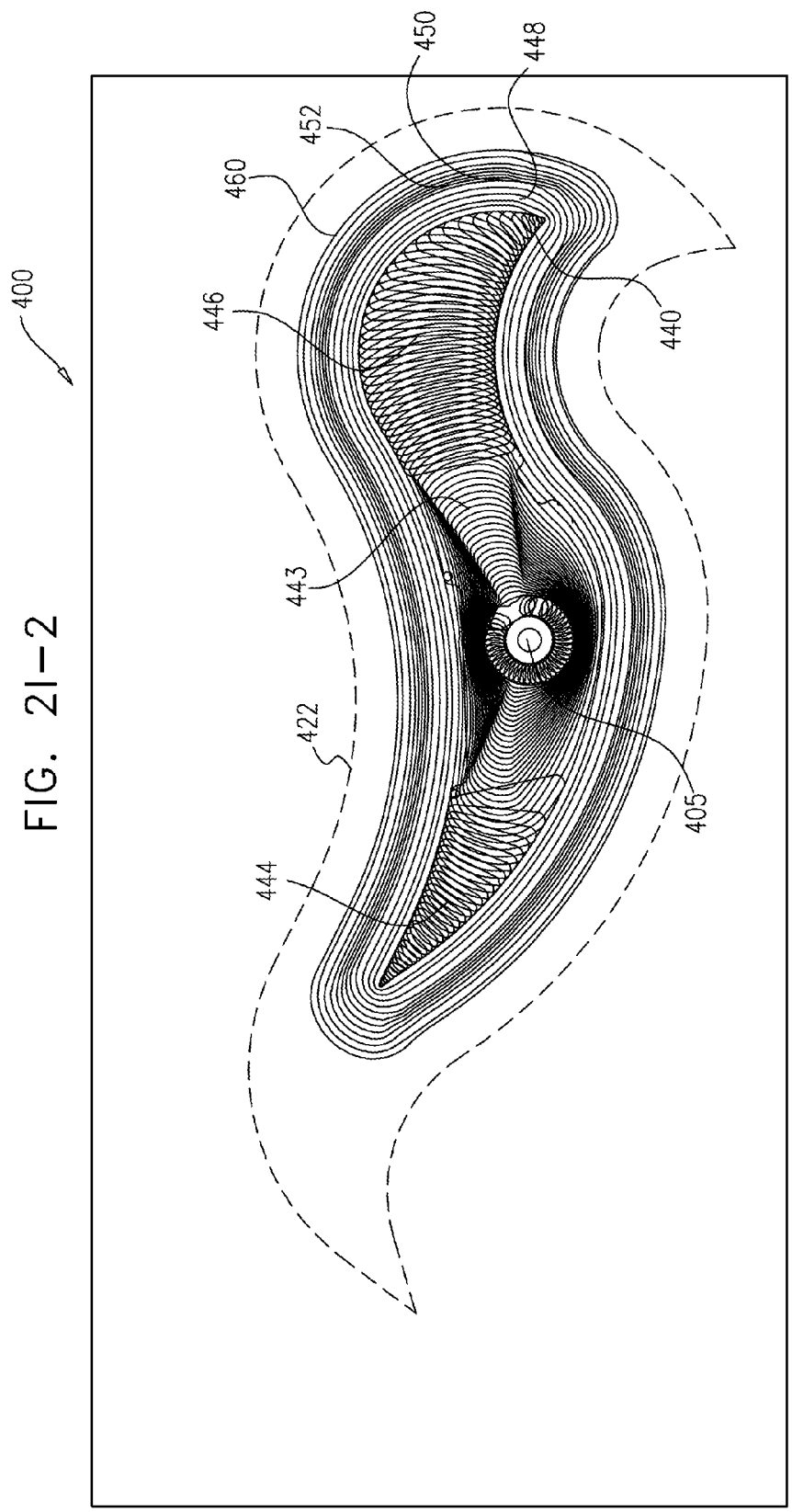

Turning now to FIGS. 2H-1 and 2H-2, it is shown that a diverging spiral tool path segment is calculated to machine a Type III region 448 defined between nested internal contour 440 and nested internal contour 450. Subsequently, as shown in FIGS. 2I-1 and 2I-2, a diverging spiral tool path segment is similarly calculated to machine a Type III region 452 defined between nested internal contour 450 and nested internal contour 460.

Figures 2, 2J:
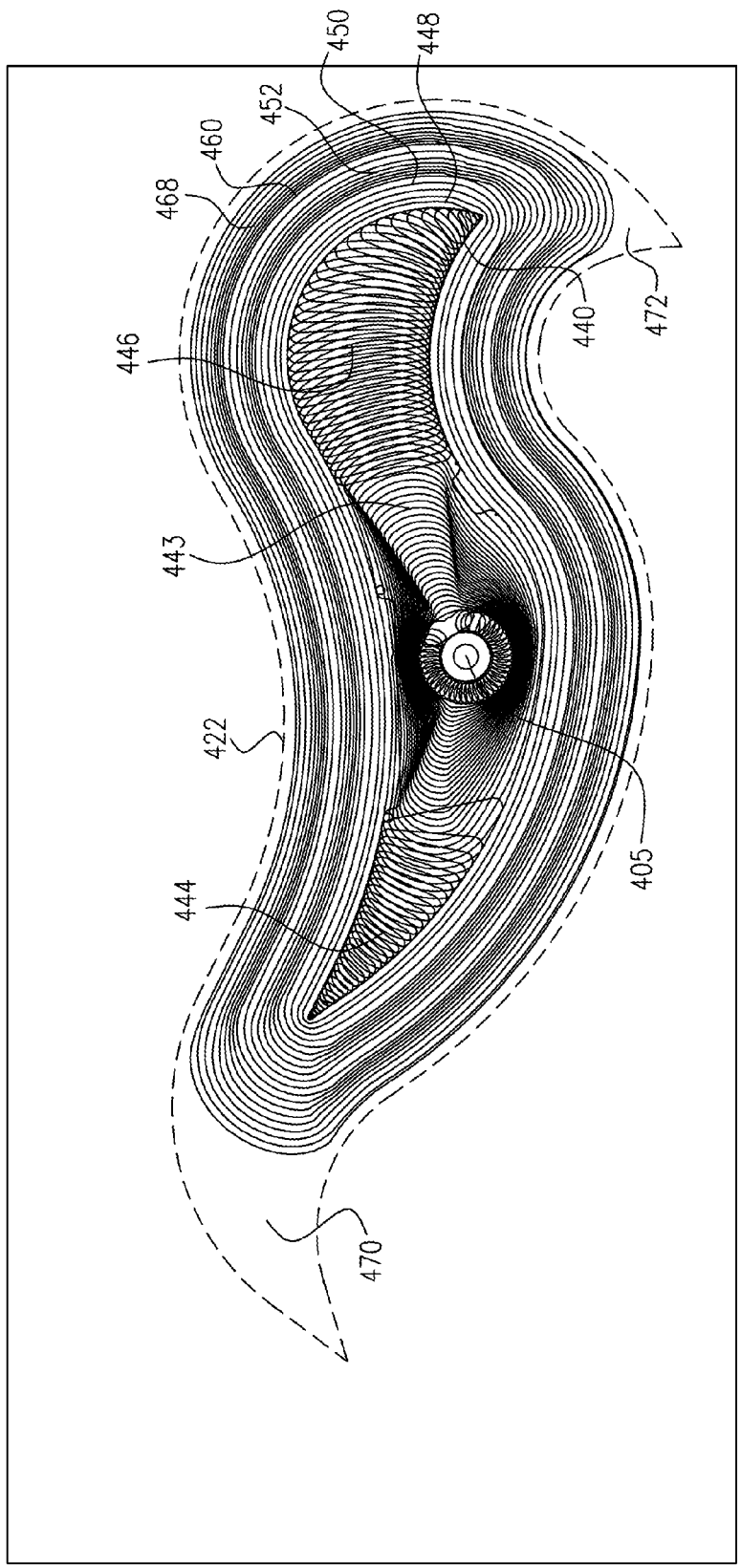
Figures 2, 2K:
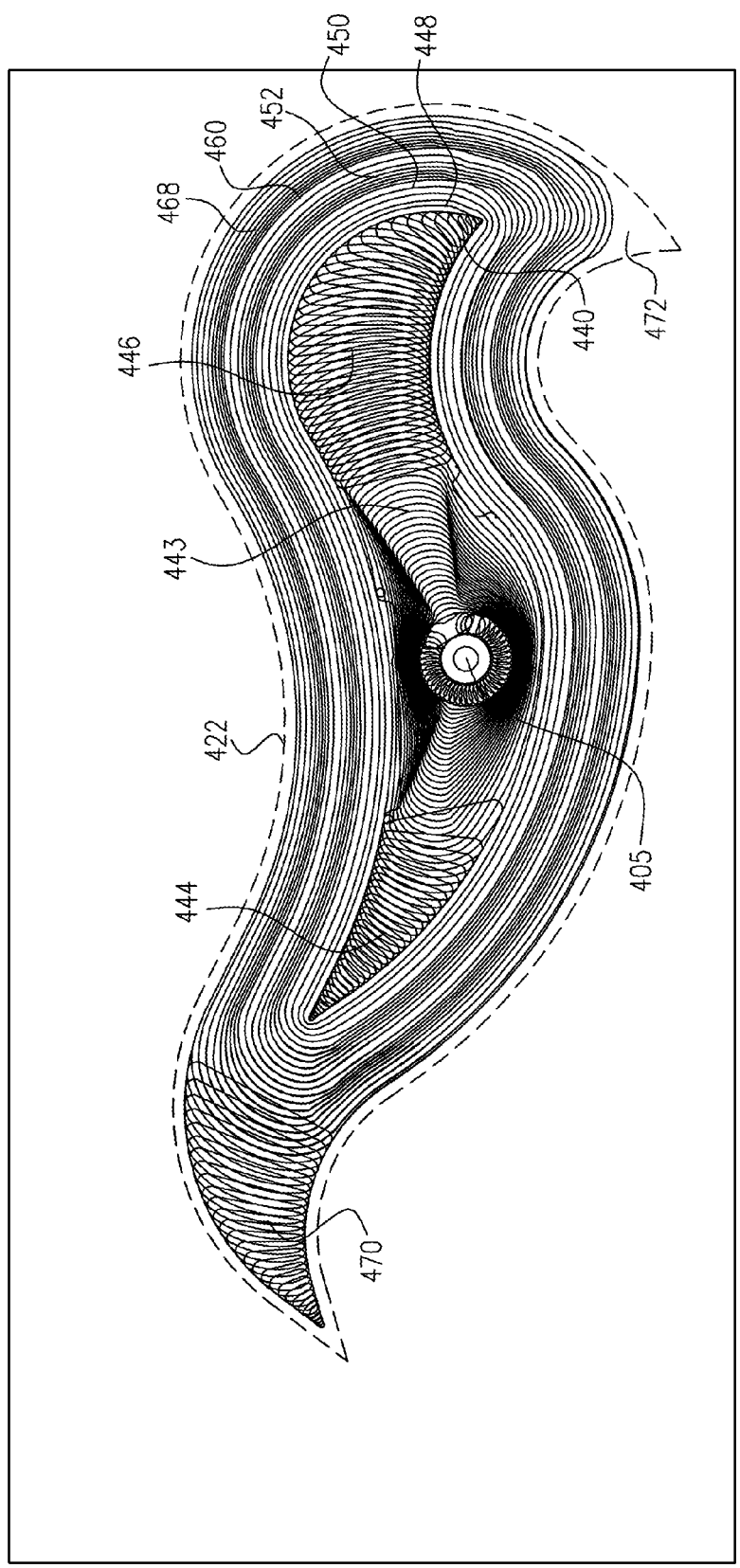
Figures 1, 2L:
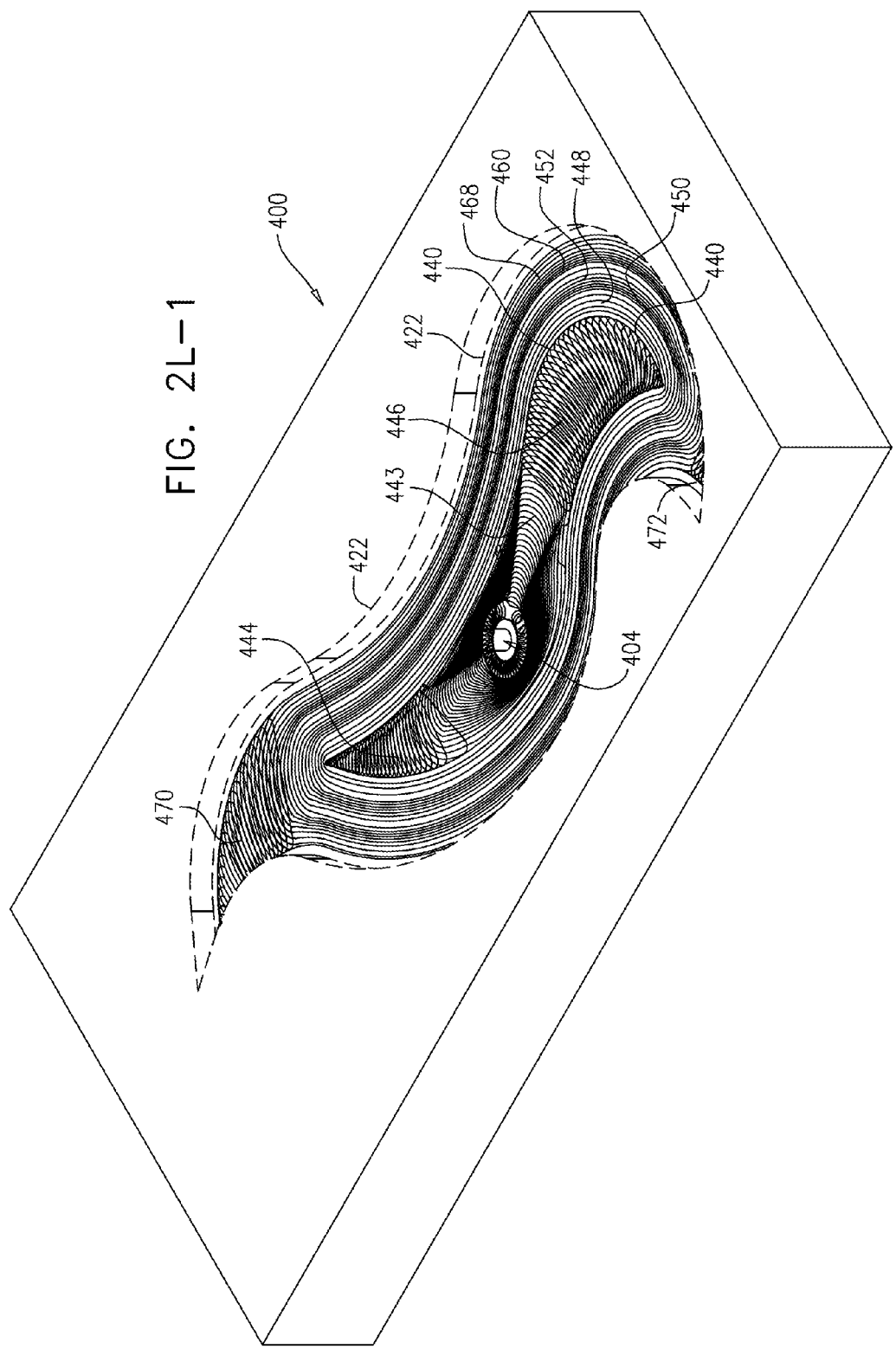
Figures 2, 2L:
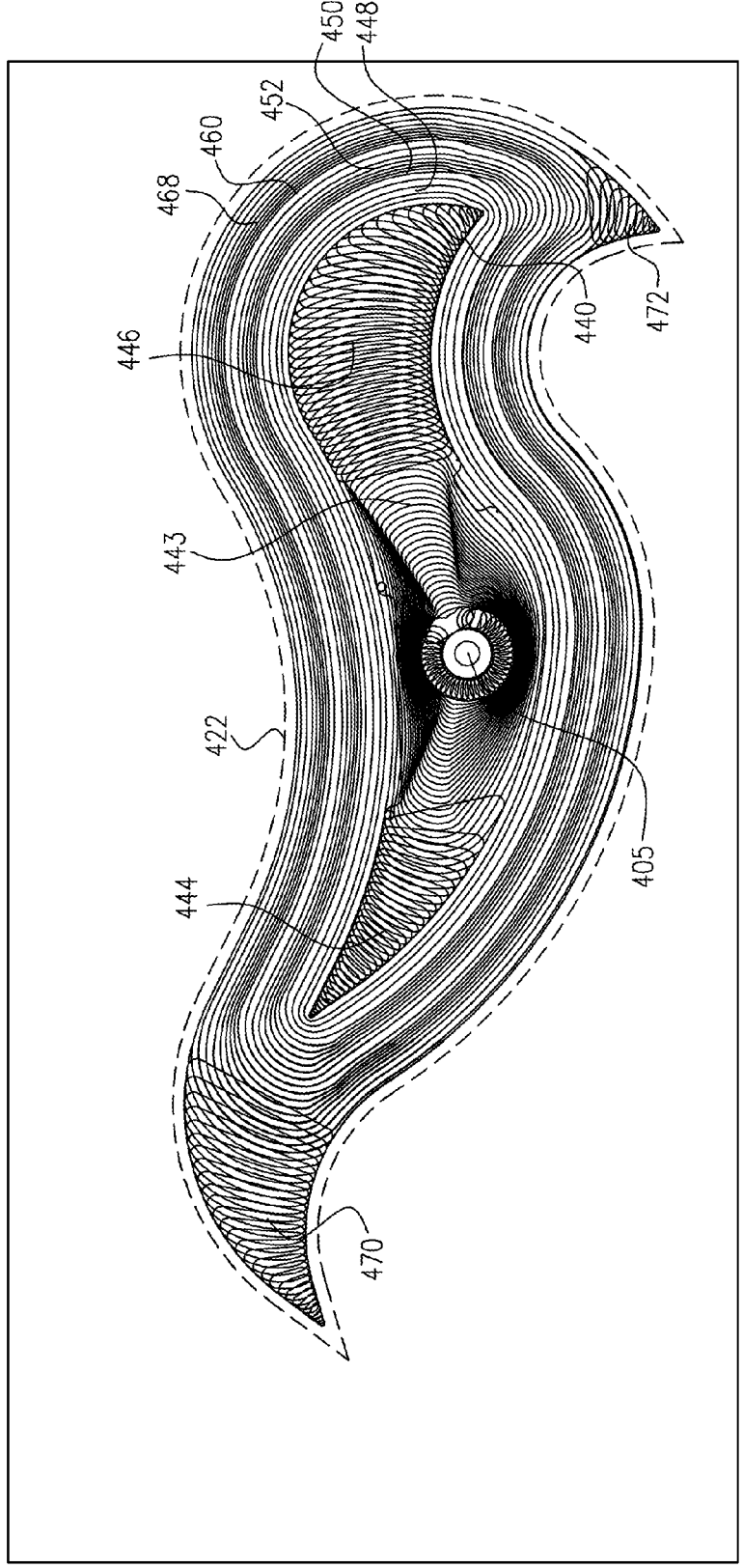
Figure 3A:
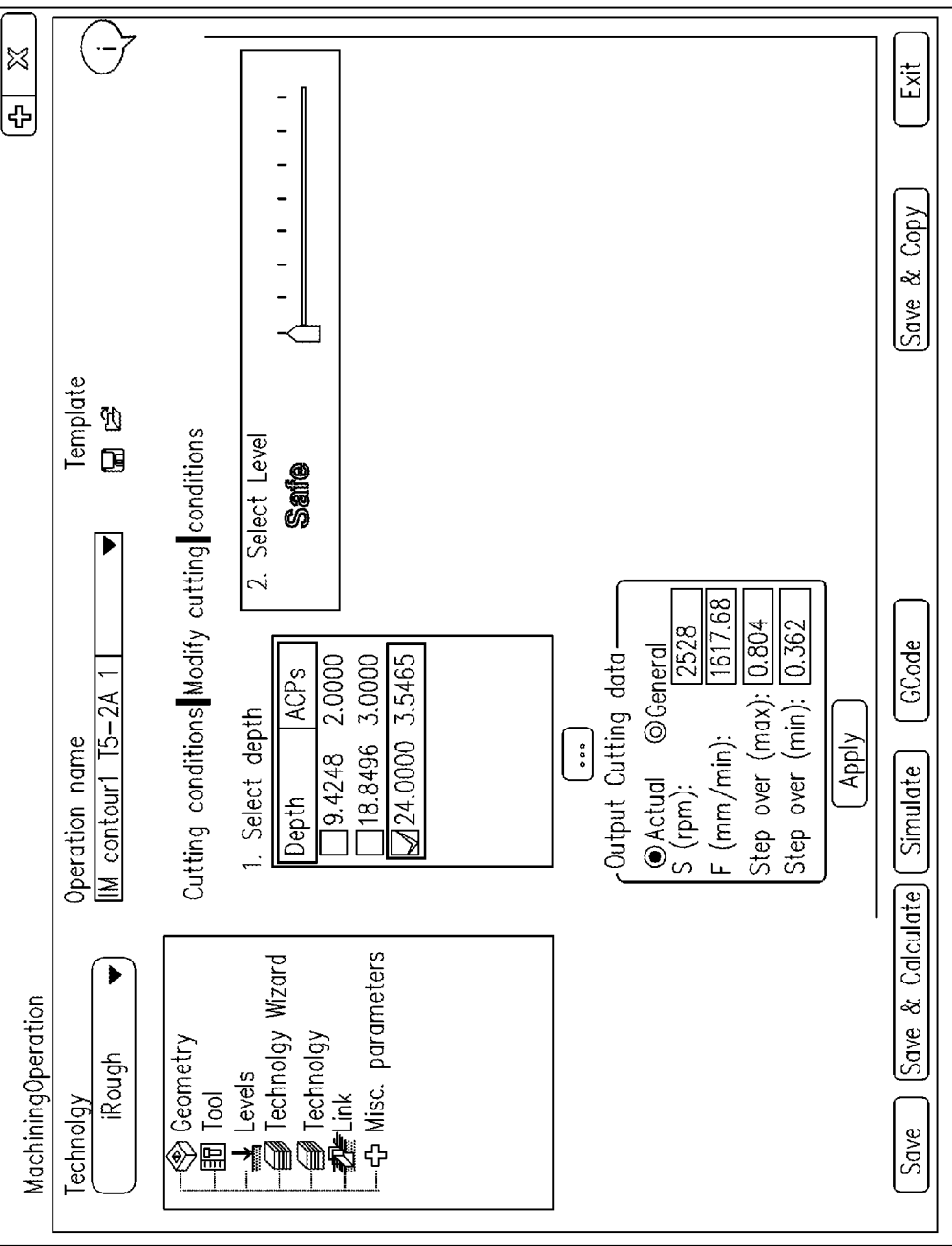
FIGS. 3A-3D are simplified screen shots illustrating some aspects of the present invention.
Figure 3B:
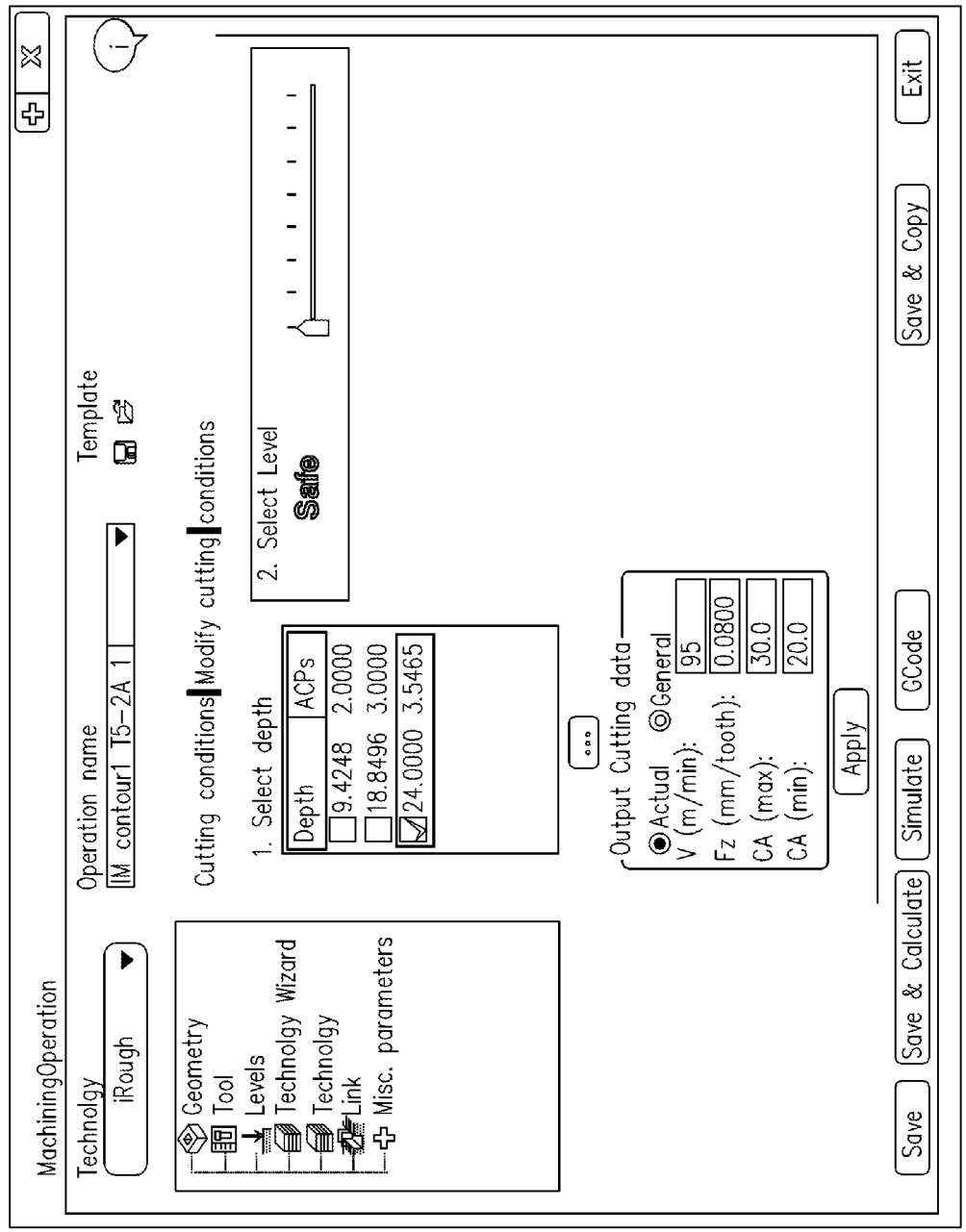
Figure 3C:
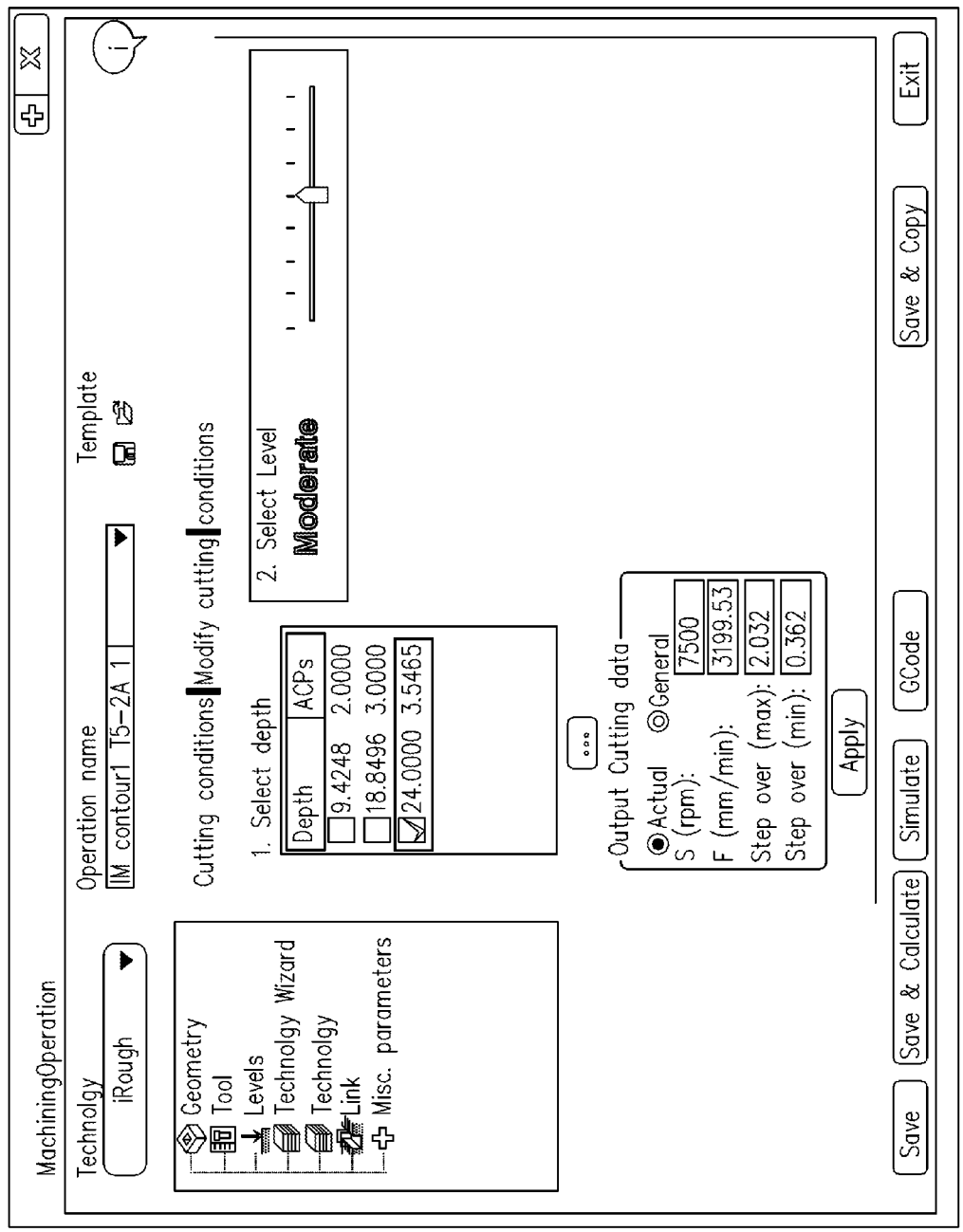
Figure 3D:
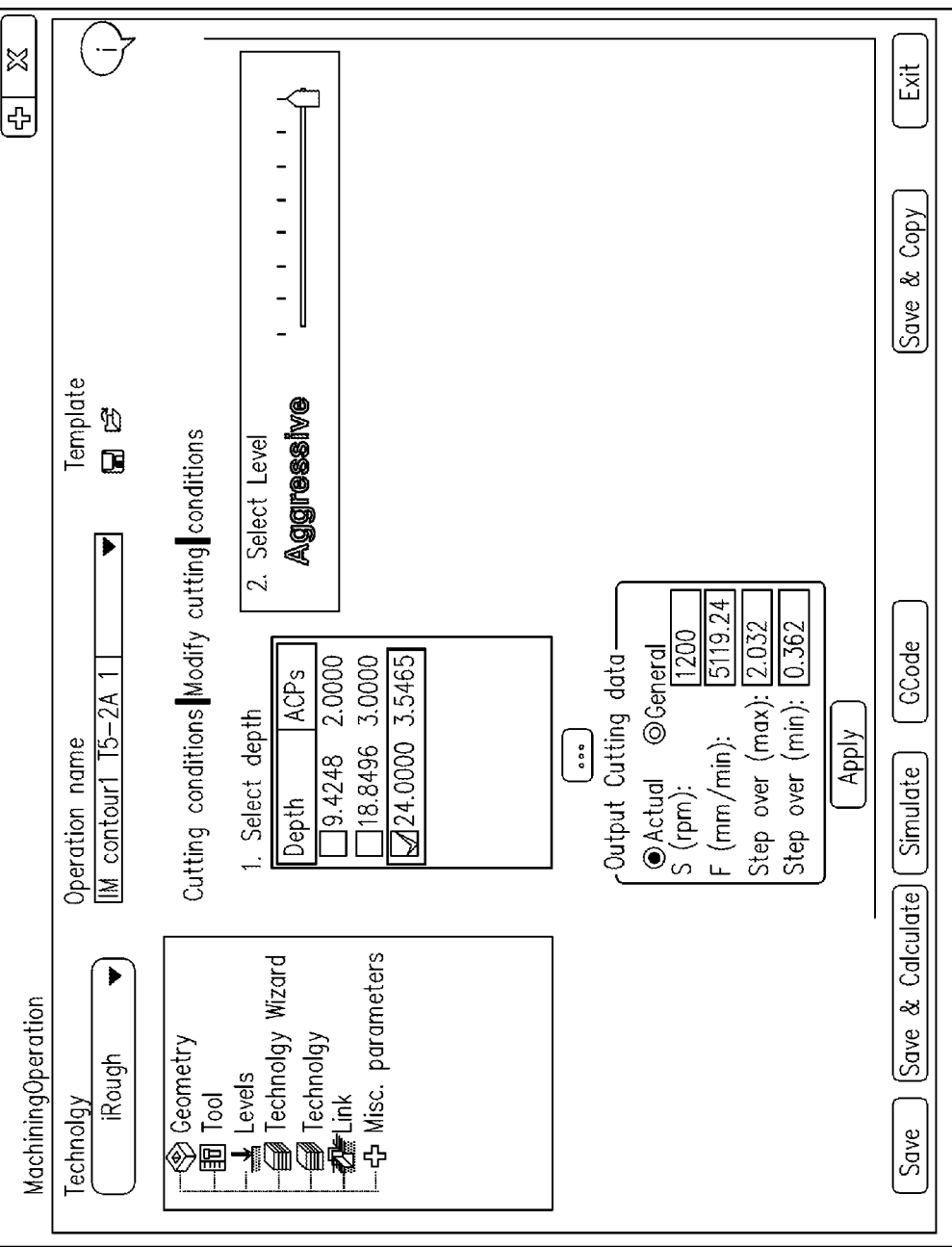

Turning now to FIGS. 2J-1 and 2J-2, it is shown that a diverging tool path segment is calculated to machine a Type III region 468 defined between nested internal contour 460 and external boundary 422, thereby creating two residual regions 470 and 472. As shown in FIGS. 2K-1 and 2K-2, residual region 470 is calculated to be machined as a Type II region by employing a trochoidal-like tool path segment. Similarly, as shown in FIGS. 2L-1 and 2L-2, residual region 472 is calculated to be machined as a Type II region by employing a trochoidal-like tool path segment, thereby completing the calculation of the machining of object 400.

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. A method for machining a workpiece employing a computer controlled machine tool, the method comprising:
   directing said tool along a tool path wherein an engagement angle between said tool and said workpiece gradually varies between a preselected maximum permitted engagement angle and a preselected minimum permitted engagement angle.

2. A method for machining a workpiece employing a computer controlled machine tool, the method comprising:
   selecting a region of said workpiece to be removed by a rotating cutting tool;
   directing said tool along an asymmetric spiral tool path in said region of said workpiece, wherein said asymmetric spiral tool path maximizes the portion of said region of said workpiece which is removed by said rotating cutting tool moving along said asymmetric spiral tool path; and
   directing said rotating cutting tool along at least one trochoidal-like tool path in a remaining portion of said region of said workpiece which is removed by said tool moving along said trochoidal-like tool path.

3. A method for machining a workpiece employing a computer controlled machine tool, the method comprising:
   selecting a region of said workpiece to be removed by a rotating cutting tool;
   selecting a first portion of said region to be removed by an asymmetric spiral tool path; and
   directing said tool along at least one trochoidal-like tool path in a remaining portion of said region of said workpiece;
   and wherein said selecting a first portion of said region is operative to minimize the machining time necessary to remove said region.

4. A method for machining a workpiece employing a computer controlled machine tool, the method comprising:
   considering the cross section of a desired object to be fabricated from a workpiece;
   defining isolated regions of said cross section on said workpiece surface which are not to be removed as islands;
   initially directing said tool along a tool path in a region not having islands; and
   upon said tool path encountering an island, directing said tool along a moat tool path which defines a moat surrounding said island.

5. A method for machining a workpiece employing a computer controlled machine tool, the method comprising:
   identifying at least one open region for which a first machining time needed to remove said region is longer than a second machining time needed to divide said region into two independent regions by removing a separating channel by a rotating cutting tool between said two independent regions and removing said two independent regions; and
   directing said tool along a trochoidal-like tool path in said at least one separating channel extending between two points on edges of an external boundary of said region, thereby dividing said region into at least two independent regions.

6. A method for machining a workpiece employing a computer controlled machine tool, the method comprising:
- identifying at least one semi-open region for which a first machining time needed to remove said region by employing a trochoidal-like tool path is longer than a second machining time needed to isolate said region by removing separating channels between said region and all closed external boundary segments of said region and removing the remainder of said region; and
- defining in said region to be removed at least one separating channel between said region and all closed external boundary segments of said region, thereby defining a remaining open region to be removed.

* * * * *